(12) United States Patent
Tsubata

(10) Patent No.: US 8,184,223 B2
(45) Date of Patent: May 22, 2012

(54) LIQUID CRYSTAL DISPLAY DEVICE AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 66 days.

(21) Appl. No.: 12/933,965

(22) PCT Filed: Dec. 26, 2008

(86) PCT No.: PCT/JP2008/073761
§ 371 (c)(1),
(2), (4) Date: Sep. 22, 2010

(87) PCT Pub. No.: WO2009/130826
PCT Pub. Date: Oct. 29, 2009

(65) Prior Publication Data
US 2011/0025923 A1    Feb. 3, 2011

(30) Foreign Application Priority Data
Apr. 25, 2008 (JP) .................................. 2008-116207

(51) Int. Cl.
*G02F 1/1343* (2006.01)
(52) U.S. Cl. ................ 349/39; 349/19; 349/33; 349/38; 349/41; 349/42
(58) Field of Classification Search .................... 349/19, 349/33, 38, 39, 41, 42, 43
See application file for complete search history.

(56) References Cited

U.S. PATENT DOCUMENTS
| | | | |
|---|---|---|---|
| 5,126,865 A | 6/1992 | Sarma | |
| 5,426,447 A | 6/1995 | Lee | |

(Continued)

FOREIGN PATENT DOCUMENTS
JP    5-66412    3/1993

(Continued)

OTHER PUBLICATIONS

International Search Report for PCT/JP2008/073761, mailed Feb. 10, 2009.2007.

*Primary Examiner* — Jennifer Doan
(74) *Attorney, Agent, or Firm* — Nixon & Vanderhye, P.C.

(57) ABSTRACT

A first pixel electrode (17a), a second pixel electrode (17b), a third pixel electrode (17c), and a fourth pixel electrode (17d) are provided in a pixel (100); the first pixel electrode (17a) is connected to a data signal line (15x) via a first transistor (12a), the second pixel electrode (17b) is connected to the data signal line (15x) via a second transistor (12b), and the first transistor (12a) and the second transistor (12b) are connected to the same scanning signal line (16x); the first pixel electrode (17a) is connected to the third pixel electrode (17c) via a capacitor, and the second pixel electrode (17b) is connected to the fourth pixel electrode (17d) via a capacitor; one of two storage capacitor wires (18p, 18q) forms a capacitance with the first pixel electrode (17a), and the other one of the two storage capacitor wires (18p, 18q) forms a capacitance with the second pixel electrode (17b); and one of the two storage capacitor wires (18p, 18q) receives a storage capacitor wire signal, and the other one of the two storage capacitor wires (18p, 18q) receives another storage capacitor wire signal. According to the configuration, it is possible to improve viewing angle characteristics of a liquid crystal display device of a pixel division mode (capacitively coupled type).

29 Claims, 32 Drawing Sheets

U.S. PATENT DOCUMENTS

| | | | |
|---|---|---|---|
| 6,980,273 B2 * | 12/2005 | Ota et al. | 349/141 |
| 7,136,116 B2 * | 11/2006 | Sakamoto et al. | 349/43 |
| 2006/0023137 A1 | 2/2006 | Kamada et al. | |
| 2006/0268186 A1 * | 11/2006 | Kamada et al. | 349/38 |
| 2006/0290827 A1 | 12/2006 | Kihara et al. | |
| 2007/0132690 A1 | 6/2007 | Nakanishi et al. | |
| 2010/0118010 A1 | 5/2010 | Shibasaki et al. | |

FOREIGN PATENT DOCUMENTS

| | | |
|---|---|---|
| JP | 9-269509 | 10/1997 |
| JP | 2006-39290 | 2/2006 |
| JP | 2006-330499 | 12/2006 |
| JP | 2006-330634 | 12/2006 |
| RU | 2 160 933 C2 | 12/2000 |

* cited by examiner

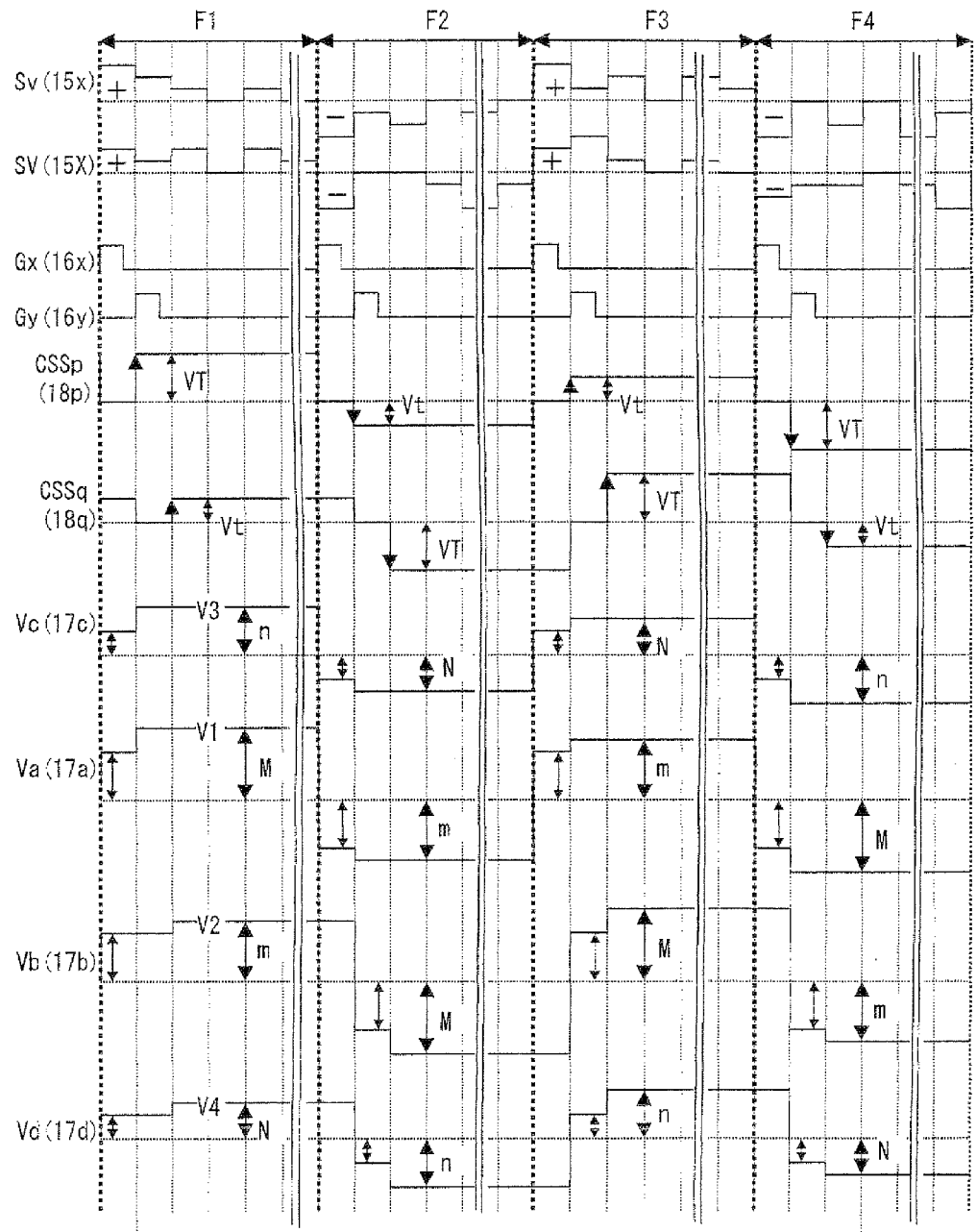
F I G. 4

F I G. 5

|  | (a) F1 | | (b) F2 | | (c) F3 | | (d) F4 | |
|---|---|---|---|---|---|---|---|---|
|  | 17c<br>n<br>(+) | 17C<br>n<br>(+) | 17c<br>N<br>(−) | 17C<br>N<br>(−) | 17c<br>N<br>(+) | 17C<br>N<br>(+) | 17c<br>n<br>(−) | 17C<br>n<br>(−) |
|  | 17a<br>M<br>(+) | 17A<br>M<br>(+) | 17a<br>m<br>(−) | 17A<br>m<br>(−) | 17a<br>m<br>(+) | 17A<br>m<br>(+) | 17a<br>M<br>(−) | 17A<br>M<br>(−) |
|  | 17b<br>m<br>(+) | 17B<br>m<br>(+) | 17b<br>M<br>(−) | 17B<br>M<br>(−) | 17b<br>M<br>(+) | 17B<br>M<br>(+) | 17b<br>m<br>(−) | 17B<br>m<br>(−) |
|  | 17d<br>N<br>(+) | 17D<br>N<br>(+) | 17d<br>n<br>(−) | 17D<br>n<br>(−) | 17d<br>n<br>(+) | 17D<br>n<br>(+) | 17d<br>N<br>(−) | 17D<br>N<br>(−) |
|  | 17g<br>N<br>(+) | 17G<br>N<br>(+) | 17g<br>n<br>(−) | 17G<br>n<br>(−) | 17g<br>n<br>(+) | 17G<br>n<br>(+) | 17g<br>N<br>(−) | 17G<br>N<br>(−) |
|  | 17e<br>m<br>(+) | 17E<br>m<br>(+) | 17e<br>M<br>(−) | 17E<br>M<br>(−) | 17e<br>M<br>(+) | 17E<br>M<br>(+) | 17e<br>m<br>(−) | 17E<br>m<br>(−) |
|  | 17f<br>M<br>(+) | 17F<br>M<br>(+) | 17f<br>m<br>(−) | 17F<br>m<br>(−) | 17f<br>m<br>(+) | 17F<br>m<br>(+) | 17f<br>M<br>(−) | 17F<br>M<br>(−) |
|  | 17h<br>n<br>(+) | 17H<br>n<br>(+) | 17h<br>N<br>(−) | 17H<br>N<br>(−) | 17h<br>N<br>(+) | 17H<br>N<br>(+) | 17h<br>n<br>(−) | 17H<br>n<br>(−) |

LIQUID CRYSTAL DISPLAY DEVICE AND TELEVISION RECEIVER

This application is the U.S. national phase of International Application No. PCT/JP2008/073761 filed 26 Dec. 2008, which designated the U.S. and claims priority to JP Application No. 2008-116207 filed 25 Apr. 2008, the entire contents of each of which are hereby incorporated by reference.

TECHNICAL FIELD

The present invention relates to a liquid crystal display device (pixel division mode) in which a single pixel includes a plurality of sub-pixels.

BACKGROUND ART

As a measure for improving viewing angle dependence of gamma characteristics in liquid crystal display devices (for example, holding down excess brightness and the like in a screen), a liquid crystal display device has been proposed which controls a plurality of sub-pixels in a pixel to have different brightness, so as to display a halftone by an area coverage modulation of these sub-pixels (pixel division mode; for example, see Patent Literature 1).

As illustrated in FIG. 33, a liquid crystal display device disclosed in Patent Literature 1 has a pixel region provided between two adjacent gate bus lines 112, the pixel region having three pixel electrodes 121a through 121c. The pixel electrodes 121a and the 121c are connected to a source draw-out wire 119 that is drawn out from a source electrode 116s of a transistor 116. The source draw-out wire 119 is connected to a control electrode 118; the control electrode 118 is over-lapped by the pixel electrode 112b via an insulating layer. The pixel electrode 121b is capacitively coupled with the pixel electrodes 121a and 121c (capacitively coupled type). In this liquid crystal display device, sub-pixels corresponding to the pixel electrodes 121a and 121c serve as bright sub-pixels, and sub-pixels corresponding to the pixel electrode 121b serve as dark sub-pixels. Hence, a halftone is displayed by area coverage modulation of the bright sub-pixels (2 sub-pixels) and dark sub-pixel (1 sub-pixel).

Citation List

Patent Literature 1

Japanese Patent Application Publication, Tokukai, No. 2006-39290 (Publication Date: Feb. 9, 2006)

SUMMARY OF INVENTION

In the liquid crystal display device disclosed in Patent Literature 1, a single pixel includes two types of sub-pixels having different brightness (the bright sub-electrode and the dark sub-pixel) during halftone display. For example, in a case where this liquid crystal display device is applied to a liquid crystal display device of an MVA (Multi-domain Vertical Alignment) mode, 8 (4 directions×2 kinds) domains (alignment regions) are formed in a single pixel. However, for further improvement in viewing angle characteristics, it has been desired that variety of brightness in a single pixel be increased so that the number of domains in a single pixel is increased.

The present invention was attained in view of the above problems, and an object of the present invention is to improve viewing angle characteristics of a liquid crystal display device of a pixel division mode (capacitively coupled type).

A liquid crystal display device of the present invention is a liquid crystal display device which includes: scanning signal lines; data signal lines; and storage capacitor wires, wherein: a first sub-pixel including a first pixel electrode, a second sub-pixel including a second pixel electrode, a third sub-pixel including a third pixel electrode, and a fourth sub-pixel including a fourth pixel electrode are provided in a pixel; the first pixel electrode is connected to one of the data signal lines via a first transistor, the second pixel electrode is connected to the one of the data signal lines via a second transistor, and the first transistor and the second transistor are connected to one of the scanning signal lines; the first pixel electrode is connected to the third pixel electrode via a capacitor, and the second pixel electrode is connected to the fourth pixel electrode via a capacitor; one of two storage capacitor wires forms a capacitance with the first pixel electrode, and the other one of the two storage capacitor wires forms a capacitance with the second pixel electrode; and said one of the two storage capacitor wires receives one storage capacitor wire signal, and the other one of the two storage capacitor wires receives another storage capacitor wire signal.

According to the present liquid crystal display device, four sub-pixels provided in a single pixel can be controlled so as to have different brightness during halftone display. As such, for example, in a case where the present liquid crystal display device is applied to a liquid crystal display device of an MVA mode, 16 (4 directions×4 kinds) domains (alignment regions) are formed in a single pixel. This allows an improvement in viewing angle characteristics.

The present liquid crystal display device may be configured such that said one storage capacitor wire signal received by said, one of the two storage capacitor wires and said another storage capacitor wire signal received by the other one of the two storage capacitor wires are level-shifted after the first transistor and the second transistor are turned OFF, said one storage capacitor wire signal being level-shifted by an amount different from said another storage capacitor wire signal.

The present liquid crystal display device may be configured such that said one storage capacitor wire signal and said another storage capacitor wire signal are level-shifted in an identical direction.

The present liquid crystal display device may be configured such that said one storage capacitor wire signal and said another storage capacitor wire signal are level-shifted to a positive side in a case where a signal electric potential supplied to the first pixel electrode and the second pixel electrode is of a positive polarity, and said one storage capacitor wire signal and said another storage capacitor wire signal are level-shifted to a negative side in a case where the signal electric potential supplied to the first pixel electrode and the second pixel electrode is of a negative polarity.

The present liquid crystal display device may be configured such that the pixel is divided into two sections by one of the scanning signal lines which traverses the pixel, the first pixel electrode and the third pixel electrode are disposed in one of the two sections, and the second pixel electrode and the fourth pixel electrode are disposed in the other one of the two sections.

The present liquid crystal display device may be configured such that each of the first pixel electrode and the second pixel electrode is disposed adjacent to said one of the scanning signal lines from a plan view.

The present liquid crystal display device may be configured such that said one of the two storage capacitor wires which receives said one storage capacitor wire signal is provided so as to correspond to a gap between the pixel and another pixel disposed on an upstream side of the pixel in a scanning direction, so that said one of the two storage capacitor wires forms a capacitance with one of the pixel electrodes disposed in the pixel and forms a capacitance with one of pixel electrodes disposed in said another pixel, and the other one of the two storage capacitor wires which receives said another storage capacitor wire signal is provided so as to correspond to a gap between the pixel and another pixel disposed on a downstream side of the pixel in the scanning direction, so that the other one of the two storage capacitor wires forms a capacitance with one of the pixel electrodes disposed in the pixel and forms a capacitance with one of pixel electrodes disposed in said another pixel.

The present liquid crystal display device may be configured such that two storage capacitor wires each of which receives a storage capacitor wire signal are provided per pixel.

The present liquid crystal display device may be configured so as to further include: a first storage capacitor electrode that is electrically connected to the first pixel electrode; and a second storage capacitor electrode that is electrically connected to the second pixel electrode, said one of the two storage capacitor wires which receives said one storage capacitor wire signal overlapping the first storage capacitor electrode, and the other one of the two storage capacitor wires which receives said another storage capacitor wire signal overlapping the second storage capacitor electrode.

The present liquid crystal display device may be configured such that in addition to the two storage capacitor wires which respectively receive said one storage capacitor wire signal and said another storage capacitor wire signal, the storage capacitor wires include two storage capacitor wires which receive respective constant potential signals, one of the two storage capacitor wires which receive the respective constant potential signals forms a capacitance with the third pixel electrode, and the other one of the two storage capacitor wires which receive the respective constant potential signals forms a capacitance with the fourth pixel electrode.

The present liquid crystal display device may be configured so as to further include: a third storage capacitor electrode that is electrically connected to the third pixel electrode; and a fourth storage capacitor electrode that is electrically connected to the fourth pixel electrode, said one of the two storage capacitor wires which receive the respective constant potential signals overlapping the third storage capacitor electrode, and the other one of the two storage capacitor wires which receive the respective constant potential signals overlapping the fourth storage capacitor electrode.

The present liquid crystal display device may be configured such that said one of the two storage capacitor wires which receive the respective constant potential signals overlaps a part of an edge of the third pixel electrode and has a storage capacitor wire extension which extends from said one of the two storage capacitor wires so as to overlap a remaining part of the edge or run around the remaining part of the edge and is merged with said one of the two storage capacitor wires again, and the other one of the two storage capacitor wires which receive the respective constant potential signals overlaps a part of an edge of the fourth pixel electrode and has a storage capacitor wire extension which extends from the other one of the two storage capacitor wires so as to overlap a remaining part of the edge or run around the remaining part of the edge and is merged with the other one of the two storage capacitor wires again.

The present liquid crystal display device may be configured such that said one storage capacitor wire signal and said another storage capacitor wire signal respectively received by the two storage capacitor wires are level-shifted in an identical direction after the first transistor and the second transistor are turned OFF, and $$Vt < VT \leq Vt \times [(Ck+Cj)/Ck]$$

where (i) VT is a level shift amount of one of said one storage capacitor wire signal and said another storage capacitor wire signal, (ii) Vt is a level shift amount of the other one of said one storage capacitor wire signal and said another storage capacitor wire signal, (iii) Ck is a value of each of a coupling capacitance formed between the first pixel electrode and the third pixel electrode and a coupling capacitance formed between the second pixel electrode and the fourth pixel electrode, (iv) Cj is a value of each of liquid crystal capacitances of the first to fourth sub-pixels, and (v) Ch is a value of each of the capacitance formed between said one of the two storage capacitor wires and the first pixel electrode and the capacitance formed between the other one of the two storage capacitor wires and the second pixel electrode.

The present liquid crystal display device may be configured such that said one storage capacitor wire signal and said another storage capacitor wire signal respectively received by the two storage capacitor wires are level-shifted in an identical direction after the first transistor and the second transistor are turned OFF, and $$Vt < VT \leq Vt \times [(Ck+Cj+Ch)/Ck]$$

where (i) VT is a level shift amount of one of said one storage capacitor wire signal and said another storage capacitor wire signal, (ii) Vt is a level shift amount of the other one of said one storage capacitor wire signal and said another storage capacitor wire signal, (iii) Ck is a value of each of a coupling capacitance formed between the first pixel electrode and the third pixel electrode and a coupling capacitance formed between the second pixel electrode and the fourth pixel electrode, (iv) Cj is a value of each of liquid crystal capacitances of the first to fourth sub-pixels, and (v) Ch is a value of each of (a) the capacitance formed between said one of the two storage capacitor wires which receives said one storage capacitor wire signal and the first pixel electrode, (b) the capacitance formed between the other one of the two storage capacitor wires which receives said another storage capacitor wire signal and the second pixel electrode, (c) the capacitance formed between said one of the two storage capacitor wires which receive the respective constant potential signals and the third pixel electrode, and (d) the capacitance formed between the other one of the two storage capacitor wires which receive the respective constant potential signals and the fourth pixel electrode.

The present liquid crystal display device may be configured so as to further include: a first coupling capacitor electrode that is electrically connected to the first pixel electrode; and a second coupling capacitor electrode that is electrically connected to the second pixel electrode, the first coupling capacitor electrode overlapping the third pixel electrode via an interlayer insulating film that is provided below the first to fourth pixel electrodes, and the second coupling capacitor electrode overlapping the fourth pixel electrode via the interlayer insulating film.

The present liquid crystal display device may be configured such that the interlayer insulating film is made thin in at least one part of a portion of the interlayer insulating film which portion overlaps the third pixel electrode and the first coupling capacitor electrode and in at least one part of a portion of the interlayer insulating film which portion overlaps the fourth pixel electrode and the second coupling capacitor electrode.

The present liquid crystal display device may be configured such that the interlayer insulating film includes an inorganic insulating film and an organic insulating film that is thicker than the inorganic insulating film, and the organic insulating film is removed in at least one part of the portion of the interlayer insulating film which portion overlaps the third pixel electrode and the first coupling capacitor electrode and in at least one part of the portion of the interlayer insulating film which portion overlaps the fourth pixel electrode and the second coupling capacitor electrode.

The present liquid crystal display device may be configured such that the first pixel electrode is connected, via a contact hole, to a draw-out wire drawn out from a conductive terminal of the first transistor, and the draw-out wire is connected in an identical layer to the first coupling capacitor electrode, the second pixel electrode is connected, via a contact hole, to a draw-out wire drawn out from a conductive terminal of the second transistor, and the draw-out wire is connected in an identical layer to the second coupling capacitor electrode.

The present liquid crystal display device may be configured such that the first pixel electrode is connected, via a contact hole, to a draw-out wire drawn out from a conductive terminal of the first transistor, and is connected to a relay wire via a contact hole, and the relay wire is connected in an identical layer to the first coupling capacitor electrode, the second pixel electrode is connected, via a contact hole, to a draw-out wire drawn out from a conductive terminal of the second transistor, and is connected to a relay wire via a contact hole, and the relay wire is connected in an identical layer to the second coupling capacitor electrode.

The present liquid crystal display device may be configured such that a gap between the first pixel electrode and the third pixel electrode and a gap between the second pixel electrode and the fourth pixel electrode serve as alignment control structures.

A liquid crystal display device of the present invention is a liquid crystal display device which includes: scanning signal lines; data signal lines; and storage capacitor wires, wherein: a first sub-pixel including a first pixel electrode, a second sub-pixel including a second pixel electrode, a third sub-pixel including a third pixel electrode, and a fourth sub-pixel including a fourth pixel electrode are provided in a pixel; the first pixel electrode is connected to one of the data signal lines via a first transistor, the second pixel electrode is connected to the one of the data signal lines via a second transistor, and the first transistor and the second transistor are connected to one of the scanning signal lines; the first pixel electrode is connected to the third pixel electrode via a capacitor, and the second pixel electrode is connected to the fourth pixel electrode via a capacitor; one of two storage capacitor wires forms a capacitance with each of the first pixel electrode and the third pixel electrode, and the other one of the two storage capacitor wires forms a capacitance with each of the second pixel electrode and the fourth pixel electrode; and the two storage capacitor wires receives one storage capacitor wire signal, and the other one of the two storage capacitor wires receives another storage capacitor wire signal.

According to the present liquid crystal display device, four sub-pixels provided in a single pixel can be controlled so as to have different brightness during halftone display. As such, for example, in a case where the present liquid crystal display device is applied to a liquid crystal display device of an MVA mode, 16 (4 directions×4 kinds) domains (alignment regions) are formed in a single pixel. This allows an improvement in viewing angle characteristics.

The present liquid crystal display device may be configured such that said one storage capacitor wire signal received by said one of the two storage capacitor wires and said another storage capacitor wire signal received by the other one of the two storage capacitor wires are level-shifted after the first transistor and the second transistor are turned OFF, said one storage capacitor wire signal being level-shifted by an amount different from said another storage capacitor wire signal.

The present liquid crystal display device may be configured such that said one storage capacitor wire signal and said another storage capacitor wire signal are level-shifted in an identical direction.

The present liquid crystal display device may be configured such that said one storage capacitor wire signal and said another storage capacitor wire signal are level-shifted to a positive side in a case where a signal electric potential supplied to the first pixel electrode and the second pixel electrode is of a positive polarity, and said one storage capacitor wire signal and said another storage capacitor wire signal are level-shifted to a negative side in a case where the signal electric potential supplied to the first pixel electrode and the second pixel electrode is of a negative polarity.

The present liquid crystal display device may be configured such that said one of the two storage capacitor wires which receives said one storage capacitor wire signal is provided so as to correspond to a gap between the pixel and another pixel disposed on an upstream side of the pixel in a scanning direction, so that said one of the two storage capacitor wires forms a capacitance with one of the pixel electrodes disposed in the pixel and forms a capacitance with one of pixel electrodes disposed in said another pixel, and the other one of the two storage capacitor wires which receives said another storage capacitor wire signal is provided so as to correspond to a gap between the pixel and another pixel disposed on a downstream side of the pixel in the scanning direction, so that the other one of the two storage capacitor wires forms a capacitance with one of the pixel electrodes disposed in the pixel and forms a capacitance with one of pixel electrodes disposed in said another pixel.

The present liquid crystal display device may be configured such that two storage capacitor wires each of which receives a storage capacitor wire signal are provided per pixel.

The present liquid crystal display device may be configured such that in one of two successive frames, one of said storage capacitor wire signal and said another storage capacitor wire signal is level-shifted to a positive side by an amount of VT, and the other one of said one storage capacitor wire signal and said another storage capacitor wire signal is level-shifted to a positive side by an amount of Vt, and in the other one of the two successive frames, said one of said one storage capacitor wire signal and said another storage capacitor wire signal is level-shifted to a negative side by an amount of VT, and the other one of said one storage capacitor wire signal and said another storage capacitor wire signal is level-shifted to a negative side by an amount of Vt.

The present liquid crystal display device may be configured such that in a first frame, one of said one storage capacitor wire signal and said another storage capacitor wire signal is level shifted to a positive side by an amount of VT, and the other one of said one storage capacitor wire signal and said another storage capacitor wire signal is level-shifted to a positive side by an amount of Vt, in a second frame, said one of said one storage capacitor wire signal and said another storage capacitor wire signal is level-shifted to a negative side by an amount of Vt, and the other one of said one storage capacitor wire signal and said another storage capacitor wire signal is level-shifted to a negative side by an amount of VT, in a third frame, said one of said one storage capacitor wire signal and said another storage capacitor wire signal is level-shifted to a positive side by an amount of Vt, and the other one of said one storage capacitor wire signal and said another storage capacitor wire signal is level-shifted to a positive side by an amount of VT, and in a fourth frame, said one of said one storage capacitor wire signal and said another storage capacitor wire signal is level-shifted to a negative side by an amount of VT, and the other one of said one storage capacitor wire signal and said another storage capacitor wire signal is level-shifted to a negative side by an amount of Vt, the first, second, third, and fourth frames being successive frames.

The present television receiver includes: the liquid crystal display device; and a tuner section for receiving television broadcast.

As described above, according to the present liquid crystal display device, four sub-pixels provided in a single pixel can be controlled so as to have different brightness during halftone display. It is therefore possible to improve viewing angle characteristics.

BRIEF DESCRIPTION OF DRAWINGS

FIG. 4 is a timing chart showing another driving method of a liquid crystal display device including the liquid crystal panel of FIG. 1.

FIG. 5 is a view schematically illustrating a display state per frame in a case where the driving method of FIG. 4 is used.

Figure 1:
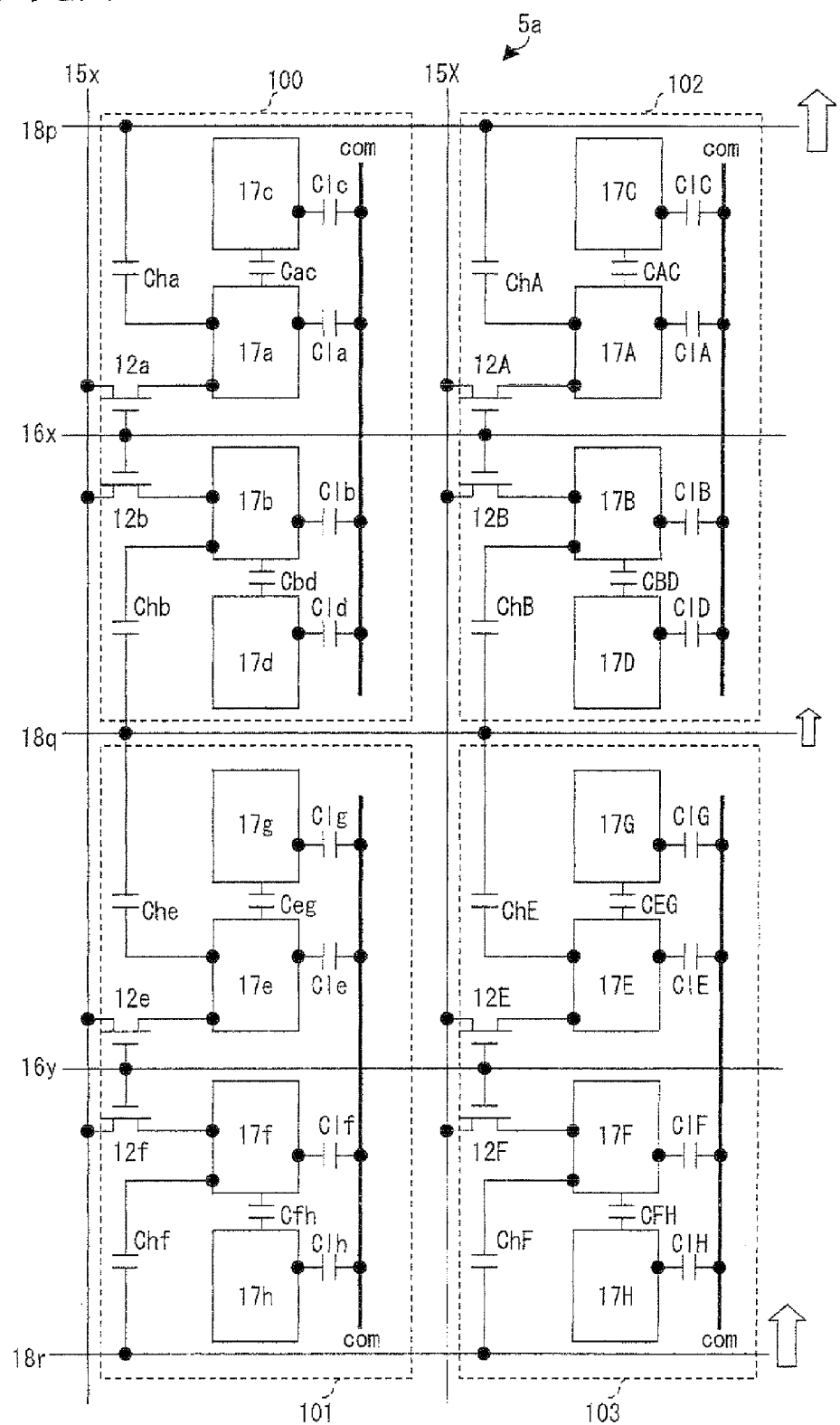
FIG. 1 is a circuit diagram illustrating a configuration of a liquid crystal panel of Embodiment 1.

REFERENCE SIGNS LIST 5a to 5g: Liquid crystal panel
12a, 12b, 12e, 12f: Transistor
12A, 12B, 12E, 12F: Transistor
15x, 15X: Data signal line
16x, 16y: Scanning signal line
17a to 17h: Pixel electrode
17A to 17H: Pixel electrode
18p to 18r: Storage capacitor wire
118p, 218q, 118q, 218r: Storage capacitor wire
22: Inorganic gate insulating film
24: Semiconductor layer
25: Inorganic interlayer insulating film
26: Organic interlayer insulating film
37a, 37b: Coupling capacitor electrode
84: Liquid crystal display unit
100 to 103: Pixel
800: Liquid crystal display device
CSSp, CSSq, CSSr: CS signal (storage capacitor wire signal)
CSSP, CSSQ, CSSR: CS signal (storage capacitor wire signal)

Description of Embodiments

Embodiments of the present invention is described below with reference to FIGS. 1 through 32. For convenience in explanation, a direction in which a scanning signal line extends is denoted as a row direction. However, it is needless to say that the scanning signal line may extend in a horizontal direction or a vertical direction in a used (viewed) state of the present liquid crystal display device (or a liquid crystal panel or active matrix substrate used therein).

[Embodiment 1]

FIG. 1 is an equivalent circuit diagram of one part of a liquid crystal panel of Embodiment 1. As illustrated in FIG. 1, the present liquid crystal panel includes: data signal lines (15x and 15X) that extend in a column direction (vertical direction in FIG. 1); scanning signal lines (16x and 16y) that extend in a row direction (horizontal direction in FIG. 1); pixels (100 to 103) that are aligned in the row and the column directions; storage capacitor wires (18p, 18q, and 18r); and, a common electrode (counter electrode) com. Configurations of the pixels are identical to each other. Note that a pixel column including the pixels 100 and 101 is adjacent to a pixel column including the pixels 102 and 103, and a pixel row including the pixels 100 and 102 is adjacent to a pixel row including the pixels 101 and 103.

In the present liquid crystal panel, one pixel is associated with one data signal line and one scanning signal line, and two pixel rows disposed adjacent in a column direction are associated with one storage capacitor wire for supplying a CS signal. Four pixel electrodes are disposed in a single pixel. Four pixel electrodes 17c, 17a, 17b, and 17d disposed in the pixel 100, and four pixel electrodes 17g, 17e, 17f, and 17h disposed in the pixel 101 are arranged in one line; and four pixel electrodes 17C, 17A, 17B, and 17D disposed in the pixel 102, and four pixel electrodes 17G, 17E, 17F, 17H disposed in the pixel 103 are arranged in one line. The pixel electrodes 17c and 170 are disposed adjacent to each other, the pixel electrodes 17a and 17A are disposed adjacent to each other, the pixel electrodes 17b and 17B are disposed adjacent to each other, the pixel electrodes 17d and 17D are disposed adjacent to each other, the pixel electrodes 17g and 17G are disposed adjacent to each other, the pixel electrodes 17e and 17E are disposed adjacent to each other, the pixel electrodes 17f and 17F are disposed adjacent to each other, and the pixel electrodes 17h and 17H are disposed adjacent to each other, each in the row direction.

In the pixel 100, the pixel electrodes 17a and 17c are connected to each other via a coupling capacitor Cac, and the pixel electrodes 17b and 17d are connected to each other via a coupling capacitor Cbd. The pixel electrode 17a is connected to the data signal line 15x via a transistor 12a that is connected to the scanning signal line 16x, and the pixel electrode 17b is connected to the data signal line 15x via a transistor 12b that is connected to the scanning signal line 16x. Storage capacitance Cha is formed, between the pixel electrode 17a and the storage capacitor wire 18p, and storage capacitance Chb is formed between the pixel electrode 17b and the storage capacitor wire 18q. Note that the storage capacitor wires 18p and 18q are storage capacitor wires for supplying a CS signal. Liquid crystal capacitance Clc is formed between the pixel electrode 17c and the common electrode com, liquid crystal capacitance Cla is formed between the pixel electrode 17a and the common electrode com, liquid crystal capacitance Clb is formed between the pixel electrode 17b and the common electrode com, and liquid crystal capacitance Cld is formed between the pixel electrode 17d and the common electrode com.

Meanwhile, in the pixel 101 disposed adjacent to the pixel 100 in the column direction, the pixel electrodes 17e and 17g are connected to each other via a coupling capacitor Ceg, and the pixel electrodes 17f and 17h are connected to each other via a coupling capacitor Cfh. The pixel electrode 17e is connected to the data signal line 15x via a transistor 12e that is connected to the scanning signal line 16y, and the pixel electrode 17f is connected to the data signal line 15x via a transistor 12f that is connected to the scanning signal line 16y. Storage capacitance Che is formed between the pixel electrode 17e and the storage capacitor wire 18q, and storage capacitance Chf is formed between the pixel electrode 17f and the storage capacitor wire 18r. Note that the storage capacitor wires 18q and 18r are storage capacitor wires for supplying a CS signal. Liquid crystal capacitance Clg is formed between the pixel electrode 17g and the common electrode com, liquid crystal capacitance Cle is formed between the pixel electrode 17e and the common electrode com, liquid crystal capacitance Clf is formed between the pixel electrode 17f and the common electrode com, and liquid crystal capacitance Clh is formed between the pixel electrode 17h and the common electrode com.

Moreover, in the pixel 102 disposed adjacent to the pixel 100 in the row direction, the pixel electrodes 17A and 17C are connected to each other via a coupling capacitor CAC, and the pixel electrodes 17B and 17D are connected to each other via a coupling capacitor CBD. The pixel electrode 17A is connected to the data signal line 15X via a transistor 12A that is connected to the scanning signal line 16x, and the pixel electrode 17B is connected to the data signal line 15X via a transistor 12B that is connected to the scanning signal line 16x. Storage capacitance ChA is formed between the pixel electrode 17A and the storage capacitor wire 18p, and storage capacitance ChB is formed between the pixel electrode 17B and the storage capacitor wire 18q. Liquid crystal capacitance ClC is formed between the pixel electrode 17C and the common electrode com, liquid crystal capacitance ClA is formed between the pixel electrode 17A and the common electrode com, liquid crystal capacitance ClB is formed between the pixel electrode 17B and the common electrode com, and liquid crystal capacitance ClD is formed between the pixel electrode 17D and the common electrode com.

Figure 2:
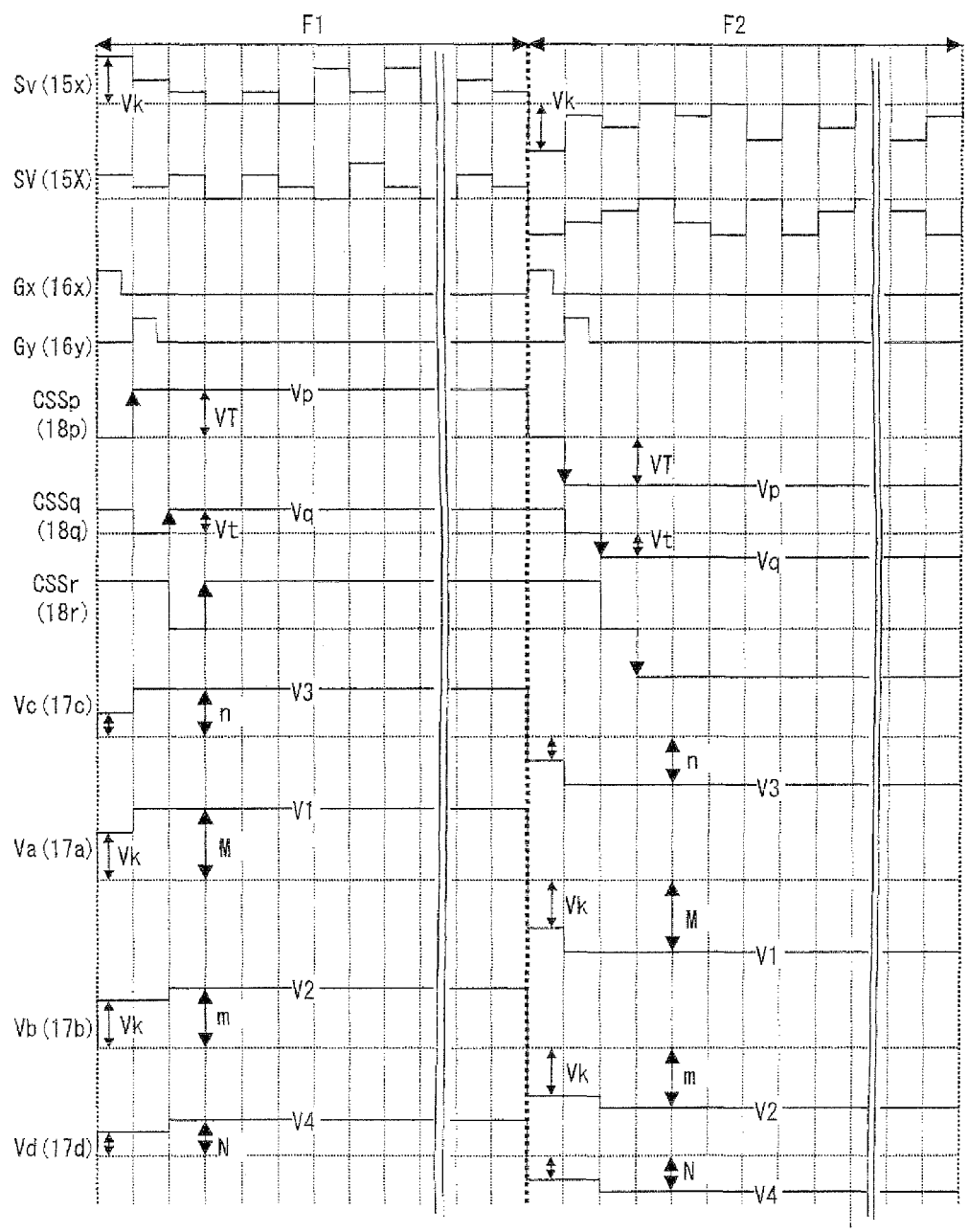
FIG. 2 is a timing chart showing a driving method of a liquid crystal display device including the liquid crystal panel of FIG. 1.

FIG. 2 is a timing chart showing a driving method of a liquid crystal display device (normally black mode) including the liquid crystal panel of FIG. 1. Sv and SV are signal electric potentials supplied to the data signal lines 15x and 15X, respectively; Gx and Gy are gate on-pulse signals to be supplied to the scanning signal lines 16x and 16y, respectively; CSSp, CSSq, and CSSr are CS signals (storage capacitor wire signals) supplied to the storage capacitor wires 18p, 18q, and 18r, respectively; and Va to Vd are electric potentials of respective four pixel electrodes 17a to 17d disposed in the pixel 100.

As shown in FIGS. 1 and 2, in the present liquid crystal display device, the storage capacitor wire 18p of the two storage capacitor wires 18p and 18q forms a storage capacitance with the pixel electrode 17a (first pixel electrode) that is connected to the data signal line 15x via the transistor 12a (first transistor), and the storage capacitor wire 18q forms a storage capacitance with the pixel electrode 17b (second pixel electrode) that is connected to the data signal line 15x via the transistor 12b (second transistor). Different CS signals are supplied to these two storage capacitor wires 18p and 18q, respectively. Note that the scanning signal lines are sequentially selected so that (i) a polarity of a signal electric potential supplied to each data signal line is inverted per one vertical scanning period (1 frame) and (ii) signal electric potentials of an identical polarity are supplied to the two adjacent data signal lines during a single horizontal scanning period.

Specifically, the CS signal CSSp supplied to the storage capacitor wire 18p and the CS signal CSSq supplied to the storage capacitor wire 18q are kept at the substantially same level during a period in which the transistor 12a and 12b are being turned ON (an active period of Gx). After the transistors 12a and 12b are turned OFF, the CS signal CSSp and the CS signal CSSq are level-shifted in an identical direction, but are different in a level-shift amount. In a frame in which a signal electric potential supplied to the pixel electrodes 17a and 17b is of a positive polarity, the two CS signals (CSSp and CSSq) are level-shifted to a positive side, and in a frame in which the signal electric potential supplied to the pixel electrodes 17a and 17b is of a negative polarity, the two CS signals (CSSp and CSSq) are level-shifted to a negative side.

Since v1=v2=V and vp=vq=0 (Vcom), the following equations 1 to 4 are obtained in accordance with a law of conservation of charge of the pixel electrodes 17a to 17d.

$$Cj \times V + Ch \times V + Ck \times (V-v3) = q1 \quad \text{equation 1}$$

$$Cj \times V + Ch \times V + Ck \times (V-v4) = q2 \quad \text{equation 2}$$

$$Cj \times v3 - Ck \times (V-v3) = q3 = 0 \quad \text{equation 3}$$

$$Cj \times v4 - Ck \times (V-v4) = q4 = 0 \quad \text{equation 4}$$

where (i) V is the signal electric potential supplied to the pixel electrodes 17a and 17b, (ii) Cla=Clb=Clc=Cld=Cj, Cac=Cbd=Ck, and Cha=Chb=Ch in FIG. 1, (iii) v1 to v4 are electric potentials of the pixel electrodes 17a to 17d achieved when the transistors 12a and 12b are turned OFF, (iv) vp and vq are levels of the CS signals CSSp and CSSq achieved when the transistors 12a and 12b are turned OFF, (v) q1 to q4 are total charge amounts of the pixel electrodes 17a to 17d achieved when the transistors 12a and 12b are turned OFF. Moreover, since the levels of the CS signals CSSp and CSSq are shifted to Vp and Vq, respectively after the transistor 12a and 12b are turned OFF, the following equations 5 to 9 are obtained in accordance with the law of conservation of charge of the pixel electrodes 17a to 17d.

$$Cj \times V1 + Ch \times (V1-Vp) + Ck \times (V1-V3) = q1 \quad \text{equation 5}$$

$$Cj \times V2 + Ch \times (V2-Vq) + Ck \times (V2-V4) = q2 \quad \text{equation 6}$$

$$Cj \times V3 - Ck \times (V1-V3) = q3 = 0 \quad \text{equation 7}$$

$$Cj \times V4 - Ck \times (V2-V4) = q4 = 0 \quad \text{equation 8}$$

where V1 to V4 are electric potentials of the pixel electrodes 17a to 17d achieved after the transistor 12a and 12b are turned OFF.

The following equation can be obtained from the equations 3 and 4:

$$v3 = v4 = V \times [Ck/(Ck+Cj)]$$

The following equations can be obtained from the equations 1, 3, 5 and 7:

$$V1 = V + Vp \times \{[Ch \times (Ck+Cj)]/\alpha\}$$

$$V3 = V \times [Ck/(Ck+Cj)] + Vp \times [(Ch \times Ck)/\alpha]$$

where $\alpha = Ck \times Ch + 2 \times Ck \times Cj + Cj \times Ch + Cj^2$

Moreover, the following equations can be obtained from the equations 2, 4, 6 and 8:

$$V2 = V + Vq \times \{[Ch \times (Ck+Cj)]/\alpha\}$$

$$V4 = V \times [Ck/(Ck+Cj)] + Vq \times [(Ch \times Ck)/\alpha]$$

In a frame 1 (F1) shown in FIG. 2, the CS signal CSSp is level-shifted to a positive side by an amount of VT, and the CS signal CSSq is level-shifted to a positive side by an amount of Vt which is smaller than VT. Since V=+Vk≧0 and Vp=+VT>Vq=+Vt>0, the following equations can be obtained:

$$V1 = +Vk + VT \times \{[Ch \times (Ck+Cj)]/\alpha\}$$

$$V3 = +Vk \times [Ck/(Ck+Cj)] + VT \times [(Ch \times Ck)/\alpha]$$

$$V2 = +Vk + Vt \times \{[Ch \times (Ck+Cj)]/\alpha\}$$

$$V4 = +Vk \times [Ck/(Ck+Cj)] + Vt \times [(Ch \times Ck)/\alpha]$$

That is, V1≧V2≧V4 and V1≧V3 are satisfied.

Figure 3:
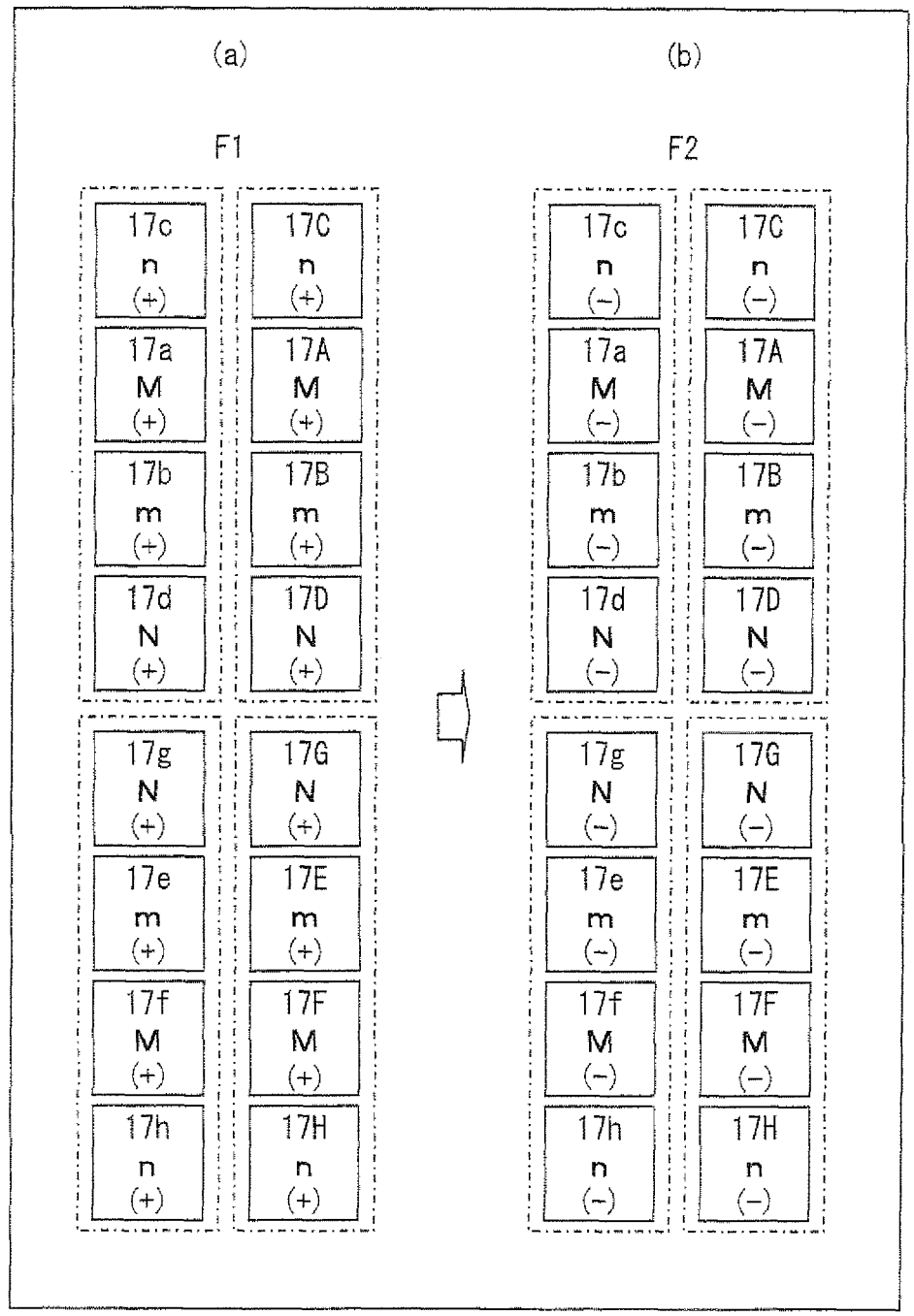
FIG. 3 is a view schematically illustrating a display state per frame in a case where the driving method of FIG. 2 is used.

Since V2−V3=Vk×[Cj/(Ck+Cj)]+(Ch/α)×[Vt×(Ck+Cj)−VT×Ck], V1≧V2≧V3≧V4 can be satisfied as in FIG. 2 regardless of a value of Vk, as long as Vt×(Ck+Cj)−VT×Ck≧0⇔VT≦Vt×[(Ck+Cj)/Ck]. As a result, when a halftone is displayed, a sub-pixel including the pixel electrode 17a (positive polarity) becomes a super-high-brightness sub-pixel (abbreviated as M), a sub-pixel including the pixel electrode 17b (positive polarity) becomes a high-brightness sub-pixel (abbreviated as m), a sub-pixel including the pixel electrode 17c (positive polarity) becomes a low-brightness sub-pixel (abbreviated as n), and a sub-pixel including the pixel electrode 17d (positive polarity) becomes a super-low-brightness sub-pixel (abbreviated as N). That is, the halftone is displayed in the pixels 101 to 103 as shown in FIG. 3 (a).

In a frame 2 (F2) shown in FIG. 2, the CS signal CSSp is level-shifted to a negative side by an amount of VT, and the CS signal CSSq is level-shifted to a negative side by an amount of Vt which is smaller than VT. Moreover, V=−Vk≦0 and Vp=−VT<Vq=−Vt<0. As such, the following equations can be obtained:

$$V1 = -Vk - VT \times \{[Ch \times (Ck+Cj)]/\alpha\}$$

$$V3 = -Vk \times [Ck/(Ck+Cj)] - VT \times [(Ch \times Ck)/\alpha]$$

$$V2 = -Vk - Vt \times \{[Ch \times (Ck+Cj)]/\alpha\}$$

$$V4 = -Vk \times [Ck/(Ck+Cj)] - Vt \times [(Ch \times Ck)/\alpha]$$

That is, V1≦V2≦V4 and V1≦V3 are satisfied.

Since V2−V3=−Vk×[Cj/(Ck+Cj)]−(Ch/α)×[Vt×(Ck+Cj)−VT×Ck], V2≦V3 can be satisfied (i.e., V1≦V2≦V3≦V4 can be satisfied as in FIG. 2) regardless of a value of Vk, as long as VT≦Vt×[(Cj+Ck)/Ck]. As a result, when a halftone is displayed, a sub-pixel including the pixel electrode 17a (negative polarity) becomes a super-high-brightness sub-pixel, a sub-pixel including the pixel electrode 17b (negative polarity) becomes a high-brightness sub-pixel, a sub-pixel including the pixel electrode 17c (negative polarity) becomes a low-brightness sub-pixel, and a sub-pixel including the pixel electrode 17d (negative polarity) becomes a super-low-brightness sub-pixel. That is, the halftone is displayed in the pixels 101 to 103 as shown in FIG. 3 (b).

Figure 6:
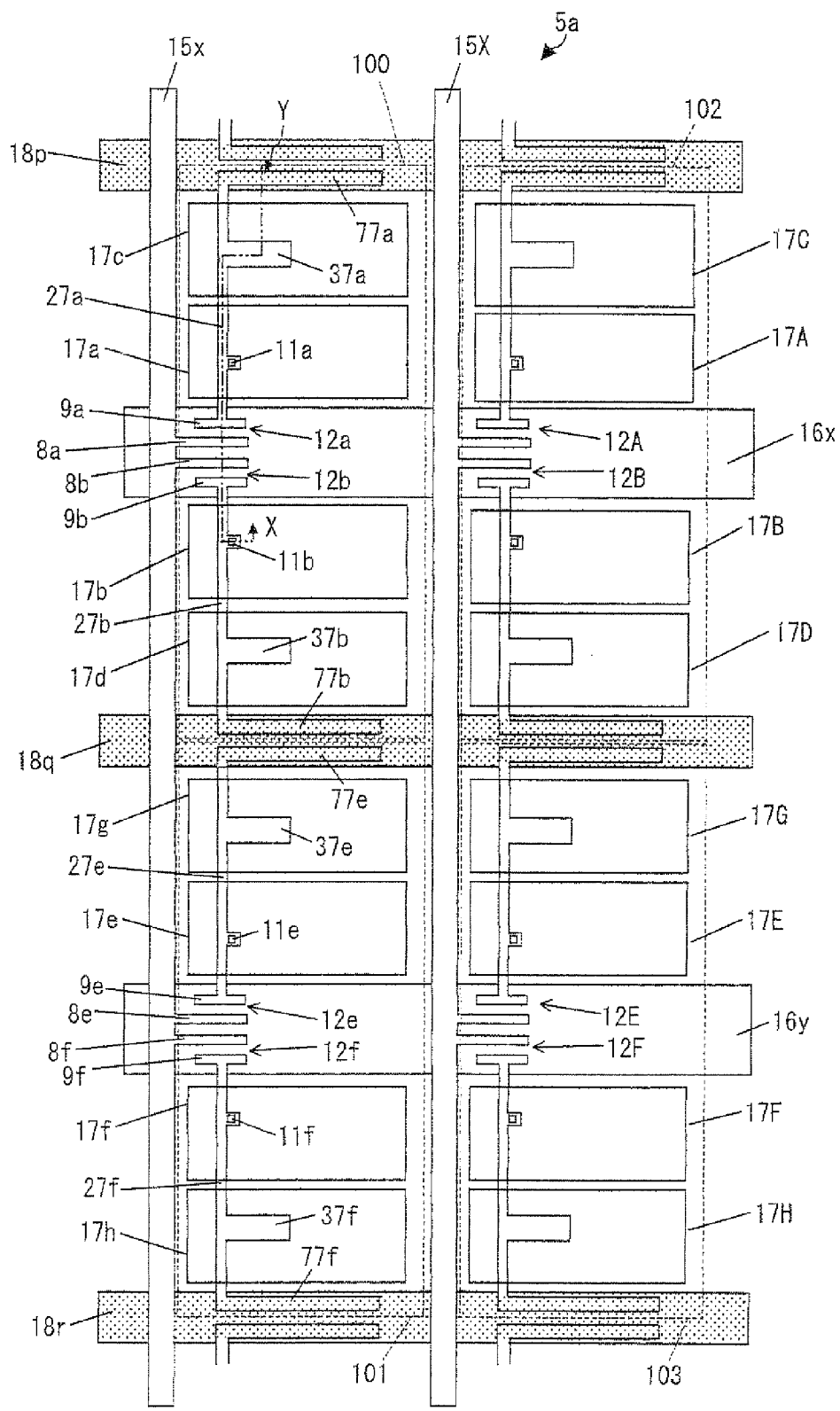
FIG. 6 is a plan view illustrating a specific example of the liquid crystal panel of Embodiment 1.

FIG. 6 illustrates one specific example of the present liquid crystal panel. In the liquid crystal panel 5a illustrated in FIG. 6, each pixel is divided into two sections (regions) by a scanning signal line traversing the pixel. In one of the two sections, (i) a first pixel electrode connected to a transistor and (ii) a second pixel electrode connected to the first pixel electrode via a capacitor are disposed so that the first pixel electrode is disposed adjacent to the scanning signal line. In the other one of the two sections, (i) a first pixel electrode connected to a transistor and (ii) a second pixel electrode connected to the first pixel electrode via a capacitor are disposed so that the first pixel electrode is disposed adjacent to the scanning signal line. One storage capacitor wire for supplying a CS signal is associated with two adjacent pixel rows.

Specifically, the data signal line 15x is provided parallel to the pixels 100 and 101, and the data signal line 15X is provided parallel to the pixels 102 and 103. The scanning signal line 16x traverses a mid part of the pixel 100 and a mid part of the pixel 102, and the scanning signal line 16y traverses a mid part of the pixel 101 and a mid part of the pixel 103. The storage capacitor wire 18p is disposed so as to overlap a pixel row including the pixels 100 and 102 and a pixel row disposed, in FIG. 6, above the pixel row including the pixels 100 and 102; the storage capacitor wire 18q is disposed so as to overlap the pixel row including the pixels 100 and 102 and a pixel row including the pixels 101 and 103; and the storage capacitor wire 18r is disposed so as to overlap the pixel row including the pixels 101 and 103 and a pixel row disposed, in FIG. 6, below the pixel row including the pixels 101 and 103. As to the pixel 100 for example, in one section disposed, in FIG. 6, above the scanning signal line 16x traversing the mid part of the pixel 100, the rectangular-shaped pixel electrode 17a connected to the transistor 12a is disposed adjacent to the scanning signal line 16x and the rectangular-shaped pixel electrode 17c connected to the pixel electrode 17a via a capacitor is disposed adjacent to one of two edges of the pixel 100, which two edges run along the row direction. In the other section disposed, in FIG. 6, below the scanning signal line 16x, the rectangular-shaped pixel electrode 17b connected to the transistor 12b is disposed adjacent to the scanning signal line 16x and the rectangular-shaped pixel electrode 17d connected to the pixel electrode 17b via a capacitor is disposed adjacent to the other one of the two edges of the pixel 100, which two edges run along the row direction.

A source electrode 8a and a drain electrode 9a of the transistor 12a and a source electrode 8b and a drain electrode 9b of the transistor 12b are provided on the scanning signal line 16x. The source electrode 8a is connected to the data signal line 15x. The drain electrode 9a is connected to a drain draw-out wire 27a. The drain draw-out wire 27a is connected to a coupling capacitor electrode 37a formed in an identical layer to the drain draw-out wire 27a, and is connected to the pixel electrode 17a via a contact hole 11a. The coupling capacitor electrode 37a overlaps the pixel electrode 17c via an interlayer insulating film. As a result, the coupling capacitor Cac (see FIG. 1) between the pixel electrodes 17a and 17c is formed. Moreover, the source electrode 8b is connected to the data signal line 15x. The drain electrode 9b is connected to a drain draw-out wire 27b. The drain draw-out wire 27b is connected to a coupling capacitor electrode 37b formed in an identical layer to the drain draw-out wire 27b, and is connected to the pixel electrode 17b via a contact hole 11b. The coupling capacitor electrode 37b overlaps the pixel electrode 17d via the interlayer insulating film. As a result, the coupling capacitor Cbd (see FIG. 1) between the pixel electrodes 17b and 17d is formed.

Further, the drain draw-out wire 27a is connected to a storage capacitor electrode 77a formed in an identical layer to the drain draw-out wire 27a. The storage capacitor electrode 77a is formed so as to overlap the storage capacitor wire 18p. As a result, a large part of the storage capacitance Cha (see FIG. 1) is formed at a part at which the storage capacitor electrode 77a overlaps the storage capacitor wire 18p. Further, the drain draw-out wire 27b is connected to a storage capacitor electrode 77b formed in an identical layer to the drain draw-out wire 27b. The storage capacitor electrode 77b is formed so as to overlap the storage capacitor wire 18q. As a result, a large part of the storage capacitance Chb (see FIG. 1) is formed at a part at which the storage capacitor electrode 77b overlaps the storage capacitor wire 18q.

As to the pixel 101, in one section disposed, in FIG. 6, above the scanning signal line 16y traversing the mid part of the pixel 101, the rectangular-shaped pixel electrode 17e connected to the transistor 12e is disposed adjacent to the scanning signal line 16y and the rectangular-shaped pixel electrode 17g connected to the pixel electrode 17e via a capacitor is disposed adjacent to one of two edges of the pixel 101, which two edges run along the row direction. In the other section disposed, in FIG. 6, below the scanning signal line 16y, the rectangular-shaped pixel electrode 17f connected to the transistor 12f is disposed adjacent to the scanning signal line 16y and the rectangular-shaped pixel electrode 17h connected to the pixel electrode 17f via a capacitor is disposed adjacent to the other one of the two edges of the pixel 101, which two edges run along the row direction. A source electrode 8e and a drain electrode 9e of the transistor 12e and a source electrode 8f and a drain electrode 9f of the transistor 12f are provided on the scanning signal line 16y. The source electrode 8e is connected to the data signal line 15x. The drain electrode 9e is connected to a drain draw-out wire 27e. The drain draw-out wire 27e is connected to a coupling capacitor electrode 37e formed in an identical layer to the drain draw-out wire 27e, and is connected to the pixel electrode 17e via a contact hole 11e. The coupling capacitor electrode 37e overlaps the pixel electrode 17g via the interlayer insulating film. As a result, the coupling capacitor Ceg (see FIG. 1) between the pixel electrodes 17e and 17g is formed. Moreover, the source electrode 8f is connected to the data signal line 15x. The drain electrode 9f is connected to a drain draw-out wire 27f. The drain draw-out wire 27f is connected to a coupling capacitor electrode 37f formed in an identical layer to the drain draw-out wire 27f, and is connected to the pixel electrode 17f via a contact hole 11f. The coupling capacitor electrode 37f overlaps the pixel electrode 17h via the interlayer insulating film. As a result, the coupling capacitor Cfh (see FIG. 1) between the pixel electrodes 17f and 17h is formed.

Further, the drain draw-out wire 27e is connected to a storage capacitor electrode 77e formed in an identical layer to the drain draw-out wire 27e. The storage capacitor electrode 77e is formed so as to overlap the storage capacitor wire 18q. As a result, a large part of the storage capacitance Che (see FIG. 1) is formed at a part at which the storage capacitor electrode 77e overlaps the storage capacitor wire 18q. Further, the drain draw-out wire 27f is connected to a storage capacitor electrode 77f formed in an identical layer to the drain draw-out wire 27f. The storage capacitor electrode 77f is formed so as to overlap the storage capacitor wire 18r. As a result, a large part of the storage capacitance Chf (see FIG. 1) is formed at a part at which the storage capacitor electrode 77f overlaps the storage capacitor wire 18r.

Figure 7:
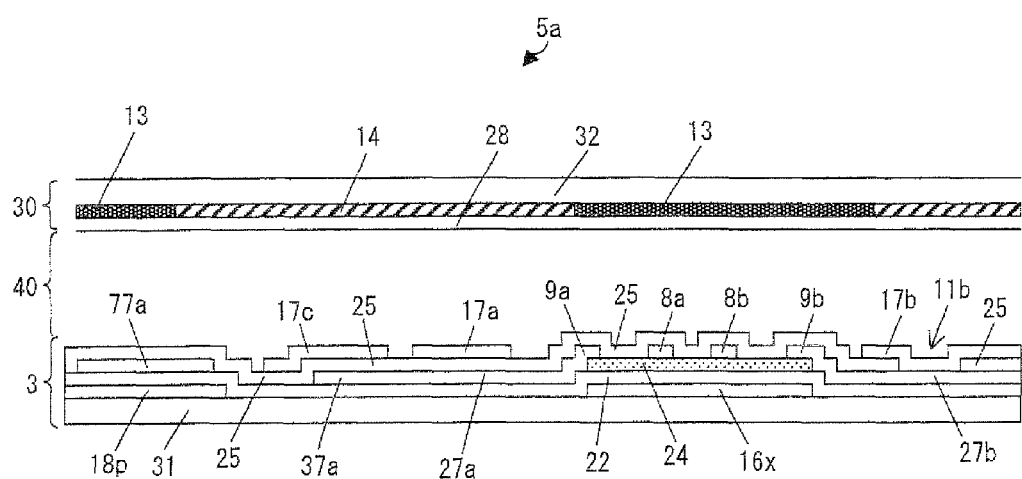
FIG. 7 is a cross-sectional view taken on line X-Y of FIG. 6.
Figure 8:
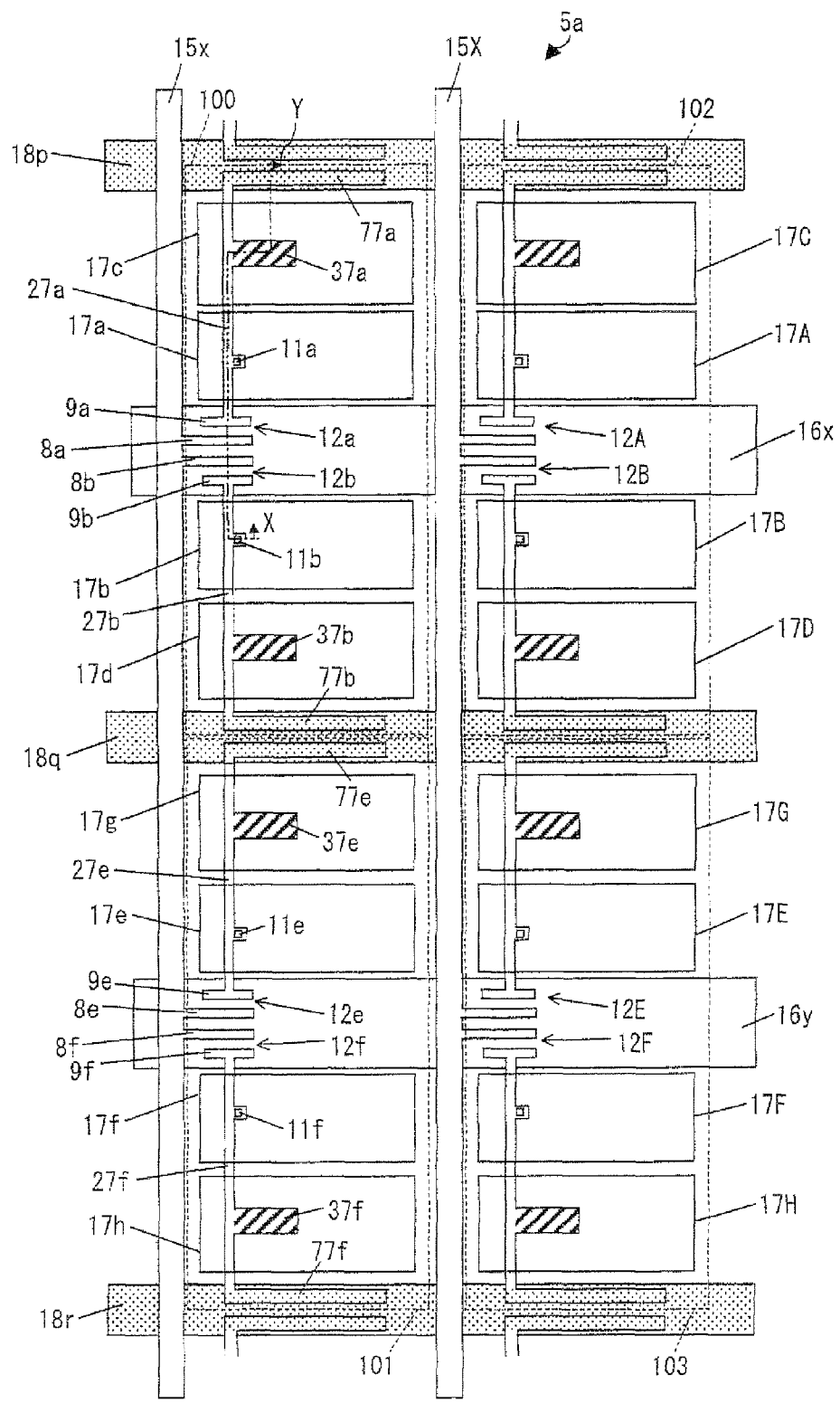
FIG. 8 is a plan view illustrating another specific example of the liquid crystal panel of Embodiment 1.

FIG. 7 is a cross-sectional view taken on X-Y in FIG. 6. As illustrated in FIG. 7, the liquid crystal panel 5a includes an active matrix substrate 3, a color filter substrate 30 facing the active matrix substrate 3, and a liquid crystal layer 40 sandwiched between the two substrates (3 and 30).

The active matrix substrate 3 has the scanning signal line 16x and the storage capacitor wire 18p provided on a glass substrate 31, and on these members, an inorganic gate insulating film 22 is provided so as to cover these members. On the inorganic gate insulating film 22, (i) a semiconductor layer 24 (i layer and n+ layer), (ii) the source electrodes 8a and 8b and the drain electrodes 9a and 9b, each of which is in contact with the n+ layer, (iii) the drain draw-out wires 27a and 27b, (iv) the coupling capacitor electrode 37a, and (v) the storage capacitor electrode 77a are provided. Further, an inorganic interlayer insulating film 25 is formed thereon so as to cover these members. The pixel electrodes 17a, 17b, and 17c are formed on the inorganic interlayer insulating film 25, and further an alignment film (not illustrated) is formed so as to cover these members (pixel electrodes 17a to 17c). In the embodiment, the inorganic interlayer insulating film 25 is hollowed out at the contact hole lib, thereby allowing connection of the pixel electrode 17b and the drain draw-out wire 27b. Moreover, the coupling capacitor electrode 37a connected in an identical layer to the drain draw-out wire 27a overlaps the pixel electrode 17c via the inorganic interlayer insulating film 25. As a result, the coupling capacitor Cac (see FIG. 1) is formed. Moreover, the storage capacitor electrode 77a connected in an identical layer to the drain draw-out wire 27a overlaps the storage capacitor wire 18p via the inorganic gate insulating film 22. This forms a large part of the storage capacitance Cha (see FIG. 1) at a part at which the storage capacitor electrode 77a overlaps the storage capacitor wire 18p.

Meanwhile, a color filter substrate 30 includes a black matrix 13 and a colored layer 14 provided on a glass substrate 32. A common electrode (com) 28 is provided on an upper layer of the black matrix 13 and the colored layer 14. Further, an alignment film (not illustrated) is formed on the common electrode 28 so as to cover the common electrode (com) 28.

According to the present liquid crystal display device, four sub-pixels provided in a single pixel can be controlled so as to have different brightness from one another during a halftone display. In a case where the present liquid crystal display device is applied to a liquid crystal display device of an MVA mode for example, 16 (4 directions×4 types) domains (alignment regions) are formed in a single pixel. This allows an improvement in viewing angle characteristics. Moreover, according to the present liquid crystal display device, a bright sub-pixel (M or m in FIG. 12) in one pixel is not disposed adjacent to a bright sub-pixel in the other pixel. This allows more natural display as compared to a liquid crystal display device in which a bright sub-pixel in one pixel is disposed adjacent to a bright sub-pixel in the other pixel. Moreover, one storage capacitor wire for supplying a CS signal is associated with two pixel rows (i.e., this storage capacitor wire is shared by two pixels that are adjacent in the column direction). This allows a reduction in the number of storage capacitor wires for supplying a CS signal, thereby reducing the number of CS signals. As such, a configuration of a CS control circuit can be simplified, and a pixel aperture ratio can be increased.

Figure 9:
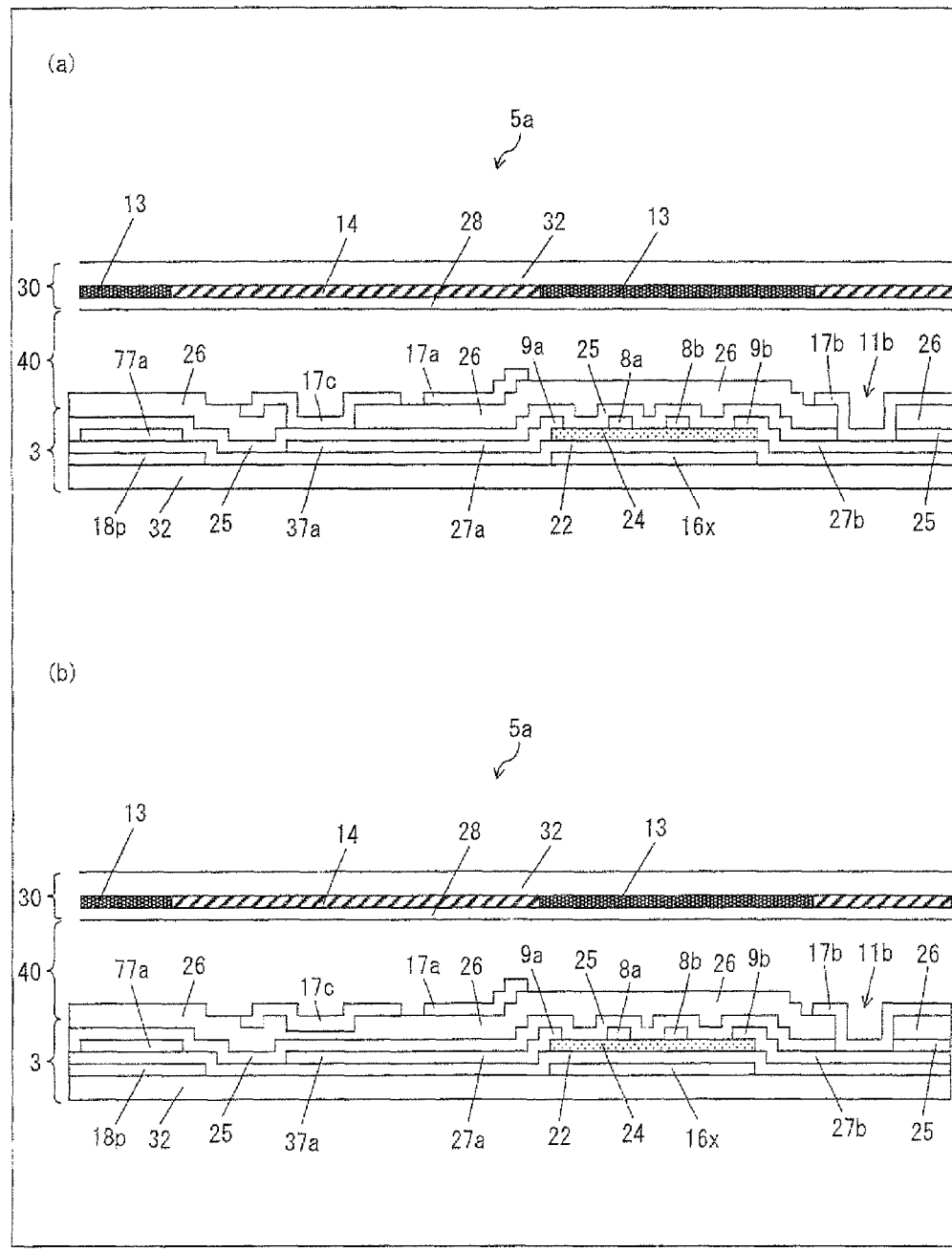
In FIG. 9, (a) and (b) are cross-sectional views taken on line X-Y of FIG. 8.

In the liquid crystal panel 5a of FIG. 6, the interlayer insulating film can have a two-layer structure of an inorganic interlayer insulating film and an organic interlayer insulating film that is thicker than the inorganic interlayer insulating film. This configuration can provide effects of reducing various parasitic capacitances, preventing short-circuiting of wires, reducing a split of a pixel electrode caused by planarization, and the like. In this case, the organic interlayer insulating film 26 is preferably hollowed out in a part where the organic interlayer insulating film 26 overlaps a coupling capacitor electrode (e.g., 37a), as illustrated in the diagonal-lined portions of FIG. 8 and in FIG. 9 (a) which is a cross-sectional view taken on X-Y in FIG. 8. Note that the organic interlayer insulating film 26 need not necessarily to be completely hollowed out, and it is therefore possible that the organic interlayer insulating film 26 is just locally thinned in the part which overlaps the coupling capacitor electrode, as illustrated in FIG. 9 (b). This configuration can provide the above effects while securing sufficient coupling capacitance value and storage capacitance value.

The inorganic interlayer insulating film 25, organic interlayer insulating film 26, and contact hole 11b illustrated in FIGS. 9 (a) and 9 (b) may be formed by a method as follows. Namely, after the transistors (TFTs) and data signal lines are formed, an inorganic interlayer insulating film 25 (passivation film) made of SiNx having a thickness of approximately 3000 Å is formed by CVD with use of a mixed gas of $SiH_4$ gas, $NH_3$ gas and $N_2$ gas, so that the inorganic interlayer insulating film 25 covers an entire substrate surface. Thereafter, an organic interlayer insulating film 26 made of positive-type photosensitive acrylic resin is formed by spin coating or die coating, so as to have a thickness of approximately 3 μm. Subsequently, the hollowed part in the organic interlayer insulating film 26 and, various contact patterns are formed by performing photolithography. Furthermore, the organic interlayer insulating film 26 that is patterned is used as a mask to dry etch the inorganic interlayer insulating film 25, by use of a mixed gas of $CF_4$ gas and $O_2$ gas. Specifically, as for the hollowed part of the organic interlayer insulating film, a half exposure process is carried out in the photolithography step so that a thin film of the organic interlayer insulating film remains at the time of completion of development. As for the contact hole parts, a full exposure process is carried out in the photolithography step so that no organic interlayer insulating film remains at the time of completion of development. Here, the dry etching by use of the mixed gas of $CF_4$ gas and $O_2$ gas completely or partially removes the remaining film (of the organic interlayer insulating film) in the hollowed part of the organic interlayer insulating film and removes the inorganic interlayer insulating film provided below the organic interlayer insulating film in the contact hole parts. The organic interlayer insulating film 26 may be an insulating film made of SOG (spin-on glass) material, for example, and the organic interlayer insulating film 26 may include at least one of acrylic resin, epoxy resin, polyimide resin, polyurethane resin, novolac resin, and siloxane resin.

In the liquid crystal display device driving method of FIG. 2, Vp=+VT and Vq=+Vt in an odd-numbered frame, Vp=−VT and Vq=−Vt in an even-numbered frame. However, the present embodiment is not limited to this. For example, it is also possible that (i) Vp=+VT and Vq=+Vt in a (4n+1)th frame (n is an integer not less than 0), (ii) Vp=−Vt and Vq=−VT in a (4n+2)th frame, (iii) Vp=+Vt and Vq=+VT in a (4n+3)th frame (n is an integer not less than 0), and (iv) Vp=−VT and Vq=−Vt in a (4n+3)th frame (n is an integer not less than 0). In the present embodiment, it is assumed that a waveform of the CS signal (CSSr) supplied to the storage capacitor wire 18r is identical to that of the CSSp.

In this case, in the (4n+1)th frame, a sub-pixel including the pixel electrode 17a (positive polarity) becomes a super-high-brightness sub-pixel (M), a sub-pixel including the pixel electrode 17b (positive polarity) becomes a high-brightness sub-pixel (m), a sub-pixel including the pixel electrode 17c (positive polarity) becomes a low-brightness sub-pixel (n), and a sub-pixel including the pixel electrode 17d (positive polarity) becomes a super-low-brightness sub-pixel (N) during a halftone display. That is, the halftone is displayed in the pixels 100 to 103 as shown in FIG. 5 (a). Further, in the (4n+2)th frame, a sub-pixel including the pixel electrode 17a (negative polarity) becomes a high-brightness sub-pixel (m), a sub-pixel including the pixel electrode 17b (negative polarity) becomes a super-high-brightness sub-pixel (M), a sub-pixel including the pixel electrode 17c (negative polarity) becomes a super-low-brightness sub-pixel (N), and a sub-pixel including the pixel electrode 17d (negative polarity) becomes a low-brightness sub-pixel (n) during a halftone display. That is, the halftone is displayed in the pixels 100 to 103 as shown in FIG. 5 (b). Further, in the (4n+3)th frame, a sub-pixel including the pixel electrode 17a (positive polarity) becomes a high-brightness sub-pixel (m), a sub-pixel including the pixel electrode 17b (positive polarity) becomes a super-high-brightness sub-pixel (M), a sub-pixel including the pixel electrode 17c (positive polarity) becomes a super-low-brightness sub-pixel (N), and a sub-pixel including the pixel electrode 17d (positive polarity) becomes a low-brightness sub-pixel (n) during a halftone display. That is, the halftone is displayed in the pixels 100 to 103 as shown in FIG. 5 (c). Further, in the (4n+4)th frame, a sub-pixel including the pixel electrode 17a (negative polarity) becomes a super-high-brightness sub-pixel (M), a sub-pixel including the pixel electrode 17b (negative polarity) becomes a high-brightness sub-pixel (m), a sub-pixel including the pixel electrode 17c (negative polarity) becomes a low-brightness sub-pixel (n), and a sub-pixel including the pixel electrode 17d (negative polarity) becomes a super-low-brightness sub-pixel (N) during a halftone display. That is, the halftone is displayed in the pixels 100 to 103 as shown in FIG. 5 (d). The above configuration thus allows positions of the super-high-brightness sub-pixel (M) and the high-brightness sub-pixel (m) to be exchanged with each other, and allows positions of the super-low-brightness sub-pixel (N) and the low-brightness sub-pixel (n) to be exchanged with each other. This allows a further improvement in viewing angle characteristics.

[Embodiment 2]

Figure 10:
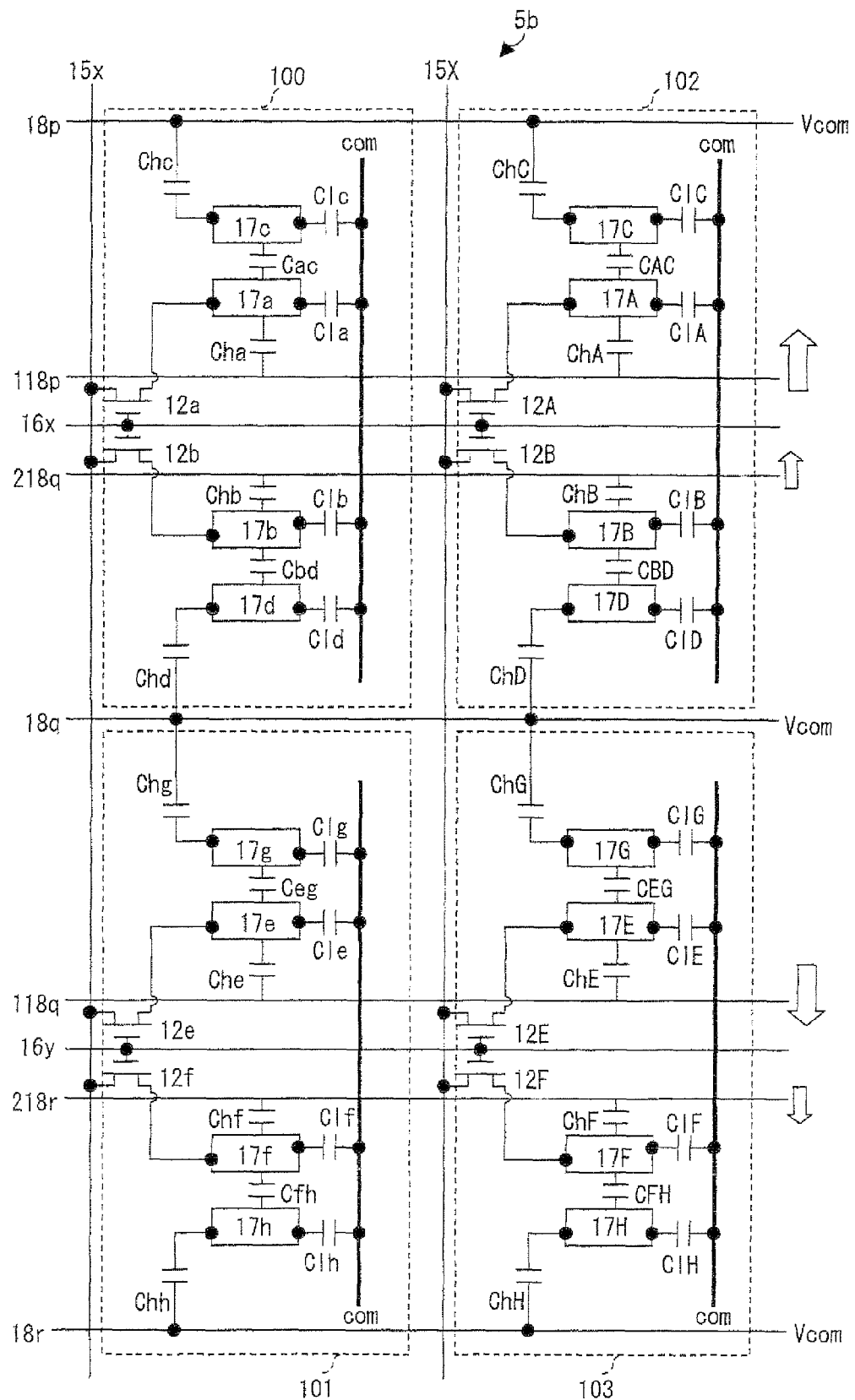
FIG. 10 is a circuit diagram illustrating a configuration of a liquid crystal panel of Embodiment 2.

FIG. 10 is an equivalent circuit diagram of one part of a liquid crystal panel of Embodiment 2. As illustrated in FIG. 10, in the present liquid crystal panel, one storage capacitor wire (storage capacitor wire 18p, for example) for supplying a constant potential (Vcom) signal is associated with two pixels that are adjacent in a column direction, and, two storage capacitor wires (storage capacitor wires 118p and 218q, for example) for supplying a CS signal are associated with one pixel. Data signal lines, scanning signal lines, transistors, and pixel electrodes are disposed in a similar manner to FIG. 1.

In the pixel 100, pixel electrodes 17a and 17c are connected to each other via a coupling capacitor Cac, and pixel electrodes 17b and 17d are connected to each other via a coupling capacitor Cbd. The pixel electrode 17a is connected to a data signal line 15x via a transistor 12a that is connected to a scanning signal line 16x, and the pixel electrode 17b is connected to the data signal line 15x via a transistor 12b that is connected to the scanning signal line 16x. Storage capacitance Chc is formed between the pixel electrode 17c and the storage capacitor wire 18p, storage capacitance Cha is formed between the pixel electrode 17a and the storage capacitor wire 118p, storage capacitance Chb is formed between the pixel electrode 17b and the storage capacitor wire 218q, and storage capacitance Chd is formed between the pixel electrode 17d and the storage capacitor wire 18q. Note that the storage capacitor wires 18p and 18q are storage capacitor wires for supplying a constant potential (Vcom) signal, and the storage capacitor wires 118p and 218q are storage capacitor wires for supplying a CS signal. Liquid crystal capacitance Clc is formed between the pixel electrode 17c and a common electrode com, liquid crystal capacitance Cla is formed between the pixel electrode 17a and the common electrode com, liquid crystal capacitance Clb is formed between the pixel electrode 17b and the common electrode com, and liquid crystal capacitance Cld is formed between the pixel electrode 17d and the common electrode com.

Meanwhile, in a pixel 101 disposed adjacent to the pixel 100 in the column direction, pixel electrodes 17e and 17g are connected to each other via a coupling capacitor Ceg, and pixel electrodes 17f and 17h are connected to each other via a coupling capacitor Cfh. The pixel electrode 17e is connected to the data signal line 15x via a transistor 12e that is connected to a scanning signal line 16y, and the pixel electrode 17f is connected to the data signal line 15x via a transistor 12f that is connected to the scanning signal line 16y. Storage capacitance Chg is formed between the pixel electrode 17g and the storage capacitor wire 18q, storage capacitance Che is formed between the pixel electrode 17e and a storage capacitor wire 118g, storage capacitance Chf is formed between the pixel electrode 17f and a storage capacitor wire 218r, and storage capacitance Chh is formed between the pixel electrode 17h and a storage capacitor wire 18r. Note that the storage capacitor wires 18q and 18r are storage capacitor wires for supplying a constant potential (Vcom) signal, and the storage capacitor wires 118g and 218r are storage capacitor wires for supplying a CS signal. Liquid crystal capacitance Clg is formed between the pixel electrode 17g and the common electrode com, liquid crystal capacitance Cle is formed between the pixel electrode 17e and the common electrode com, liquid crystal capacitance Clf is formed between the pixel electrode 17f and the common electrode com, and liquid crystal capacitance Clh is formed between the pixel electrode 17h and the common electrode com.

Moreover, in a pixel 102 disposed adjacent to the pixel 100 in a row direction, pixel electrodes 17A and 17C are connected to each other via a coupling capacitor CAC, and pixel electrodes 17B and 17D are connected to each other via a coupling capacitor CBD. The pixel electrode 17A is connected to a data signal line 15X via a transistor 12A that is connected to the scanning signal line 16x, and the pixel electrode 17B is connected to the data signal line 15X via a transistor 12B that is connected to the scanning signal line 16x. Storage capacitance ChC is formed between the pixel electrode 17C and the storage capacitor wire 18p, storage capacitance ChC is formed between the pixel electrode 17A and a storage capacitor wire 118p, storage capacitance ChB is formed between the pixel electrode 17B and a storage capacitor wire 218q, and storage capacitance ChD is formed between the pixel electrode 17D and a storage capacitor wire 18q. Liquid crystal capacitance ClC is formed between the pixel electrode 17C and the common electrode com, liquid crystal capacitance ClA is formed between the pixel electrode 17A and the common electrode com, liquid crystal capacitance ClB is formed between the pixel electrode 17B and the common electrode com, and liquid crystal capacitance ClD is formed between the pixel electrode 17D and the common electrode com.

Figure 11:
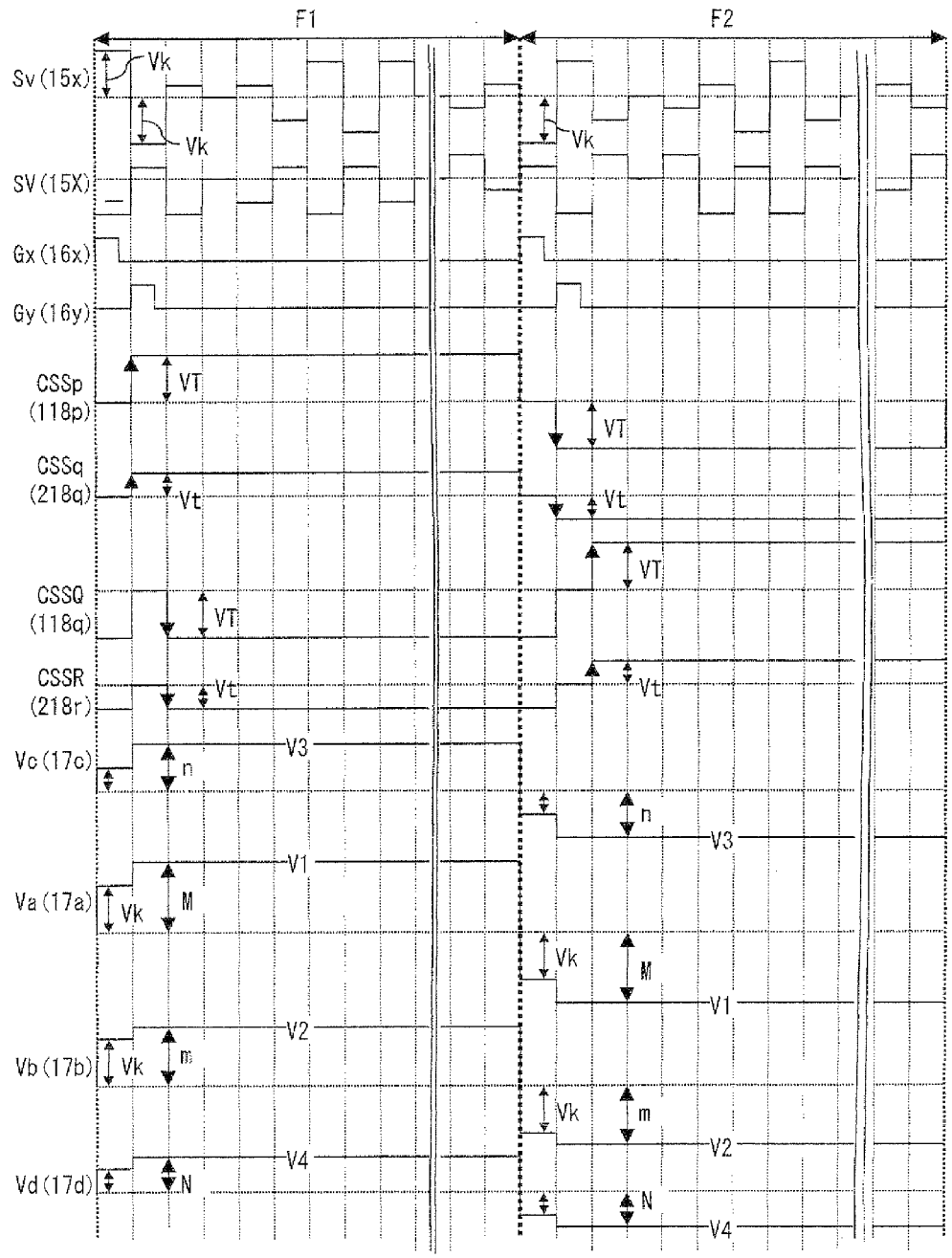
FIG. 11 is a timing chart showing a driving method of a liquid crystal display device including the liquid crystal panel of FIG. 10.

FIG. 11 is a timing chart showing a driving method of a liquid crystal display device (normally black mode) including the liquid crystal panel of FIG. 10. Sv and sV are signal electric potentials supplied to the data signal lines 15x and 15X, respectively; Gx and Gy are gate on-pulse signals to be supplied to the scanning signal lines 16x and 16y, respectively; CSSp, CSSq, CSSQ, and CSSR are CS signals (storage capacitor wire signals) supplied to the storage capacitor wires 118p, 218q, 118q, and 218r, respectively; and Va to Vd are electric potentials of respective four pixel electrodes 17a to 17d disposed in the pixel 100.

As shown in FIGS. 10 and 11, in the present liquid crystal display device, the storage capacitor wire 118p of the two storage capacitor wires 118p and 218q for supplying a CS signal forms a storage capacitance with the pixel electrode 17a (first pixel electrode) that is connected to the data signal line 15x via the transistor 12a (first transistor), and the storage capacitor wire 218q forms a storage capacitance with the pixel electrode 17b (second pixel electrode) that is connected to the data signal line 15x via the transistor 12b (second transistor). Different CS signals are supplied to these two storage capacitor wires 118p and 218q, respectively. In addition, constant potential (Vcom) signals are supplied to the storage capacitor wires 18p and 18q, respectively. Note that the scanning signal lines are sequentially selected so that (i) a polarity of a signal electric potential supplied to each data signal line is inverted per one vertical scanning period (1H), (ii) a polarity of a signal electric potential that is supplied to each of horizontal scanning periods having an identical ordinal number in the respective frames is inverted in units of one frame, (iii) and, during a single horizontal scanning period, signal electric potentials of an identical polarity are supplied to the two adjacent data signal lines, respectively.

Specifically, the CS signal CSSp supplied to the storage capacitor wire 118p and the CS signal CSSq supplied to the storage capacitor wire 218q are kept at the substantially same level during a period in which the transistor 12a and 12b are being turned ON (an active period of Gx). After the transistors 12a and 12b are turned OFF, the CS signal CSSp and the CS signal CSSq are level-shifted in an identical direction, but are different in a level-shift amount. In a frame in which a signal electric potential supplied to the pixel electrodes 17a and 17b is of a positive polarity, the two CS signals (CSSp and CSSq) are level-shifted to a positive side, and in a frame in which the signal electric potential supplied to the pixel electrodes 17a and 17b is of a negative polarity, the two CS signals (CSSp and CSSq) are level-shifted to a negative side.

Since v1=v2=V and vp=vq=0 (Vcom), the following equations 1 to 4 are obtained in accordance with a law of conservation of charge of the pixel electrodes 17a to 17d.

$$Cj \times V + Ch \times V + Ck \times (V-v3) = q1 \quad \text{equation 1}$$

$$Cj \times V + Ch \times V + Ck \times (V-v4) = q2 \quad \text{equation 2}$$

$$Cj \times v3 + Ch \times v3 - Ck \times (V-v3) = q3 = 0 \quad \text{equation 3}$$

$$Cj \times v4 + Ch \times v4 - Ck \times (V-v4) = q4 = 0 \quad \text{equation 4}$$

where (i) V is the signal electric potential supplied to the pixel electrodes 17a and 17b, (ii) Cla=Clb=Clc=Cld=Cj, Cac=Cbd=Ck, and Cha=Chb=Chc=Chd=Ch in FIG. 10, (iii) v1 to v4 are electric potentials of the pixel electrodes 17a to 17d achieved when the transistors 12a and 12b are turned OFF, (iv) vp and vq are levels of the CS signals CSSp and CSSq achieved when the transistors 12a and 12b are turned OFF, and (v) q1 to q4 are total charge amounts of the pixel electrodes 17a to 17d achieved when the transistors 12a and 12b are turned OFF. Moreover, since the levels of the CS signals CSSp and CSSq are shifted to Vp and Vq, respectively after the transistor 12a and 12b are turned OFF, the following equations 5 to 9 are obtained in accordance with the law of conservation of charge of the pixel electrodes 17a to 17d.

$$Cj \times V1 \times Ch \times (V1-Vp) + Ck \times (V1-V3) = q1 \quad \text{equation 5}$$

$$Cj \times V2 + Ch \times (V2-Vq) + Ck \times (V2-V4) = q2 \quad \text{equation 6}$$

$$Cj \times V3 + Ch \times V3 - Ck \times (V1-V3) = q3 = 0 \quad \text{equation 7}$$

$$Cj \times V4 + Ch \times V4 - Ck \times (V2-V4) = q4 = 0 \quad \text{equation 8}$$

The following equation can be obtained from the equations 3 and 4:

$$v3 = v4 = V \times [Ck/(Ck+Cj+Ch)]$$

The following equations can be obtained from the equations 1, 3, 5 and 7:

$$V1 = V + Vp \times \{[Ch \times (Ck+Cj+Ch)]/\beta\}$$

$$V3 = V \times [Ck/(Ck+Cj+Ch)] + Vp \times [(Ch \times Ck)/\beta]$$

where $\beta = Cj^2 + 2 \times Cj \times Ch + 2 \times Cj \times Ck + 2 \times Ch \times Ck + Ch^2$.

Moreover, the following equations can be obtained from the equations 2, 4, 6, and 8:

$$V2 = V + Vq \times \{[Ch \times (Ck+Cj+Ch)]/\beta\}$$

$$V4 = V \times [Ck/(Ck+Cj+Ch)] + Vq \times [(Ch \times Ck)/\beta]$$

In a frame 1 (F1) shown in FIG. 11, the CS signal CSSp is level-shifted to a positive side by an amount of VT, and the CS signal CSSq is level-shifted to a positive side by an amount of Vt which is smaller than VT. Moreover, V=+Vk≧0 and Vp=+VT>Vq=+Vt>0. As such, the following equations can be established:

$$V1 = +Vk + VT \times \{[Ch \times (Ck+Cj+Ch)]/\beta\}$$

$$V2 = +Vk + VT \times \{[Ch \times (Ck+Cj+Ch)]/\beta\}$$

$$V3 = +Vk \times [Ck/(Ck+Cj+Ch)] + VT \times [(Ch \times Ck)/\beta]$$

$$V4 = +Vk \times [Ck/(Ck+Cj+Ch)] + Vt \times [(Ch \times Ck)/\beta]$$

That is, V1≧V2≧V4 and V1≧V3 are satisfied.

Since V2−V3=Vk×[(Cj+Ch)/(Ck+Cj+Ch)]+(Ch/β)×[Vt×(Ck+Cj+Ch)−VT×Ck], V1≧V2≧V3≧V4 can be satisfied as in FIG. 11 regardless of a value of Vk, as long as Vt×(Ck+Cj+Ch)−VT×Ck≧0⇔VT≦Vt×[(Ck+Cj+Ch)/Ck]. As a result, when a halftone is displayed, a sub-pixel including the pixel electrode 17a (positive polarity) becomes a super-high-brightness sub-pixel (M), a sub-pixel including the pixel electrode 17b (positive polarity) becomes a high-brightness sub-pixel (m), a sub-pixel including the pixel electrode 17c (positive polarity) becomes a low-brightness sub-pixel (n), and a sub-pixel including the pixel electrode 17d (positive polarity) becomes a super-low-brightness sub-pixel (N).

Further, in the frame 1 (F1) shown in FIG. 11, the signal electric potential supplied to the pixel electrodes 17e and 17f is −Vk, the CS signal CSSQ is level-shifted to a negative side by an amount of VT, and the CS signal CSSR is level-shifted to a negative side by an amount of Vt which is smaller than VT. As such, in a case where the electric potentials of the pixel electrodes 17e to 17h achieved after the CS signals CSSQ and CSSR are level-shifted are V5 to V8 (not shown), respectively, the following equations can be obtained:

$$V5 = -Vk - VT \times \{([Ch \times (Ck+Cj+Ch)]/\beta\}$$

$$V6 = -Vk \times [Ck/(Ck+Cj+Ch)] - VT \times [(Ch \times Ck)/\beta]$$

$$V7 = -Vk - Vt \times \{[Ch \times (Ck+Cj+Ch)]/\beta\}$$

$$V8 = -Vk \times [Ck/(Ck+Cj+Ch)] - Vt \times [(Ch \times Ck)/\beta]$$

That is, V5≦V6≦V8 and V5≦V7 are satisfied.

Figure 12:
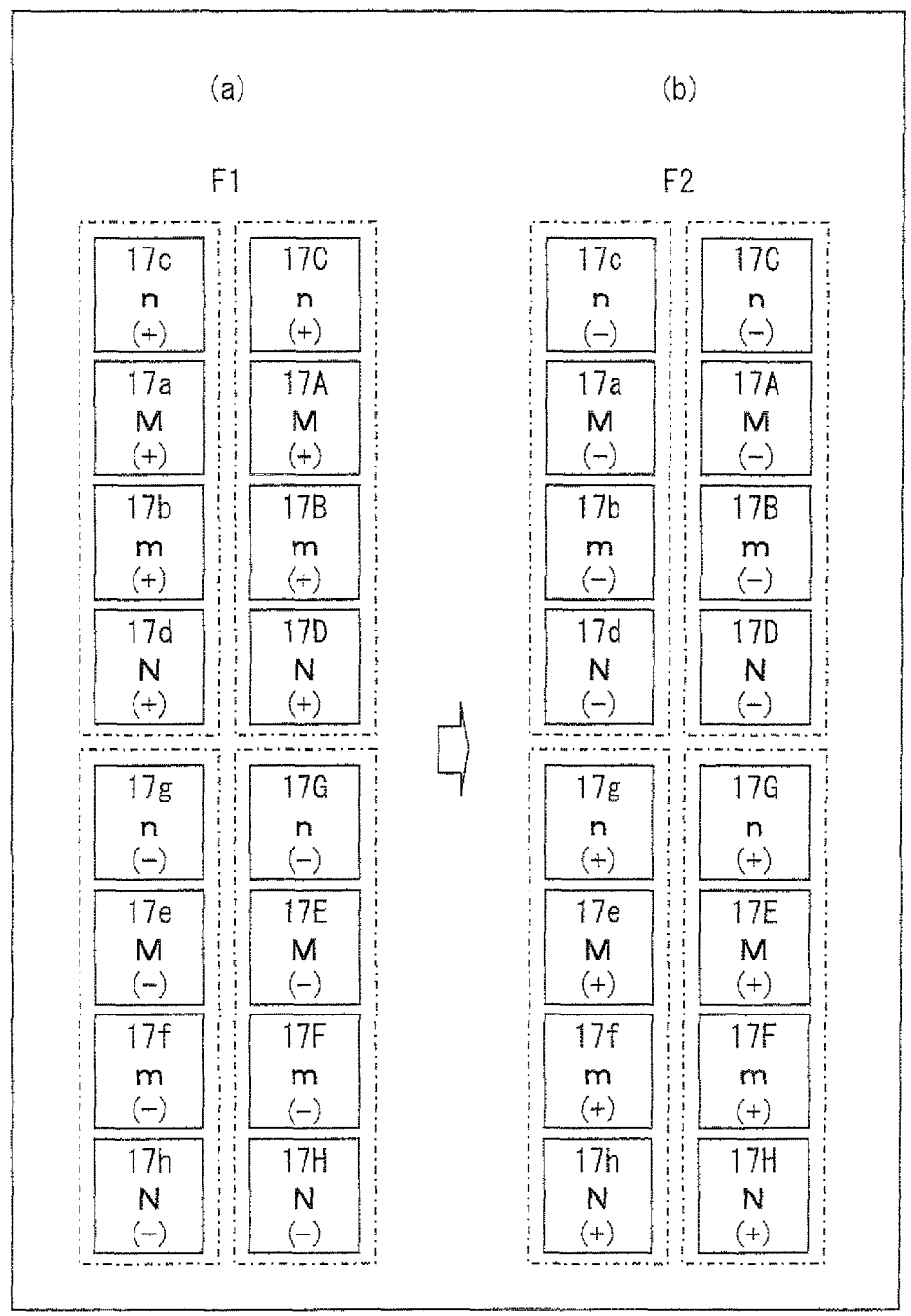
FIG. 12 is a view schematically illustrating a display state per frame in a case where the driving method of FIG. 11 is used.

Since V6−V7=−Vk×[Cj/(Ck+Cj+Ch)]−(Ch/β)×[Vt×(Ck+Cj+Ch)−VT×Ck], V6≦V7 can be satisfied (i.e., V5≦V6≦V7≦V8 can be satisfied) regardless of a value of Vk as long as VT≦Vt×[(Cj+Ck+Ch)/Ck]. As a result, when a halftone is displayed, a sub-pixel including the pixel electrode 17e (negative polarity) becomes a super-high-brightness sub-pixel (M), a sub-pixel including the pixel electrode 17f (negative polarity) becomes a high-brightness sub-pixel (m), a sub-pixel including the pixel electrode 17g (negative polarity) becomes a low-brightness sub-pixel (n), and a sub-pixel including the pixel electrode 17h (negative polarity) becomes a super-low-brightness sub-pixel (N). That is, the halftone is displayed in the pixels 100 to 103 as shown in FIG. 12 (a).

In a frame 2 (F2) shown in FIG. 11, the CS signal CSSp is level-shifted to a negative side by an amount of VT, and the CS signal CSSq is level-shifted to a negative side by an amount of Vt which is smaller than VT. Moreover, V=−Vk≦0 and Vp=−VT<Vq=−Vt<0. As such, the following equations can be obtained:

$$V1 = -Vk - VT \times \{[Ch \times (Ck+Cj+Ch)]/\beta\}$$

$$V2 = -Vk \times [Ck/(Ck+Cj+Ch)] - VT \times [(Ch \times Ck)/\beta]$$

$V3=-Vk-Vt\times\{[Ch\times(Ck+Cj+Ch)]/\beta\}$ $V4=-Vk\times[Ck/(Ck+Cj+Ch)]-Vt\times[(Ch\times Ck)/\beta]$ That is, $V1 \leq V2 \leq V4$ and $V1 \leq V3$ are satisfied.

Since $V2-V3=-Vk\times[Cj/(Ck+Cj+Ch)]-(Ch/\beta)\times[Vt\times(Ck+Cj+Ch)-VT\times Ck]$, $V2 \leq V3$ can be satisfied (i.e., $V1 \leq V2 \leq V3 \leq V4$ can be satisfied as in FIG. 11) regardless of a value of Vk as long as $VT \leq Vt\times[(Cj+Ck+Ch)/Ck]$. As a result, when a halftone is displayed, a sub-pixel including the pixel electrode 17e (negative polarity) becomes a super-high-brightness sub-pixel (M), a sub-pixel including the pixel electrode 17f (negative polarity) becomes a high-brightness sub-pixel (m), a sub-pixel including the pixel electrode 17g (negative polarity) becomes a low-brightness sub-pixel (n), and a sub-pixel including the pixel electrode 17h (negative polarity) becomes a super-low-brightness sub-pixel (N). That is, the halftone is displayed in the pixels 100 to 103 as shown in FIG. 12 (*b*).

Figure 13:
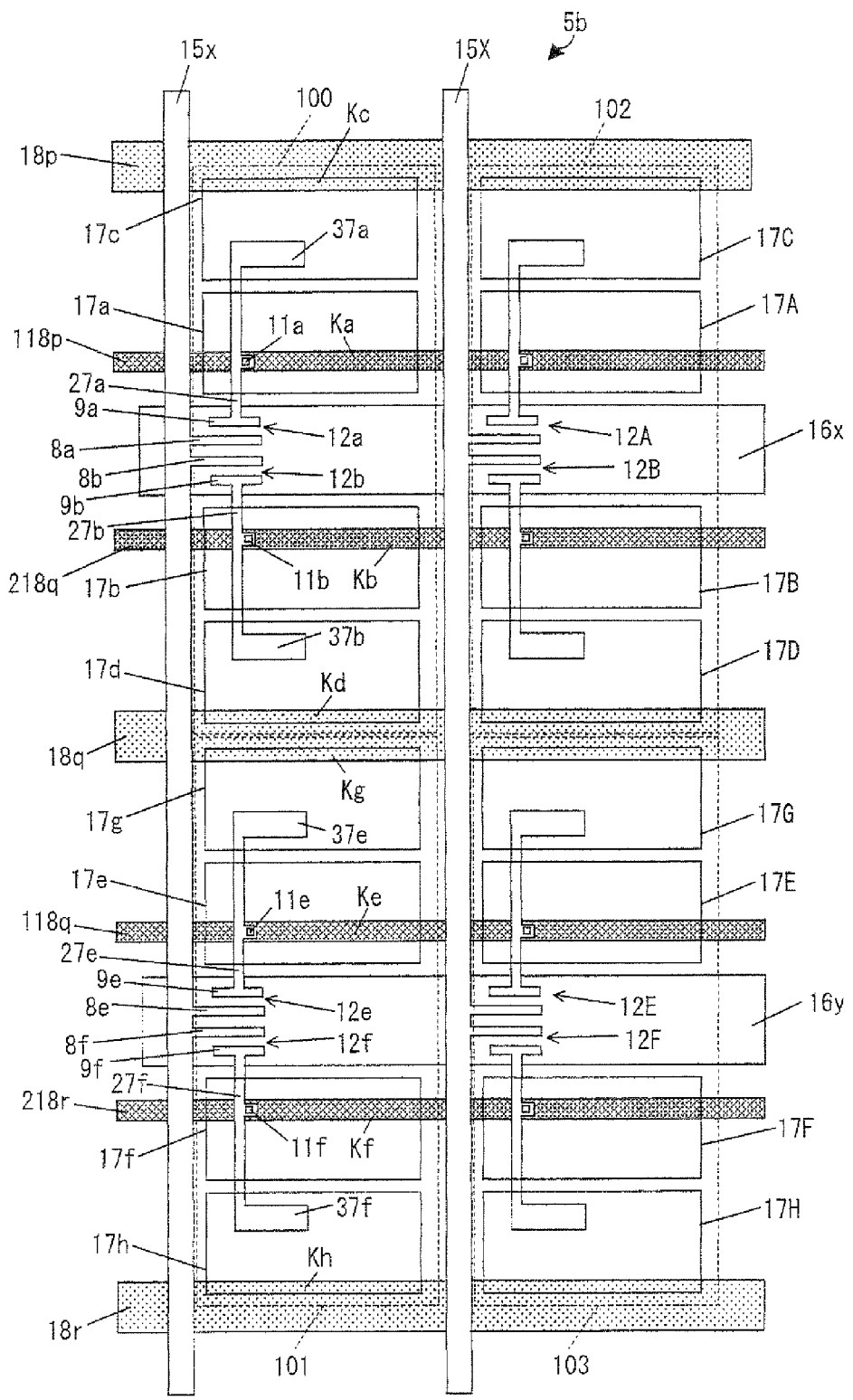
FIG. 13 is a plan view illustrating a specific example of the liquid crystal panel of Embodiment 2.

FIG. 13 illustrates one specific example of the present liquid crystal panel. In the liquid crystal panel 5b illustrated in FIG. 13, each pixel is divided into two sections (regions) by a scanning signal line traversing the pixel. In one of the two sections, (i) a first pixel electrode connected to a transistor and (ii) a second pixel electrode connected to the first pixel electrode via a capacitor are disposed so that the first pixel electrode is disposed adjacent to the scanning signal line. In the other one of the two sections, (i) a first pixel electrode connected to a transistor and (ii) a second pixel electrode connected to the first pixel electrode via a capacitor are disposed so that the first pixel electrode is disposed adjacent to the scanning signal line. One storage capacitor wire (e.g., the storage capacitor wire 18p) for supplying a constant potential (Vcom) signal is associated with two pixels disposed adjacent in the column direction, and two storage capacitor wires (e.g., the storage capacitor wires 118p and 218q) for supplying a CS signal is associated with one pixel.

Specifically, the data signal line 15x is provided parallel to the pixels 100 and 101, and the data signal line 15X is provided parallel to the pixels 102 and 103. The scanning signal line 16x traverses a mid part of the pixel 100 and a mid part of the pixel 102, and the scanning signal line 16y traverses a mid part of the pixel 101 and a mid part of the pixel 103. The storage capacitor wire 18p is disposed so as to overlap a pixel row including the pixels 100 and 102 and a pixel row disposed, in FIG. 13, above the pixel row including the pixels 100 and 102; the storage capacitor wire 18q is disposed so as to overlap the pixel row including the pixels 100 and 102 and a pixel row including the pixels 101 and 103; and the storage capacitor wire 18r is disposed so as to overlap the pixel row including the pixels 101 and 103 and a pixel row disposed, in FIG. 13, below the pixel row including the pixels 101 and 103. The storage capacitor wire 118p is disposed between the storage capacitor wire 18p and the scanning signal line 16x, the storage capacitor wire 218q is disposed between the scanning signal line 16x and the storage capacitor wire 18q, the storage capacitor wire 118q is disposed between the storage capacitor wire 18q and the scanning signal line 16y, and the storage capacitor wire 218r is disposed between the scanning signal line 16y and the storage capacitor wire 18r. As to the pixel 100 for example, in one section disposed, in FIG. 13, above the scanning signal line 16x traversing the mid, part of the pixel 100, the rectangular-shaped pixel electrode 17a connected to the transistor 12a is disposed adjacent to the scanning signal line 16x and the rectangular-shaped pixel electrode 17c connected to the pixel electrode 17a via a capacitor is disposed adjacent to one of two edges of the pixel 100, which two edges run along the row direction. In the other section disposed, in FIG. 13, below the scanning signal line 16x, the rectangular-shaped pixel electrode 17b connected to the transistor 12b is disposed adjacent to the scanning signal line 16x and the rectangular-shaped pixel electrode 17d connected to the pixel electrode 17b via a capacitor is disposed adjacent to the other one of the two edges of the pixel 100, which two edges run along the row direction.

A source electrode 8a and a drain electrode 9a of the transistor 12a and a source electrode 8b and a drain electrode 9b of the transistor 12b are provided on the scanning signal line 16x. The source electrode 8a is connected to the data signal line 15x. The drain electrode 9a is connected to a drain draw-out wire 27a. The drain draw-out wire 27a is connected to a coupling capacitor electrode 37a formed in an identical layer to the drain draw-out wire 27a, and is connected to the pixel electrode 17a via a contact hole 11a. The coupling capacitor electrode 37a overlaps the pixel electrode 17c via an interlayer insulating film. As a result, the coupling capacitor Cac (see FIG. 1) between the pixel electrodes 17a and 17c is formed. Moreover, the source electrode 8b is connected to the data signal line 15x. The drain electrode 9b is connected to a drain draw-out wire 27b. The drain draw-out wire 27b is connected to a coupling capacitor electrode 37b formed in an identical layer to the drain draw-out wire 27b, and is connected to the pixel electrode 17b via a contact hole 11b. The coupling capacitor electrode 37b overlaps the pixel electrode 17d via the interlayer insulating film. As a result, the coupling capacitor Cbd (see FIG. 1) between the pixel electrodes 17b and 17d is formed.

Further, the storage capacitor wire 18p overlaps the pixel electrode 17c, so that the storage capacitance Chc (see FIG. 10) is formed in an overlapping part Kc where the storage capacitor wire 18p overlaps the pixel electrode 17c. The storage capacitor wire 118p is formed so as to overlap the pixel electrode 17a, so that the storage capacitance Cha (see FIG. 10) is formed in an overlapping part Ka where the storage capacitor wire 118p overlaps the pixel electrode 17a. The storage capacitor wire 218q is formed so as to overlap the pixel electrode 17b, so that the storage capacitance Chb (see FIG. 10) is formed in an overlapping part Kb where the storage capacitor wire 218q overlaps the pixel electrode 17b. The storage capacitor wire 18q is formed so as to overlap the pixel electrode 17d, so that the storage capacitance Chd (see FIG. 10) is formed in an overlapping part Kd where the storage capacitor wire 18q overlaps the pixel electrode 17d.

As to the pixel 101, in one section disposed, in FIG. 13, above the scanning signal line 16y traversing the mid part of the pixel 101, the rectangular-shaped pixel electrode 17e connected to the transistor 12e is disposed adjacent to the scanning signal line 16y and the rectangular-shaped pixel electrode 17g connected to the pixel electrode 17e via a capacitor is disposed adjacent to one of two edges of the pixel 101, which two edges run along the row direction. In the other section disposed, in FIG. 13, below the scanning signal line 16y, the rectangular-shaped pixel electrode 17f connected to the transistor 12f is disposed adjacent to the scanning signal line 16y and the rectangular-shaped pixel electrode 17h connected to the pixel electrode 17f via a capacitor is disposed adjacent to the other one of the two edges of the pixel 101, which two edges run along the row direction. A source electrode 8e and a drain electrode 9e of the transistor 12e and a source electrode 8f and a drain electrode 9f of the transistor 12f are provided on the scanning signal line 16y. The source electrode 8e is connected to the data signal line 15x. The drain electrode 9e is connected to a drain draw-out wire 27e. The drain draw-out wire 27e is connected to a coupling capacitor electrode 37e formed in an identical layer to the drain draw-out wire 27e, and is connected to the pixel electrode 17e via a contact hole 11e. The coupling capacitor electrode 37e overlaps the pixel electrode 17g via the interlayer insulating film. As a result, the coupling capacitor Ceg (see FIG. 1) between the pixel electrodes 17e and 17g is formed. Moreover, the source electrode 8f is connected to the data signal line 15x. The drain electrode 9f is connected to a drain draw-out wire 27f. The drain draw-out wire 27f is connected to a coupling capacitor electrode 37f formed in an identical layer to the drain draw-out wire 27f, and is connected to the pixel electrode 17f via a contact hole 11f. The coupling capacitor electrode 37f overlaps the pixel electrode 17h via the interlayer insulating film. As a result, the coupling capacitor Cfh (see FIG. 1) between the pixel electrodes 17f and 17h is formed.

Further, the storage capacitor wire 18q overlaps the pixel electrode 17g, so that the storage capacitance Chg (see FIG. 10) is formed in an overlapping part Kg where the storage capacitor wire 18q overlaps the pixel electrode 17g. The storage capacitor wire 118q is formed so as to overlap the pixel electrode 17e, so that the storage capacitance Che (see FIG. 10) is formed in an overlapping part Ke where the storage capacitor wire 118q overlaps the pixel electrode 17e. The storage capacitor wire 218r is formed so as to overlap the pixel electrode 17f, so that the storage capacitance Chf (see FIG. 10) is formed in an overlapping part Kf where the storage capacitor wire 218r overlaps the pixel electrode 17f. The storage capacitor wire 18r is formed so as to overlap the pixel electrode 17h, so that the storage capacitance Chh (see FIG. 10) is formed in an overlapping part Kh where the storage capacitor wire 18r overlaps the pixel electrode 17h.

According to the present liquid crystal display device, four sub-pixels provided in a single pixel can be controlled so as to have different brightness from one another during a halftone display. In a case where the present liquid crystal display device is applied to a liquid crystal display device of an MVA mode for example, 16 (4 directions×4 types) domains (alignment regions) are formed in a single pixel. This allows an improvement in viewing angle characteristics. Moreover, according to the present liquid crystal display device, a bright sub-pixel (M or m in FIG. 12) in one pixel is not disposed adjacent to a bright sub-pixel in the other pixel. This allows more natural display as compared to a liquid crystal display device in which a bright sub-pixel in one pixel is disposed adjacent to a bright sub-pixel in the other pixel. Moreover, one storage capacitor wire for supplying a constant potential signal is associated with two pixel rows (i.e., this storage capacitor wire is shared by two pixels that are adjacent in the column direction). This allows a reduction in the number of storage capacitor wires for supplying a constant potential signal, thereby increasing a pixel aperture ratio. Moreover, By inverting a polarity of a signal electric potential to be supplied to the data signal lines per one horizontal scanning period (1H) (see FIGS. 11 and 12), a feed-through direction of the electric potential while the transistor is OFF becomes opposite between the two pixels adjacent in the column direction. This holds down the occurrence of flickering.

Figure 14:
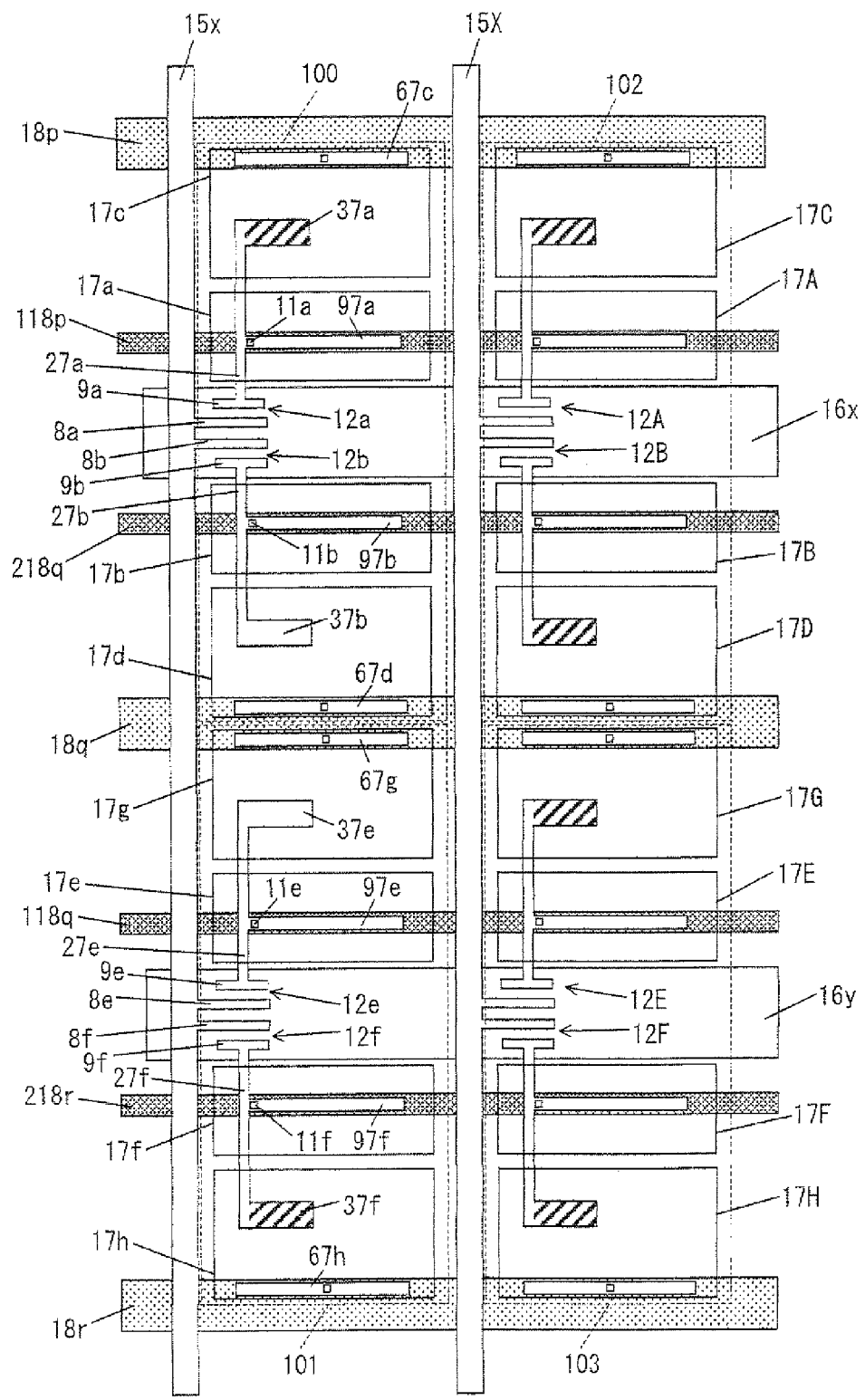
FIG. 14 is a plan view illustrating another specific example of the liquid crystal panel of Embodiment 2.

In the liquid crystal panel 5b of FIG. 13, the interlayer insulating film is constituted only by an inorganic interlayer insulating film. However, it is also possible that the interlayer insulating film has a two-layer structure of an inorganic interlayer insulating film and an organic interlayer insulating film that is thicker than the inorganic interlayer insulating film. Note, however, that in this case, it is desirable that the liquid crystal panel 5b be configured as illustrated in FIG. 14 in order to secure sufficient coupling capacitance value and sufficient storage capacitance value. In the pixel 100 for example, a storage capacitor electrode 97a that is connected in an identical layer to the drain draw-out wire 27a is provided on the storage capacitor wire 118p, a storage capacitor electrode 67c that is formed in an identical layer to the drain draw-out wire 27a and is connected to the pixel electrode 17c via a contact hole is provided on the storage capacitor wire 18p, a storage capacitor electrode 97b that is connected in an identical layer to the drain draw-out wire 27b is provided on the storage capacitor wire 218q, and a storage capacitor electrode 67d that is formed in an identical layer to the drain draw-out wire 27b and is connected to the pixel electrode 17d via a contact hole is provided on the storage capacitor wire 18q. Moreover, the organic interlayer insulating film is hollowed out or locally thinned in parts where it overlaps the coupling capacitor electrodes 37a and 37b. This configuration can provide effects of reducing various parasitic capacitances, preventing short-circuiting of wires, reducing a split of a pixel electrode caused by planarization, and the like while securing sufficient coupling capacitance value and storage capacitance value.

Figure 15:
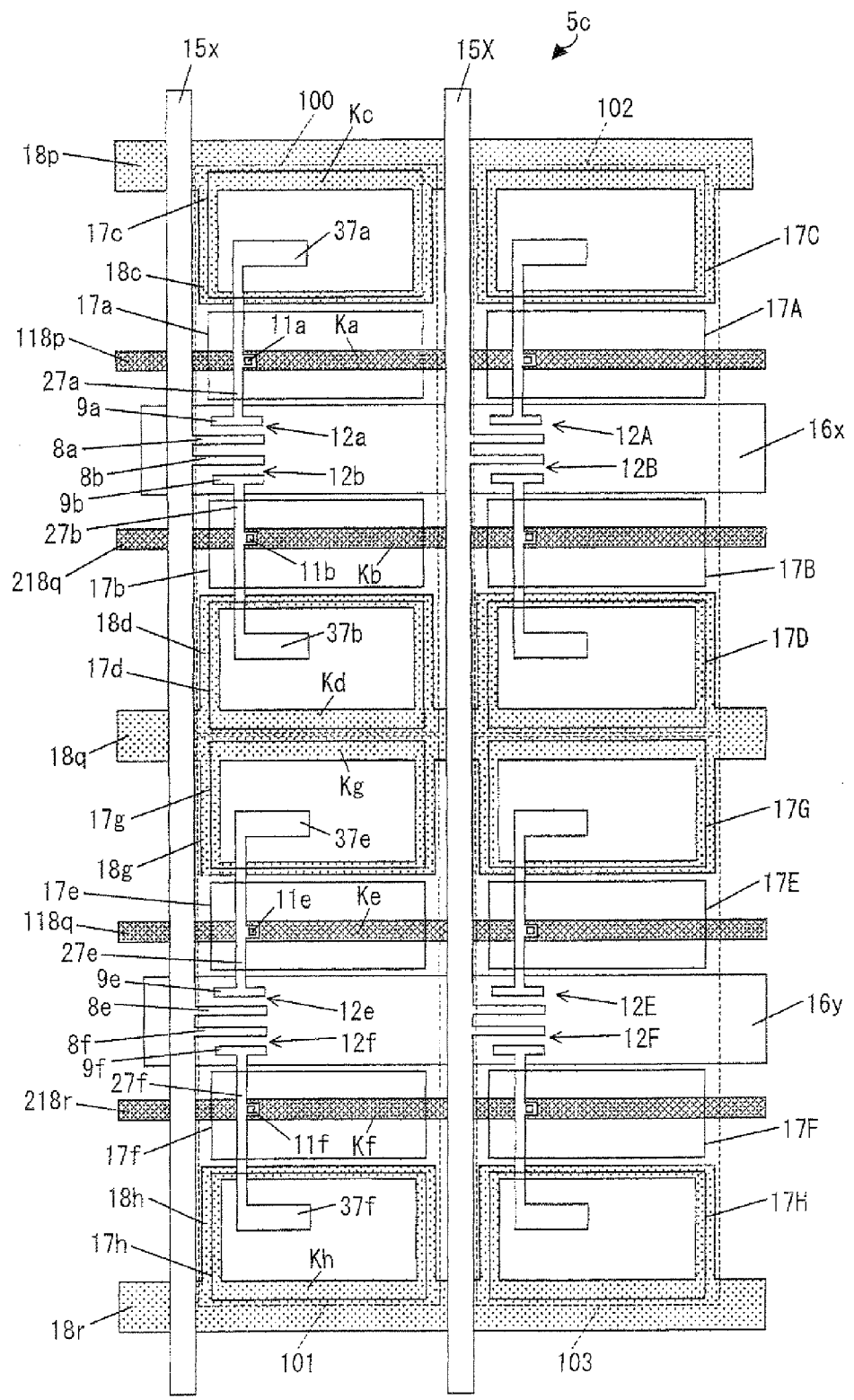
FIG. 15 is a plan view illustrating another specific example of the liquid crystal panel of Embodiment 2.

The liquid crystal panel 5b of FIG. 13 may be configured as illustrated in FIG. 15. In a liquid crystal panel 5c illustrated in FIG. 15, one storage capacitor wire (storage capacitor wire for supplying Vcom) associated with adjacent two pixel rows overlaps a part of an edge of a pixel electrode, and has a storage capacitor wire extension which, from a plan view, extends from the storage capacitor wire so as to overlap a remaining part of the edge or run around the remaining part of the edge, and is merged with the storage capacitor wire again.

For example, the storage capacitor wire 18p overlaps a part of an edge of the pixel electrode 17c, and has a storage capacitor wire extension 18e which branches off from the storage capacitor wire 18p, extends so as to overlap a remaining part of the edge or run around the remaining part of the edge, and is then merged with the storage capacitor wire 18p again. The storage capacitor wire 18q overlaps a part of an edge of the pixel electrode 17d, and has a storage capacitor wire extension 18d which branches off from the storage capacitor wire 18q, extends so as to overlap a remaining part of the edge or run around the remaining part of the edge, and is then merged with the storage capacitor wire 18q again. The storage capacitor wire 18q overlaps a part of an edge of the pixel electrode 17g, and has a storage capacitor wire extension 18g which branches off from the storage capacitor wire 18q, extends so as to overlap a remaining part of the edge or run around the remaining part of the edge, and is then merged with the storage capacitor wire 18q again. Further, the storage capacitor wire 18r overlaps a part of an edge of the pixel electrode 17h, and has a storage capacitor wire extension 18h which branches off from the storage capacitor wire 18r, extends so as to overlap a remaining part of the edge or run around the remaining part of the edge, and is then merged with the storage capacitor wire 18r again. This configuration allows the storage capacitor wires and the storage capacitor wire extensions to function as electric shield patterns for shielding the electrically floating pixel electrodes (17c, 17d, 17g, and 17h). This makes it possible to suppress electric charge from going into these pixel electrodes (17c, 17d, 17g, and 17h) and to prevent image sticking of sub-pixels including the respective pixel electrodes as much as possible. Moreover, each of the storage capacitor wire can have a redundancy effect due to a storage capacitor wire extension. For example, even if disconnection of a storage capacitor wire occurs somewhere between a part from which the storage capacitor wire extension branches off and a part with which the storage capacitor wire extension is merged, the storage capacitor wire extension serves as a bypass through which a constant potential (Vcom) signal can be supplied to a part which follows the disconnected point of the storage capacitor wire.

Figure 16:
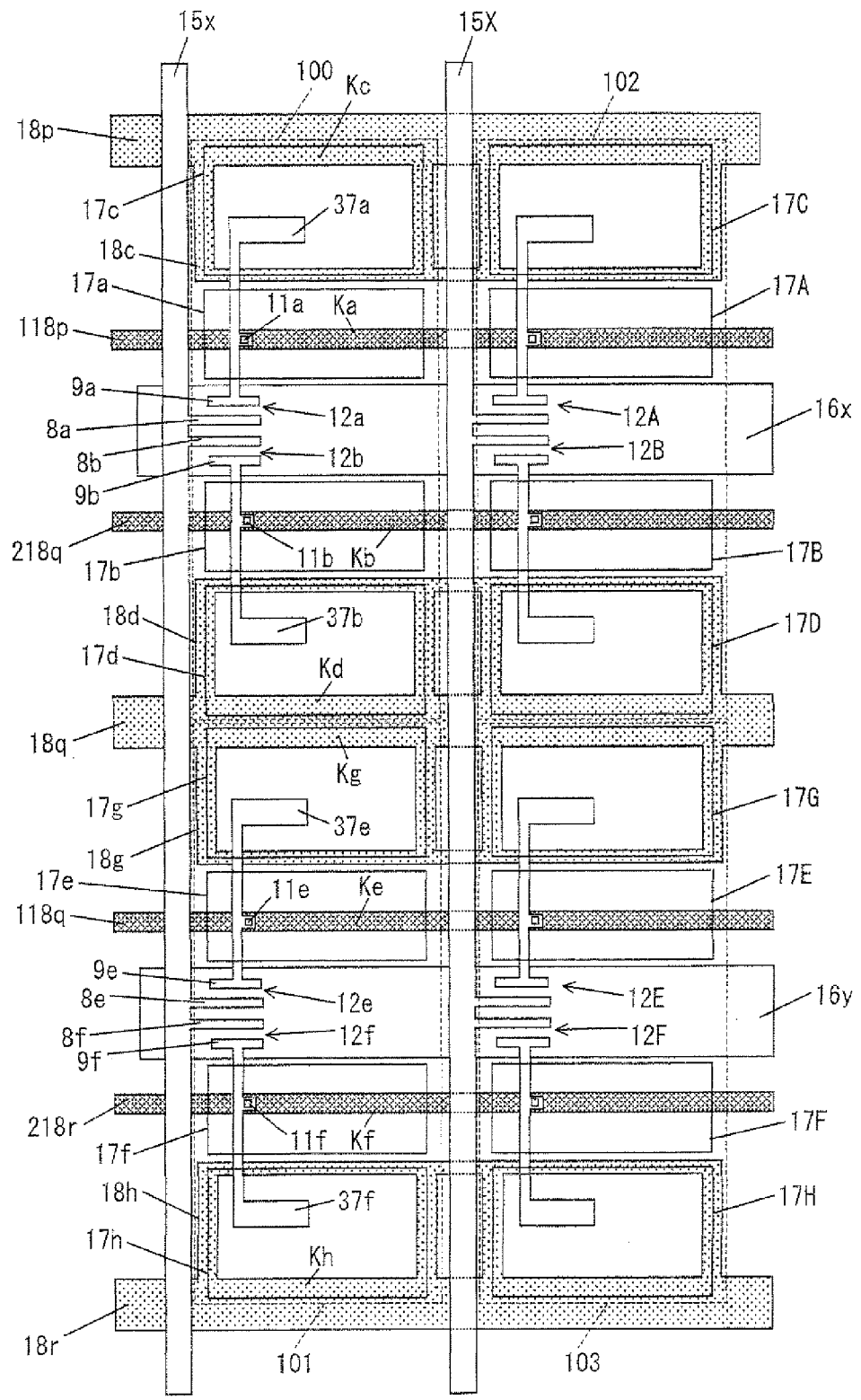
FIG. 16 is a plan view illustrating another specific example of the liquid crystal panel of Embodiment 2.

The liquid crystal panel 5c of FIG. 15 may be configured as illustrated in FIG. 16. Specifically, storage capacitor wire extensions that are adjacent in the column direction are connected to each other. In the pixel 100 for example, the storage capacitor wire 18p has (i) a storage capacitor wire extension 18c which branches off from the storage capacitor wire 18p, extends so as to overlap a remaining part of an edge of the pixel electrode 17c or run around the remaining part of the edge, and is merged with the storage capacitor wire 18p again and (ii) a storage capacitor wire extension 18C which branches off from the storage capacitor wire 18p, extends so as to overlap a remaining part of an edge of the pixel electrode 17C or run around the remaining part of the edge, and is merged with the storage capacitor wire 18p again, and the storage capacitor wire extension 18c and the storage capacitor wire extension 18C are connected to each other below the data signal line 15X. This configuration of FIG. 16 increases the redundant effect of each storage capacitor wire in the liquid crystal panel 5c. For example, even if disconnection of a storage capacitor wire occurs at a part where it intersects with a data signal line, two storage capacitor wire extensions that are connected to each other and adjacent in the column direction serve as a bypass through which a constant potential (Vcom) signal can be supplied to a part which follows the disconnected point of the storage capacitor wire.

Figure 17:
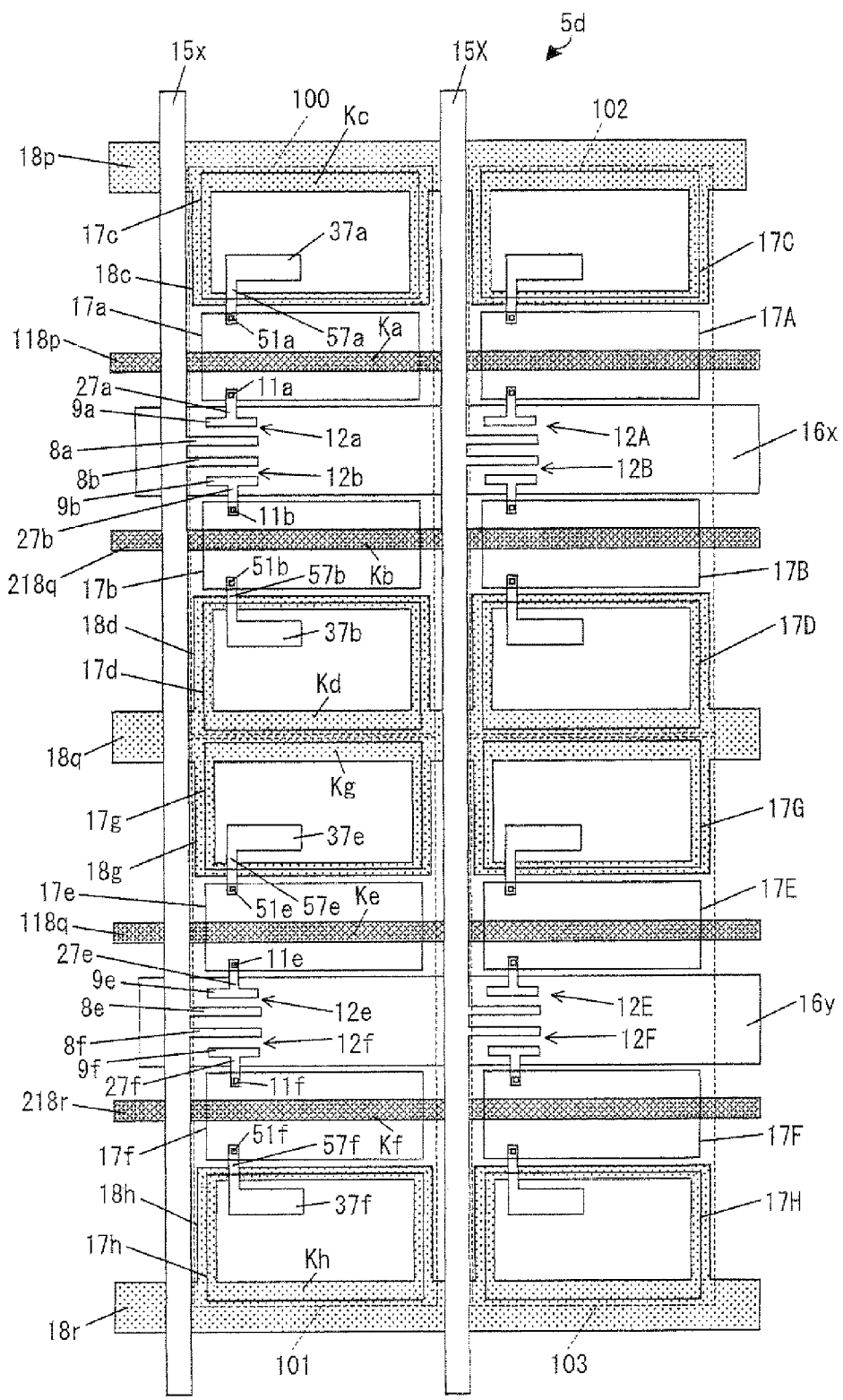
FIG. 17 is a plan view illustrating another specific example of the liquid crystal panel of Embodiment 2.

In the liquid crystal panel 5c of FIG. 15, a drain draw-out wire is connected in an identical layer to a coupling capacitor electrode, and is connected to a pixel electrode via contact hole. However, the present embodiment is not limited to this. For example, another configuration as illustrated in FIG. 17 is also possible. In a liquid crystal panel 5d illustrated in FIG. 17, a drain draw-out wire and a pixel electrode are connected to each other via a contact hole, and the pixel electrode is connected, via a contact hole, to a relay wire which is connected in an identical layer to a coupling capacitor electrode.

For example, in a pixel 100 of the liquid crystal panel 5d, a drain draw-out wire 27a that is drawn out from a drain electrode 9a of a transistor 12a is connected to a pixel electrode 17a via a contact hole 11a, the pixel electrode 17a is connected, via a contact hole 51a, to a relay wire 57a that is connected in an identical layer to a coupling capacitor electrode 37a, and the coupling capacitor electrode 37a overlaps a pixel electrode 17c via an interlayer insulating film. As a result, the coupling capacitance Cac (see FIG. 10) between the pixel electrodes 17a and 17c is formed. Similarly, a drain draw-out wire 27b that is drawn out from a drain electrode 9b of a transistor 12b is connected to a pixel electrode 17b via a contact hole 11b, the pixel electrode 17b is connected, via a contact hole 51b, to a relay wire 57b that is connected in an identical layer to a coupling capacitor electrode 37b, and the coupling capacitor electrode 37b overlaps a pixel electrode 17d via the interlayer insulating film. As a result, the coupling capacitance Cbd (see FIG. 10) between the pixel electrodes 17b and 17d is formed. Since the drain draw-out wire (light-blocking wire) can be made shorter in the liquid crystal panel 5d than the liquid crystal panel 5b, it is possible to further increase the aperture ratio.

Figure 18:
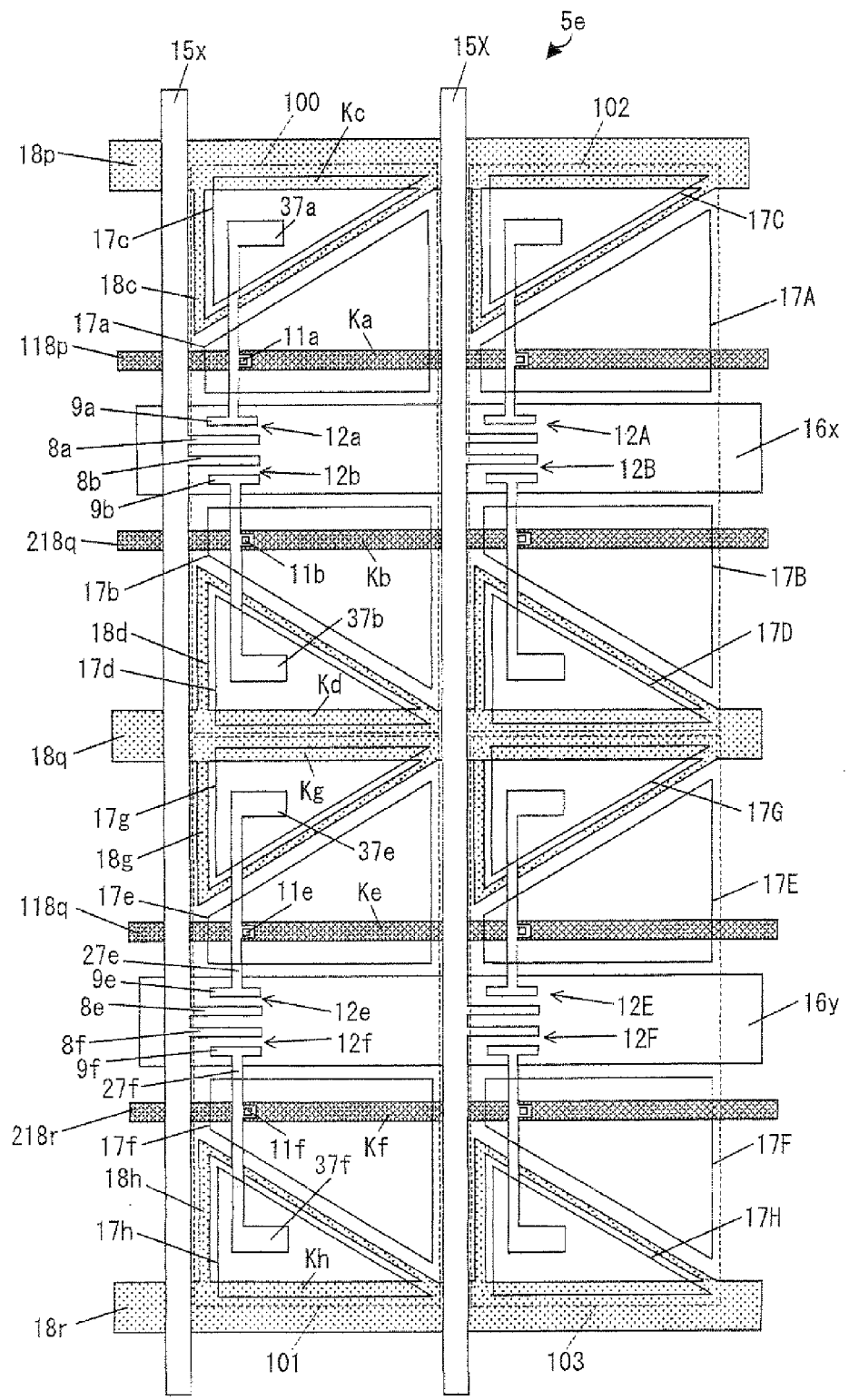
FIG. 18 is a plan view illustrating another specific example of the liquid crystal panel of Embodiment 2.

In the liquid crystal panel 5c of FIG. 15, each of four pixel electrodes disposed in a single pixel has a rectangular shape. However, the present embodiment is not limited to this. For example, another configuration as illustrated in FIG. 18 is also possible. Specifically, in one region of a scanning signal line, a pixel electrode having a right-triangular shape is disposed so as to overlap a storage capacitor wire, a pixel electrode having a trapezoidal shape is disposed so as to be adjacent to the scanning signal line, and a storage capacitor wire extension extends so as to electrically shield the triangular-shaped pixel electrode.

In a pixel 100 of a liquid crystal panel 5e illustrated in FIG. 18, in one section disposed, in FIG. 18, above a scanning signal line 16x traversing a mid part of the pixel 100, a trapezoidal-shaped pixel electrode 17a that is connected to a transistor 12a is disposed adjacent to the scanning signal line 16x, and a right-triangular-shaped pixel electrode 17c that is connected to the pixel electrode 17a via a capacitor is disposed adjacent to one of two edges of the pixel 100, which two edges run along the row direction. An edge of the pixel electrode 17c is constituted by a part which runs along the data signal line 15x, a part which overlaps the storage capacitor wire 18p, and a part which forms an oblique side of the pixel electrode 17c. An edge of the pixel electrode 17a is constituted by a part which runs along the data, signal line 15x, a part which runs along the scanning signal line 16x, a part which runs along the data signal line 15X, and a part which runs along the part (the part which forms the oblique side) of the edge of the pixel electrode 17e. Meanwhile, in the other section disposed, in FIG. 18, below the scanning signal line 16x, a trapezoidal-shaped pixel electrode 17b that is connected to a transistor 12b is disposed adjacent to the scanning signal line 16x, and a right-triangular-shaped pixel electrode 17d that is connected to the pixel electrode 17b via a capacitor is disposed adjacent to the other one of the two edges of the pixel 100, which two edges run along the row direction. An edge of the pixel electrode 17d is constituted by a part which runs along the data signal line 15X, a part which overlaps the storage capacitor wire 18q, and a part which forms an oblique side of the pixel electrode 17d. An edge of the pixel electrode 17b is constituted by a part which runs along the scanning signal line 16x, a part which runs along the data signal line 15x, a part which runs along the data signal line 15X, and a part which runs along the part (the part which forms the oblique side) of the edge of the pixel electrode 17d. Note that the pixel electrode 17a and the pixel electrode 17b are disposed so as to be symmetrical about the scanning signal line 16x, and the pixel electrode 17c and the pixel electrode 17d are disposed so as to be symmetrical about the scanning signal line 16x.

Since the storage capacitor wire 18p overlaps the part of the edge of the pixel electrode 17c, a storage capacitance Chc (see FIG. 10) is formed in an overlapping part Kc where they (the storage capacitor wire 18p and the pixel electrode 17c) overlap each other. Moreover, the storage capacitor wire 18p has a storage capacitor wire extension 18c which, from a plan view, branches off from the storage capacitor wire 18p, extends so as to overlap a remaining part (the part which runs along the data signal line 15x and the part which forms the oblique side) of the edge of the pixel electrode 17c or run around the remaining part of the edge, and is merged with the storage capacitor wire 18p again. As such, the storage capacitor wire 18p and the storage capacitor wire extension 18c electrically shield the pixel electrode 17c which is electrically floating. Moreover, the storage capacitor wire 118p is formed so as to overlap the pixel electrode 17a. As a result, a storage capacitance Cha (see FIG. 10) is formed in an overlapping part Ka where the storage capacitor wire 118p overlaps the pixel electrode 17a. Similarly, since the storage capacitor wire 18q overlaps the part of the edge of the pixel electrode 17d, a storage capacitance Chd (see FIG. 10) is formed in an overlapping part Kd where they (the storage capacitor wire 18q and the pixel electrode 17d) overlap each other. Moreover, the storage capacitor wire 18q has a storage capacitor wire extension 18d which, from a plan view, branches off from the storage capacitor wire 18q, extends so as to overlap a remaining part (the part which runs along the data signal line 15x and the part which forms the oblique side) of the edge of the pixel electrode 17d or run around the remaining part of the edge, and is merged with the storage capacitor wire 18q again. As such, the storage capacitor wire 18q and the storage capacitor wire extension 18d electrically shield the pixel electrode 17d which is electrically floating. Moreover, the storage capacitor wire 218q is formed so as to overlap the pixel electrode 17b. As a result, a storage capacitance Chb (see FIG. 10) is formed in an overlapping part Kb where the storage capacitor wire 218q overlaps the pixel electrode 17b.

Figure 19:
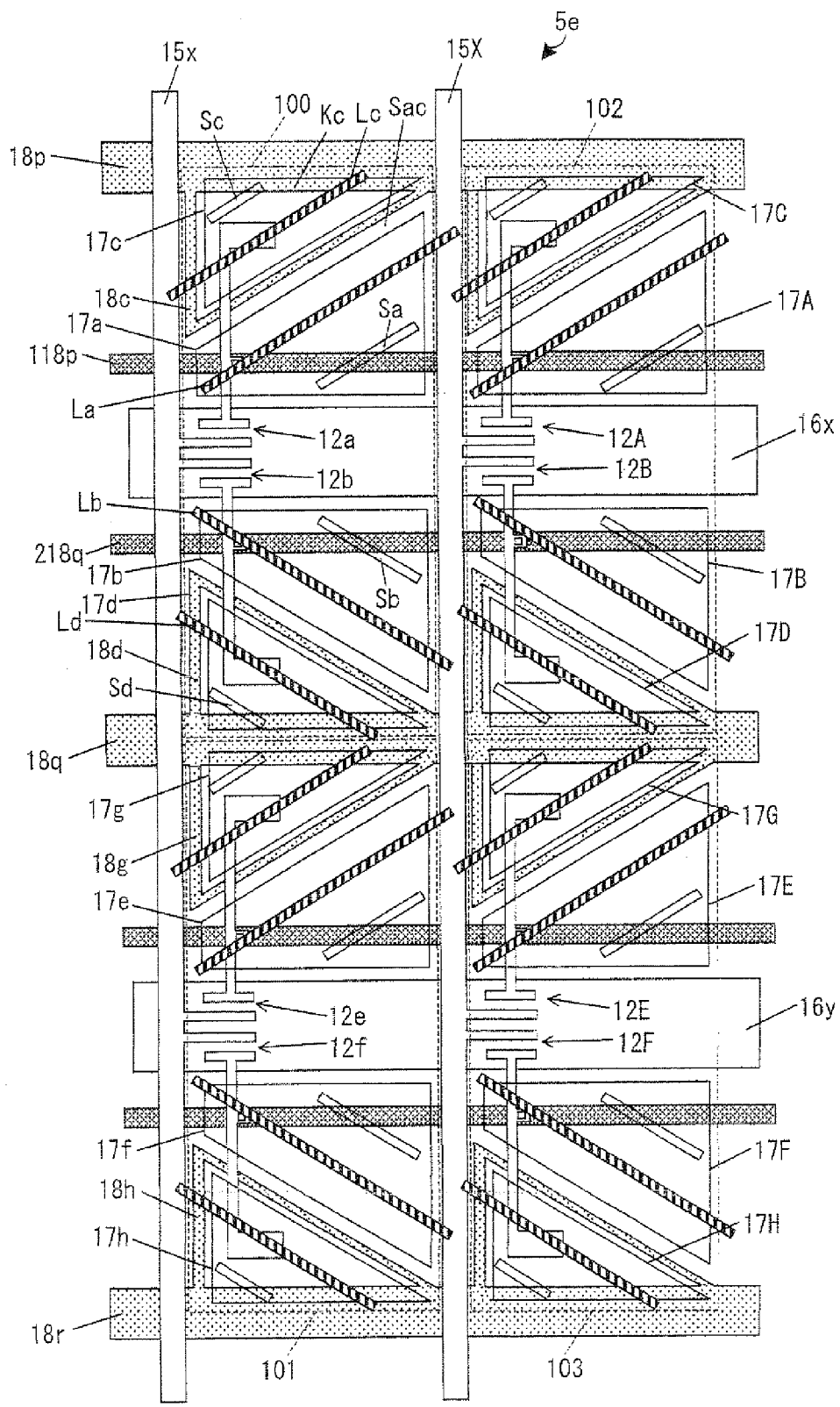
FIG. 19 is a plan view illustrating another specific example of the liquid crystal panel of Embodiment 2.

In the liquid crystal panel 5e, a gap between two pixel electrodes disposed in one side or the other side of a scanning signal line is an oblique slit, and therefore may serve as an alignment control structure. In this case, a liquid crystal panel of an MVA (Multi-domain Vertical Alignment) mode can be configured by providing ribs on a color filter panel and a slit in a pixel electrode, as illustrated in FIG. 19. Specifically, in a pixel 100, a gap between pixel electrodes 17a and 17c is a slit Sac, a slit Sa that is parallel to the slit Sac is provided in the pixel electrode 17a, and a slit Sc that is parallel to the slit Sac is provided in the pixel electrode 17c. From a plan view, a rib La that is parallel to the slit Sa is provided between the slit Sa and the slit Sac. From a plan view, a rib Lc that is parallel to the slit Sc is provided between the slit Sc and the slit Sac. Similarly, a gap between pixel electrodes 17b and 17d is a slit Sbd, a slit Sb that is parallel to the slit Sbd is provided in the pixel electrode 17b, and a slit Sd that is parallel to the slit Sbd is provided in the pixel electrode 17d. From a plan view, a rib Lb that is parallel to the slit Sb is provided between the slit Sb and the slit Sbd. From a plan view, a rib Ld that is parallel to the slit Sd is provided between the slit Sd and the slit Sbd. Here, the ribs are provided on the color filter substrate (counter substrate). However, the present embodiment is not limited to this. A slit may be provided in a common electrode of the color filter substrate so that the slit serves as an alignment control structure.

[Embodiment 3]

Figure 20:
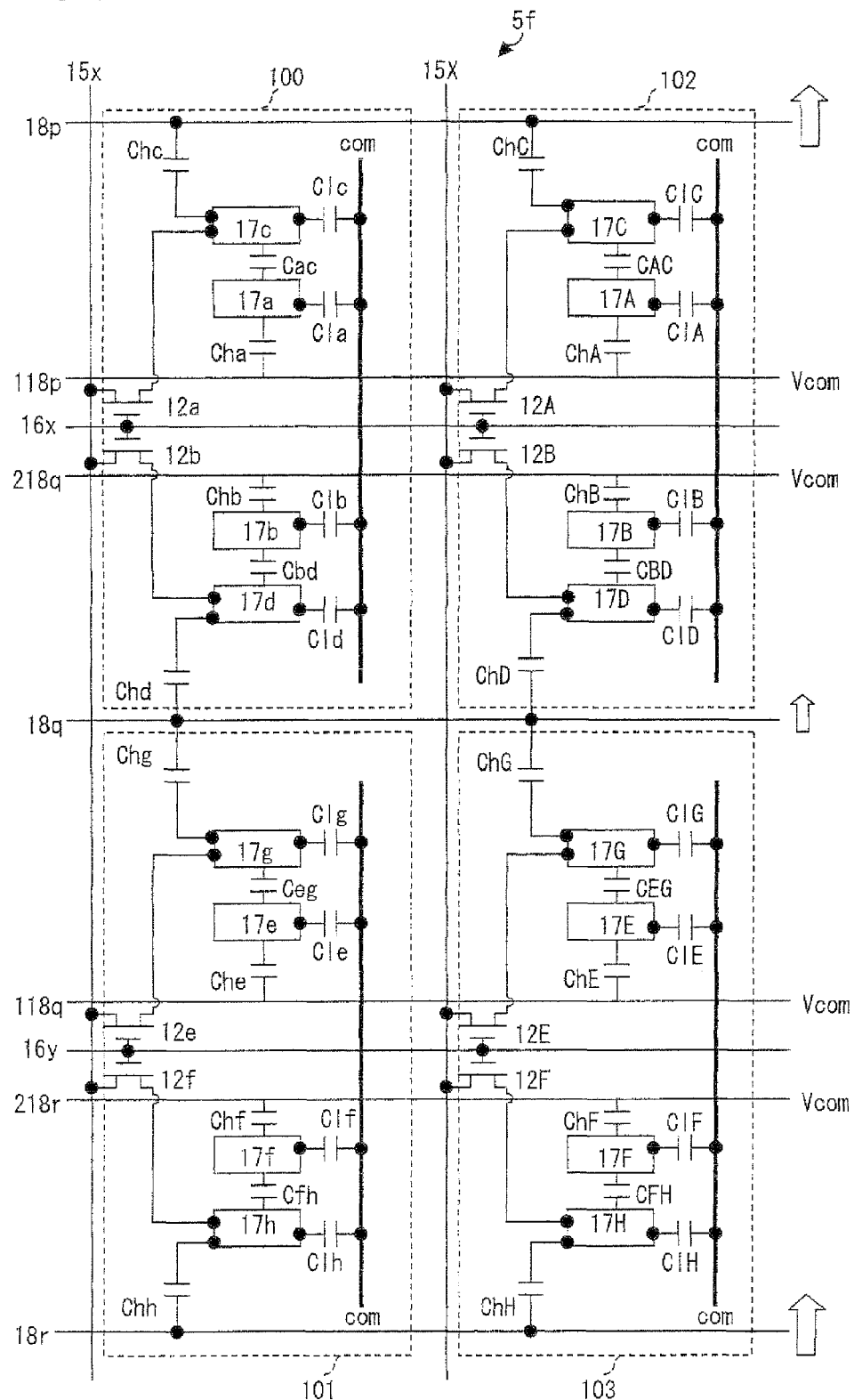
FIG. 20 is a circuit diagram illustrating a configuration of a liquid crystal panel of Embodiment 3.

FIG. 20 is an equivalent circuit diagram of one part of a liquid crystal panel of Embodiment 3. As illustrated in FIG. 20, in the present liquid crystal panel, one storage capacitor wire (storage capacitor wire 18p, for example) for supplying a CS signal is associated with two pixels that are adjacent in a column direction, and two storage capacitor wires (storage capacitor wires 118p and 218q, for example) for supplying a constant potential (Vcom) signal are associated with one pixel. Data signal lines, scanning signal lines, transistors, and pixel electrodes are disposed in a similar manner to FIG. 1.

In a pixel 100, pixel electrodes 17a and 17c are connected to each other via a coupling capacitor Cac, and pixel electrodes 17b and 17d are connected to each other via a coupling capacitor Cbd. The pixel electrode 17c is connected to a data signal line 15x via a transistor 12a that is connected to a scanning signal line 16x, and the pixel electrode 17d is connected to the data signal line 15x via a transistor 12b that is connected to the scanning signal line 16x. Storage capacitance Chc is formed between the pixel electrode 17c and the storage capacitor wire 18p, storage capacitance Cha is formed between the pixel electrode 17a and the storage capacitor wire 118p, storage capacitance Chb is formed between the pixel electrode 17b and the storage capacitor wire 218q, and storage capacitance Chd is formed between the pixel electrode 17d and the storage capacitor wire 18q. Note that the storage capacitor wires 18p and 18q are storage capacitor wires for supplying a CS signal, and the storage capacitor wires 118p and 218q are storage capacitor wires for supplying a constant potential (Vcom) signal. Liquid crystal capacitance Clc is formed between the pixel electrode 17c and a common electrode com, liquid crystal capacitance Cla is formed between the pixel electrode 17a and the common electrode com, liquid crystal capacitance Clb is formed between the pixel electrode 17b and the common electrode com, and liquid crystal capacitance Cld is formed between the pixel electrode 17d and the common electrode com.

Meanwhile, in a pixel 101 disposed adjacent to the pixel 100 in the column direction, pixel electrodes 17e and 17g are connected to each other via a coupling capacitor Ceg, and pixel electrodes 17f and 17h are connected to each other via a coupling capacitor Cfh. The pixel electrode 17g is connected to the data signal line 15x via a transistor 12e that is connected to a scanning signal line 16y, and the pixel electrode 17h is connected to the data signal line 15x via a transistor 12f that is connected to the scanning signal line 16y. Storage capacitance Chg is formed between the pixel electrode 17g and the storage capacitor wire 18q, storage capacitance Che is formed between the pixel electrode 17e and a storage capacitor wire 118q, storage capacitance Chf is formed between the pixel electrode 17f and a storage capacitor wire 218r, and storage capacitance Chh is formed between the pixel electrode 17h and a storage capacitor wire 18r. Note that the storage capacitor wires 18q and 18r are storage capacitor wires for supplying a CS signal, and the storage capacitor wires 118q and 218r are storage capacitor wires for supplying a constant potential (Vcom) signal. Liquid crystal capacitance Clg is formed between the pixel electrode 17g and the common electrode com, liquid crystal capacitance Cle is formed between the pixel electrode 17e and the common electrode com, liquid crystal capacitance Clf is formed between the pixel electrode 17f and the common electrode com, and liquid crystal capacitance Clh is formed between the pixel electrode 17h and the common electrode com.

Moreover, in a pixel 102 disposed adjacent to the pixel 100 in a row direction, pixel electrodes 17A and 17O are connected to each other via a coupling capacitor CAC, and pixel electrodes 17B and 17D are connected to each other via a coupling capacitor CBD. The pixel electrode 17C is connected to a data signal line 15X via a transistor 12A that is connected to the scanning signal line 16x, and the pixel electrode 17D is connected to the data signal line 15X via a transistor 12B that is connected to the scanning signal line 16x. Storage capacitance ChC is formed between the pixel electrode 17C and the storage capacitor wire 18p, storage capacitance ChC is formed between the pixel electrode 17A and a storage capacitor wire 118p, storage capacitance ChB is formed between the pixel electrode 17B and a storage capacitor wire 218q, and storage capacitance ChD is formed between the pixel electrode 17D and a storage capacitor wire 18q. Liquid crystal capacitance ClC is formed between the pixel electrode 17C and the common electrode com, liquid crystal capacitance ClA is formed between the pixel electrode 17A and the common electrode com, liquid crystal capacitance ClB is formed between the pixel electrode 17B and the common electrode com, and liquid crystal capacitance ClD is formed between the pixel electrode 17D and the common electrode com.

Figure 21:
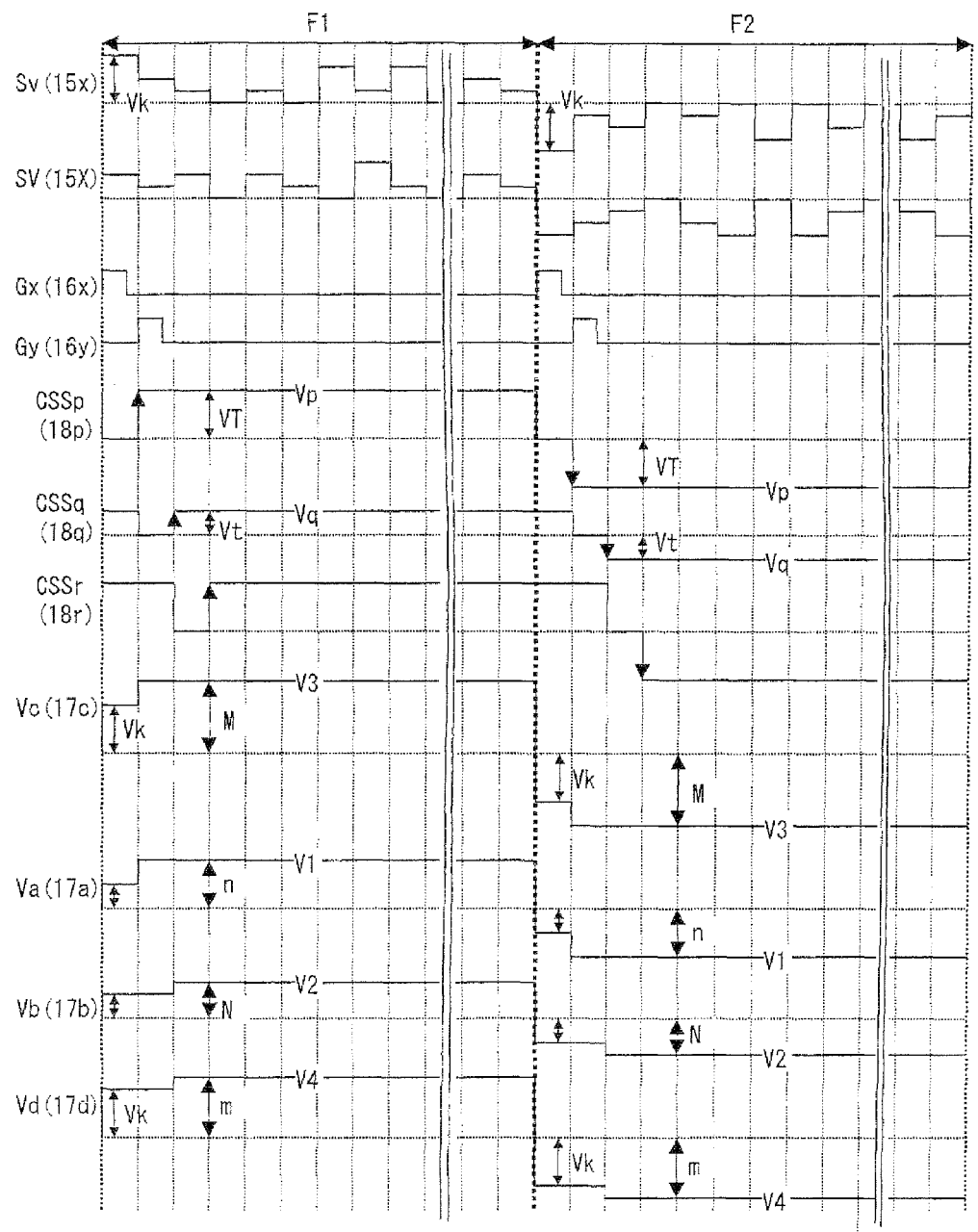
FIG. 21 is a timing chart showing a driving method of a liquid crystal display device including the liquid crystal panel of FIG. 20.

FIG. 21 is a timing chart showing a driving method of a liquid crystal display device (normally black mode) including the liquid crystal panel of FIG. 20. Sv and, sV are signal electric potentials supplied to the data signal lines 15x and 15X, respectively; Gx and Gy are gate on-pulse signals to be supplied to the scanning signal lines 16x and 16y, respectively; CSSp, CSSq, and CSSr are CS signals (storage capacitor wire signals) supplied to the storage capacitor wires 18p, 18q, and 18r, respectively; and Va to Vd are electric potentials of respective four pixel electrodes 17a to 17d disposed in the pixel 100.

As shown in FIGS. 20 and 21, in the present liquid crystal display device, the storage capacitor wire 18p of the two storage capacitor wires 18p and 18q forms a storage capacitance with the pixel electrode 17c (first pixel electrode) that is connected to the data signal line 15x via the transistor 12a (first transistor), and the storage capacitor wire 18q forms a storage capacitance with the pixel electrode 17d (second pixel electrode) that is connected to the data signal line 15x via the transistor 12b (second transistor). Different CS signals are supplied to these two storage capacitor wires 18p and 18q, respectively. Note that the scanning signal lines are sequentially selected so that (i) a polarity of a signal electric potential supplied to each data signal line is inverted per one vertical scanning period (1 frame), and (ii) during a single horizontal scanning period, signal electric potentials of an identical polarity are supplied to the two adjacent data signal lines, respectively.

Specifically, the CS signal CSSp supplied to the storage capacitor wire 18p and the CS signal CSSq supplied to the storage capacitor wire 18q are kept at the substantially same level during a period in which the transistor 12a and 12b are being turned ON (an active period of Gx). After the transistors 12a and 12b are turned OFF, the CS signal CSSp and the CS signal CSSq are level-shifted in an identical direction, but are different in a level-shift amount. In a frame in which a signal electric potential supplied to the pixel electrodes 17c and 17d is of a positive polarity, the two CS signals (CSSp and CSSq) are level-shifted to a positive side, and in a frame in which the signal electric potential supplied to the pixel electrodes 17c and 17d is of a negative polarity, the two CS signals (CSSp and CSSq) are level-shifted to a negative side.

$$V1 = V \times [Ck/(Ck+Cj+Ch)] + Vp \times [(Ch \times Ck)/\beta]$$

$$V3 = V + Vp \times \{[Ch \times (Ck+Cj+Ch)]/\beta\}$$

$$V2 = V \times [Ck/(Ck+Cj+Ch)] + Vq \times [(Ch \times Ck)/\beta]$$

$$V4 = V + Vq \times \{[Ch \times (Ck+Cj+Ch)]/\beta\}$$

where (i) V is the signal electric potential supplied to the pixel electrodes 17c and 17d, (ii) Cla=Clb=Clc=Cld=Cj, Cac=Cbd=Ck, and Cha=Chb=Chc=Chd=Ch in FIG. 20, (iii) Vp and Vq are levels of the CS signals CSSp and CSSq achieved after the transistors 12a and 12b are turned OFF, and (iv) V1 to V4 are electric potentials of the pixel electrodes 17a to 17d achieved after the CS signals CSSp and CSSq are level-shifted to Vp and Vq, respectively.

Note that $\beta = Cj^2 + 2 \times Cj \times Ch + 2 \times Cj \times Ck + 2 \times Ch \times Ck + Ch^2$.

In a frame 1 (F1) of FIG. 21, the CS signal CSSp is level-shifted to a positive side by an amount of VT, and the CS signal CSSq is level-shifted to a positive side by an amount of Vt which is smaller than VT. Moreover, V=+Vk≧0 and Vp=+VT>Vq=+Vt>0. As such, the following equations can be obtained:

$$V3 = +Vk+VT \times \{[Ch \times (Ck+Cj+Ch)]/\beta\}$$

$$V1 = +Vk \times [Ck/(Ck+Cj+Ch)] + VT \times [(Ch \times Ck)/\beta]$$

$$V4 = +Vk+Vt \times \{[Ch \times (Ck+Cj+Ch)]/\beta\}$$

$$V2 = +Vk \times [Ck/(Ck+Cj+Ch)] + Vt \times [(Ch \times Ck)/\beta]$$

That is, V3≧V4≧V2 and V3≧V1 are satisfied.

Figure 22:
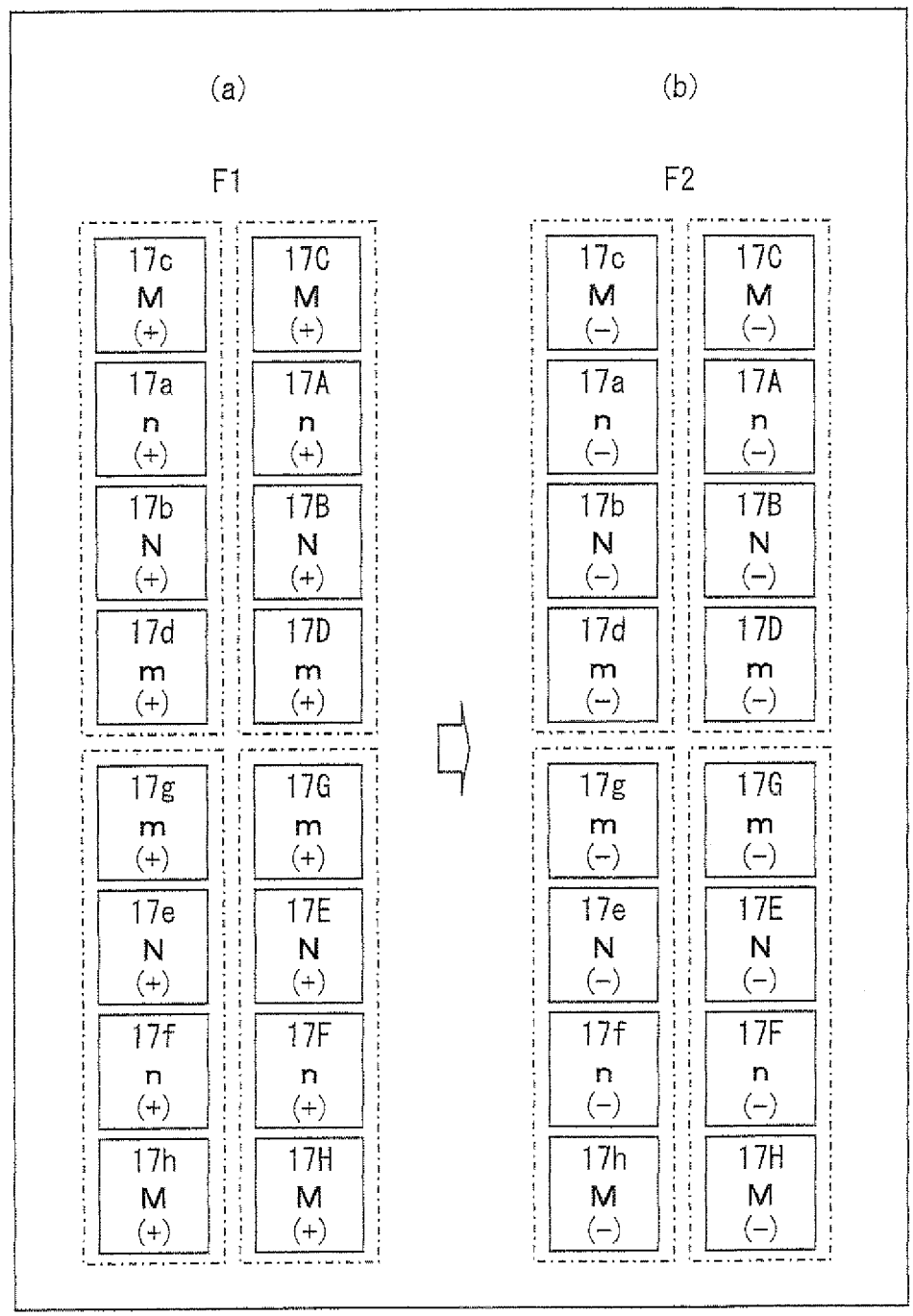
FIG. 22 is a view schematically illustrating a display state per frame in a case where the driving method of FIG. 21 is used.

Since V4−V1=Vk×[(Cj+Ch)/(Ck+Cj+Ch)]+(Ch/β)×[Vt×(Ck+Cj+Ch)−VT×Ck], V3≧V4≧V1≧V2 can be satisfied as in FIG. 21 regardless of a value of Vk, as long as Vt×(Ck+Cj+Ch)−VT×Ck≧0⇔VT≦Vt×[(Ck+Cj+Ch)/Ck]. As a result, when a halftone is displayed, a sub-pixel including the pixel electrode 17c (positive polarity) becomes a super-high-brightness sub-pixel, a sub-pixel including the pixel electrode 17d (positive polarity) becomes a high-brightness sub-pixel, a sub-pixel including the pixel electrode 17a (positive polarity) becomes a low-brightness sub-pixel, and a sub-pixel including the pixel electrode 17b (positive polarity) becomes a super-low-brightness sub-pixel. That is, the halftone is displayed in the pixels 100 to 103 as shown in FIG. 22 (a).

In a frame 2 (F2) of FIG. 21, the CS signal CSSp is level-shifted to a negative side by an amount of VT, and the CS signal CSSq is level-shifted to a negative side by an amount of Vt which is smaller than VT. Moreover, V=−Vk≦0 and Vp=−VT<Vq=−Vt<0. As such, the following equations can be obtained:

$$V1 = -Vk-Vt \times \{[Ch \times (Ck+Cj+Ch)]/\beta\}$$

$$V2 = -Vk \times [Ck/(Ck+Cj+Ch)] - Vt \times [(Ch \times Ck)/\beta]$$

$$V3 = -Vk-VT \times \{[Ch \times (Ck+Cj+Ch)]/\beta\}$$

$$V4 = -Vk \times [Ck/(Ck+Cj+Ch)] - VT \times [(Ch \times Ck)/\beta]$$

That is, V3≦V4≦V2 and V3≦V1 are satisfied.

Since V4−V1=−Vk×[Cj/(Ck+Cj+Ch)]−(Ch/β)×[Vt×(Ck+Cj+Ch)−VT×Ck], V4≦V1 can be satisfied (i.e., V3≦V4≦V1≦V2 can be satisfied as in FIG. 21) regardless of a value of Vk, as long as VT≦Vt×[(Cj+Ck+Ch)/Ck]. As a result, when a halftone is displayed, a sub-pixel including the pixel electrode 17g (negative polarity) becomes a super-high-brightness sub-pixel, a sub-pixel including the pixel electrode 17h (negative polarity) becomes a high-brightness sub-pixel, a sub-pixel including the pixel electrode 17e (negative polarity) becomes a low-brightness sub-pixel, and a sub-pixel including the pixel electrode 17f (negative polarity) becomes a super-low-brightness sub-pixel. That is, the halftone is displayed in the pixels 100 to 103 as shown in FIG. 22 (b).

Figure 23:
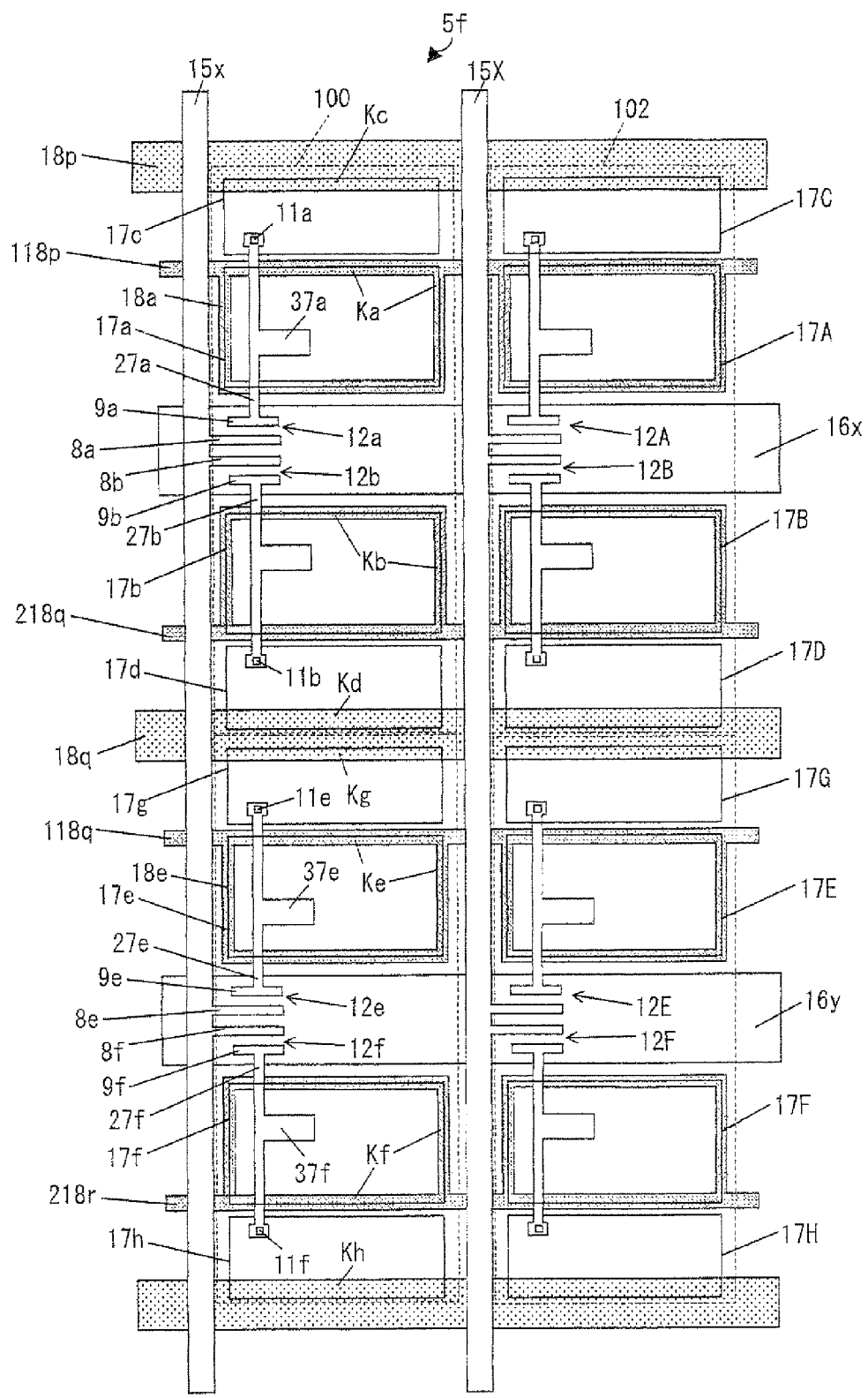
FIG. 23 is a plan view illustrating a specific example of the liquid crystal panel of Embodiment 3.

FIG. 23 illustrates one specific example of the present liquid crystal panel. In a liquid crystal panel 5f illustrated in FIG. 23, each pixel is divided into two sections (regions) by a scanning signal line traversing the pixel. In one of the two sections, (i) a first pixel electrode connected to a transistor and (ii) a second pixel electrode connected to the first pixel electrode via a capacitor are disposed so that the first pixel electrode is disposed adjacent to the scanning signal line. In the other one of the two sections, (i) a first pixel electrode connected to a transistor and (ii) a second pixel electrode connected to the first pixel electrode via a capacitor are disposed so that the first pixel electrode is disposed adjacent to the scanning signal line. One storage capacitor wire (e.g., the storage capacitor wire 18p) for supplying a CS signal is associated with two pixels disposed adjacent in the column direction, and two storage capacitor wires (e.g., the storage capacitor wires 118p and 218q) for supplying a constant potential (Vcom) signal is associated with one pixel.

Specifically, the data signal line 15x is provided parallel to the pixels 100 and 101, and the data signal line 15x is provided parallel to the pixels 102 and 103. The scanning signal line 16x traverses a mid part of the pixel 100 and a mid part of the pixel 102, and the scanning signal line 16y traverses a mid part of the pixel 101 and a mid part of the pixel 103. The storage capacitor wire 18p is disposed so as to overlap a pixel row including the pixels 100 and 102 and a pixel row disposed, in FIG. 23, above the pixel row including the pixels 100 and 102; the storage capacitor wire 18q is disposed so as to overlap the pixel row including the pixels 100 and 102 and a pixel row including the pixels 101 and 103; and the storage capacitor wire 18r is disposed so as to overlap the pixel row including the pixels 101 and 103 and a pixel row disposed, in FIG. 23, below the pixel row including the pixels 101 and 103. The storage capacitor wire 118p is disposed between the storage capacitor wire 18p and the scanning signal line 16x, the storage capacitor wire 218q is disposed between the scanning signal line 16x and the storage capacitor wire 18q, the storage capacitor wire 118q is disposed between the storage capacitor wire 18q and the scanning signal line 16y, and the storage capacitor wire 218r is disposed between the scanning signal line 16y and the storage capacitor wire 18r. As to the pixel 100 for example, in one section disposed, in FIG. 23, above the scanning signal line 16x which traverses the mid part of the pixel 100, the rectangular-shaped pixel electrode 17a connected to the transistor 12a is disposed adjacent to the scanning signal line 16x and the rectangular-shaped pixel electrode 17c connected to the pixel electrode 17a via a capacitor is disposed adjacent to one of two edges of the pixel 100, which two edges run along the row direction. In the other section disposed, in FIG. 23, below the scanning signal line 16x, the rectangular-shaped pixel electrode 17b connected to the transistor 12b is disposed adjacent to the scanning signal line 16x and the rectangular-shaped pixel electrode 17d connected to the pixel electrode 17b via a capacitor is disposed adjacent to the other one of the two edges of the pixel 100, which two edges run along the row direction.

A source electrode 8a and a drain electrode 9a of the transistor 12a and a source electrode 8b and a drain electrode 9b of the transistor 12b are provided on the scanning signal line 16x. The source electrode 8a is connected to the data signal line 15x. The drain electrode 9a is connected to a drain draw-out wire 27a. The drain draw-out wire 27a is connected to a coupling capacitor electrode 37a formed in an identical layer to the drain draw-out wire 27a, and is connected to the pixel electrode 17c via a contact hole 11a. The coupling capacitor electrode 37a overlaps the pixel electrode 17a via an interlayer insulating film. As a result, the coupling capacitor Cac (see FIG. 20) between the pixel electrodes 17a and 17c is formed. Moreover, the source electrode 8b is connected to the data signal line 15x. The drain electrode 9b is connected to a drain draw-out wire 27b. The drain draw-out wire 27b is connected to a coupling capacitor electrode 37b formed in an identical layer to the drain draw-out wire 27b, and is connected to the pixel electrode 17d via a contact hole 11b. The coupling capacitor electrode 37b overlaps the pixel electrode 17b via the interlayer insulating film. As a result, the coupling capacitor Cbd (see FIG. 20) between the pixel electrodes 17b and 17d is formed.

Further, the storage capacitor wire 18p overlaps the pixel electrode 17c, so that the storage capacitance Che (see FIG. 20) is formed in an overlapping part Kc where the storage capacitor wire 18p overlaps the pixel electrode 17c. The storage capacitor wire 118p is formed so as to overlap a part of an edge of the pixel electrode 17a. The storage capacitor wire 118p has a storage capacitor wire extension 118a which branches off from the storage capacitor wire 118p, extends so as to overlap a remaining part of the edge of the pixel electrode 17a or run around the remaining part of the edge, and is merged with the storage capacitor wire 118p again. The storage capacitance Cha (see FIG. 20) is formed in an overlapping part Ka where the storage capacitor wire 118p and the storage capacitor wire extension 118a overlap the pixel electrode 17a. The storage capacitor wire 18q is formed so as to overlap the pixel electrode 17d, so that the storage capacitance Chd (see FIG. 20) is formed in an overlapping part Kd where the storage capacitor wire 18q overlaps the pixel electrode 17d. The storage capacitor wire 218q is formed so as to overlap a part of an edge of the pixel electrode 17b. The storage capacitor wire 218g has a storage capacitor wire extension 218b which branches off from the storage capacitor wire 218q, extends so as to overlap a remaining part of the edge of the pixel electrode 17b or run around the remaining part of the edge, and is merged with the storage capacitor wire 218q again. The storage capacitance Chb (see FIG. 20) is formed in an overlapping part Kb where the storage capacitor wire 218q and the storage capacitor wire extension 218b overlap the pixel electrode 17b.

As to the pixel 101, in one section disposed, in FIG. 23, above the scanning signal line 16y which traverses the mid part of the pixel 101, the rectangular-shaped pixel electrode 17e connected to the transistor 12e is disposed adjacent to the scanning signal line 16y and the rectangular-shaped pixel electrode 17g connected to the pixel electrode 17e via a capacitor is disposed adjacent to one of two edges of the pixel 101, which two edges run along the row direction. In the other section disposed, in FIG. 23, below the scanning signal line 16y, the rectangular-shaped pixel electrode 17f connected to the transistor 12f is disposed adjacent to the scanning signal line 16y and the rectangular-shaped pixel electrode 17h connected to the pixel electrode 17f via a capacitor is disposed adjacent to the other one of the two edges of the pixel 101, which two edges run along the row direction. A source electrode 8e and a drain electrode 9e of the transistor 12e and a source electrode 8f and a drain electrode 9f of the transistor 12f are provided on the scanning signal line 16y. The source electrode 8e is connected to the data signal line 15x. The drain electrode 9e is connected to a drain draw-out wire 27e. The drain draw-out wire 27e is connected to a coupling capacitor electrode 37e formed in an identical layer to the drain draw-out wire 27e, and is connected to the pixel electrode 17g via a contact hole 11e. The coupling capacitor electrode 37e overlaps the pixel electrode 17e via the interlayer insulating film. As a result, the coupling capacitor Ceg (see FIG. 20) between the pixel electrodes 17e and 17g is formed. Moreover, the source electrode 8f is connected to the data signal line 15x. The drain electrode 9f is connected to a drain draw-out wire 27f. The drain draw-out wire 27f is connected to a coupling capacitor electrode 37f formed in an identical layer to the drain draw-out wire 27f, and is connected to the pixel electrode 17h via a contact hole 11f. The coupling capacitor electrode 37f overlaps the pixel electrode 17f via the interlayer insulating film. As a result, the coupling capacitor Cfh (see FIG. 20) between the pixel electrodes 17f and 17h is formed.

Further, the storage capacitor wire 18q overlaps the pixel electrode 17g, so that the storage capacitance Chg (see FIG. 20) is formed in an overlapping part Kg where the storage capacitor wire 18q overlaps the pixel electrode 17g. The storage capacitor wire 118q is formed so as to overlap a part of an edge of the pixel electrode 17e. The storage capacitor wire 118q has a storage capacitor wire extension 118e which branches off from the storage capacitor wire 118q, extends so as to overlap a remaining part of the edge of the pixel electrode 17e or run around the remaining part of the edge, and is merged with the storage capacitor wire 118q again. The storage capacitance Che (see FIG. 20) is formed in an overlapping part Ke where the storage capacitor wire 118g and the storage capacitor wire extension 118e overlap the pixel electrode 17e. The storage capacitor wire 18r is formed so as to overlap the pixel electrode 17h, so that the storage capacitance Chh (see FIG. 20) is formed in an overlapping part Kh where the storage capacitor wire 18r overlaps the pixel electrode 17h. The storage capacitor wire 218r is formed so as to overlap a part of an edge of the pixel electrode 17f. The storage capacitor wire 218r has a storage capacitor wire extension 218f which branches off from the storage capacitor wire 218r, extends so as to overlap a remaining part of the edge of the pixel electrode 17f or run around the remaining part of the edge, and is merged with the storage capacitor wire 218r again. The storage capacitance Chf (see FIG. 20) is formed in an overlapping part Kf where the storage capacitor wire 218r and the storage capacitor wire extension 218f overlap the pixel electrode 17f.

According to the present liquid crystal display device, four sub-pixels provided in a single pixel can be controlled so as to have different brightness from one another during a halftone display. In a case where the present liquid crystal display device is applied to a liquid crystal display device of an MVA mode for example, 16 (4 directions×4 types) domains (alignment regions) are formed in a single pixel. This allows an improvement in viewing angle characteristics. Moreover, according to the present liquid crystal display device, the storage capacitor wires and the storage capacitor wire extensions can function as electric shield patterns for shielding the electrically floating pixel electrodes (17a, 17b, 17e, and 17f). This makes it possible to suppress electric charge from going into these pixel electrodes (17a, 17b, 17e, and 17f) and to prevent image sticking of sub-pixels including the respective pixel electrodes as much as possible. Moreover, one storage capacitor wire for supplying a CS signal is associated with two pixel rows (i.e., this storage capacitor wire is shared by two pixels that are adjacent in the column direction). This allows a reduction in the number of storage capacitor wires for supplying a CS signal, thereby reducing the number of CS signals. As such, a configuration of a CS control circuit can be simplified, and a pixel aperture ratio can be increased. Moreover, each of the storage capacitor wire can have a redundancy effect due to a storage capacitor wire extension. For example, even if disconnection of a storage capacitor wire occurs somewhere between a part from which a storage capacitor wire extension branches off and a part with which the storage capacitor wire extension is merged, the storage capacitor wire extension serves as a bypass through which a constant potential (Vcom) signal can be supplied to a part which follows the disconnected point of the storage capacitor wire.

Figure 24:
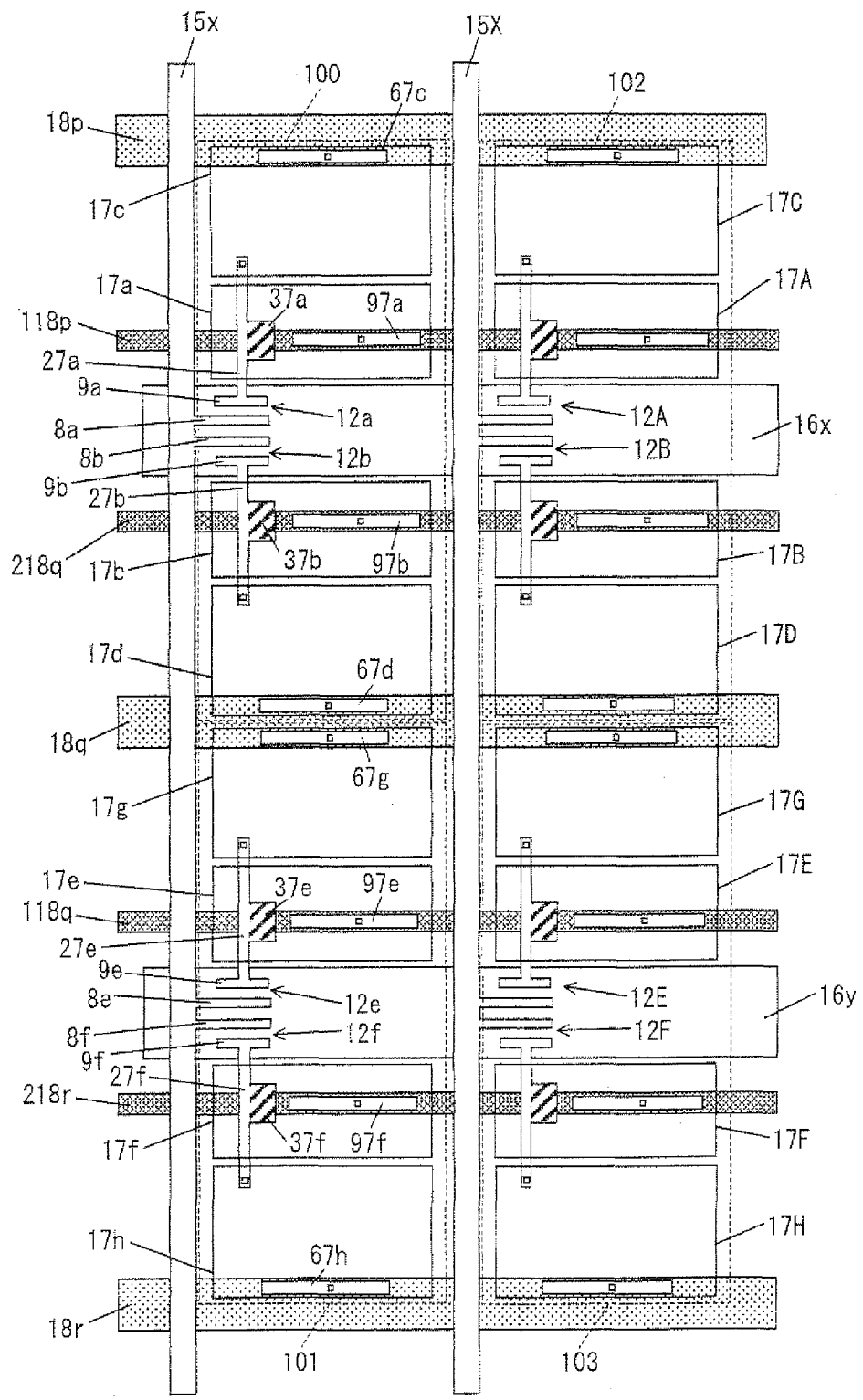
FIG. 24 is a plan view illustrating another specific example of the liquid crystal panel of Embodiment 3.

In the liquid crystal panel 5f of FIG. 23, the interlayer insulating film is constituted only by an inorganic interlayer insulating film. However, it is also possible that the interlayer insulating film has a two-layer structure of an inorganic interlayer insulating film and an organic interlayer insulating film that is thicker than the inorganic interlayer insulating film. Note, however, that in this case, it is desirable that the liquid crystal panel 5f be configured as illustrated in FIG. 24 in order to secure sufficient coupling capacitance value and storage capacitance value. In the pixel 100 for example, a storage capacitor electrode 97a that is formed in an identical layer to the drain draw-out wire 27a and is connected to the pixel electrode 17a via a contact hole is provided on the storage capacitor wire 118p, a storage capacitor electrode 67c that is formed in an identical layer to the drain draw-out wire 27a and is connected to the pixel electrode 17c via a contact hole is provided on the storage capacitor wire 18p, a storage capacitor electrode 97b that is formed in an identical layer to the drain draw-out wire 27b and is connected to the pixel electrode 17b via a contact hole is provided on the storage capacitor wire 218q, and a storage capacitor electrode 67d that is formed in an identical layer to the drain draw-out wire 27b and is connected to the pixel electrode 17d via a contact hole is provided on the storage capacitor wire 18q. Moreover, the organic interlayer insulating film is hollowed out or locally thinned in parts where it overlaps the coupling capacitor electrodes 37a and 37b. This configuration can provide effects of reducing various parasitic capacitances, preventing short-circuiting of wires, reducing a split of a pixel electrode caused by planarization, and the like while securing sufficient coupling capacitance value and storage capacitance value.

[Embodiment 4]

Figure 25:
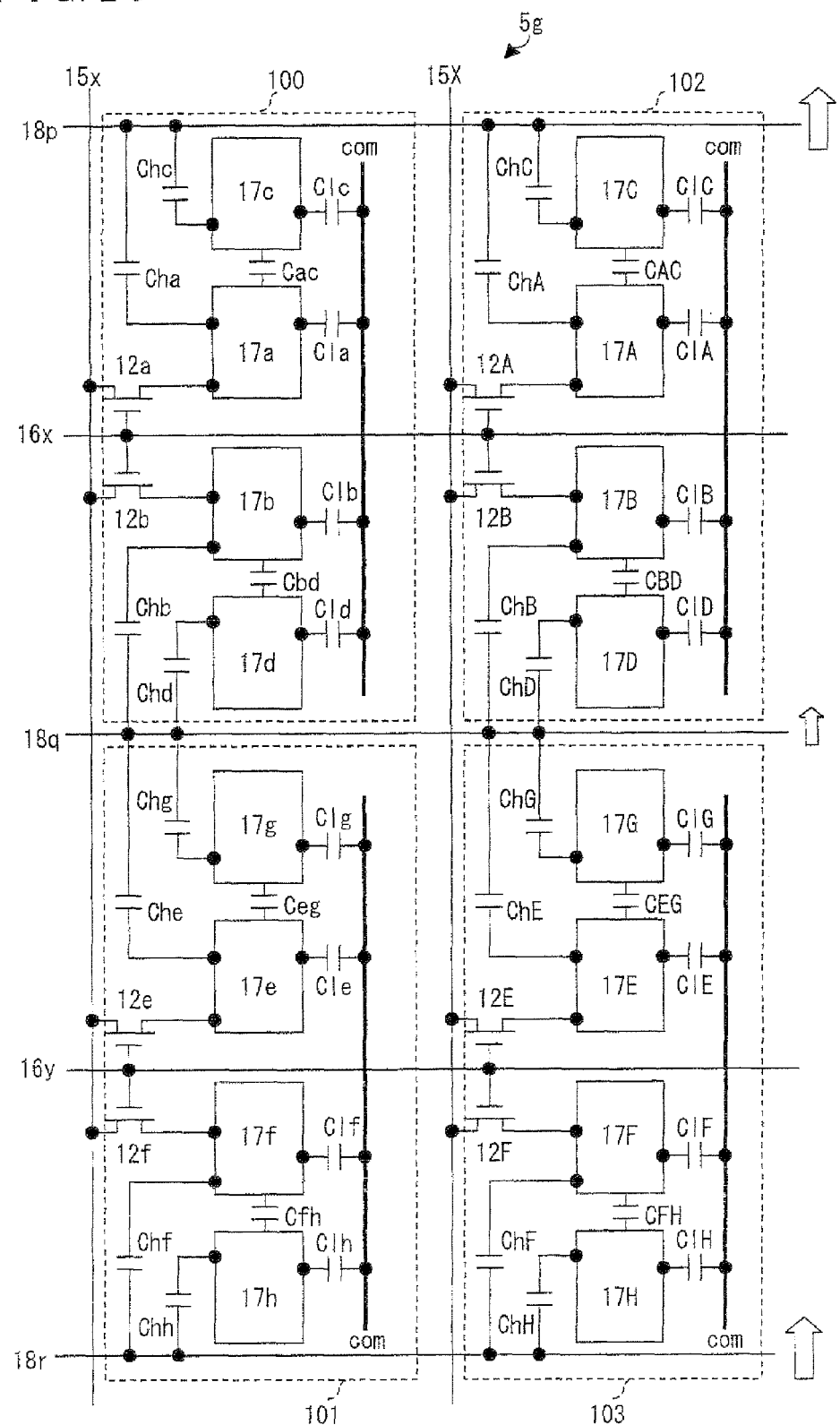
FIG. 25 is a circuit diagram illustrating a configuration of a liquid crystal panel of Embodiment 4.

FIG. 25 is an equivalent circuit diagram of one part of a liquid crystal panel of Embodiment 4. As illustrated in FIG. 25, in the present liquid crystal panel, one storage capacitor wire for supplying a CS signal is associated with two pixel rows that are adjacent in a column direction. Data signal lines, scanning signal lines, transistors, and pixel electrodes are disposed in a similar manner to FIG. 1.

In a pixel 100, pixel electrodes 17a and 17c are connected to each other via a coupling capacitor Cac, and pixel electrodes 17b and 17d are connected to each other via a coupling capacitor Cbd. The pixel electrode 17a is connected to a data signal line 15x via a transistor 12a that is connected to a scanning signal line 16x, and the pixel electrode 17b is connected to the data signal line 15x via a transistor 12b that is connected to the scanning signal line 16x. Storage capacitance Cha is formed between the pixel electrode 17a and a storage capacitor wire 18p, storage capacitance Chc is formed between the pixel electrode 17c and the storage capacitor wire 18p, storage capacitance Chb is formed between the pixel electrode 17b and a storage capacitor wire 18q, and storage capacitance Chd is formed between the pixel electrode 17d and the storage capacitor wire 18q. Note that the storage capacitor wires 18p and 18q are storage capacitor wires for supplying a CS signal. Liquid crystal capacitance Clc is formed between the pixel electrode 17c and a common electrode com, liquid crystal capacitance Cla is formed between the pixel electrode 17a and the common electrode com, liquid crystal capacitance Clb is formed between the pixel electrode 17b and the common electrode com, and liquid crystal capacitance Cld is formed between the pixel electrode 17d and the common electrode com.

Meanwhile, in a pixel 101 disposed adjacent to the pixel 100 in the column direction, pixel electrodes 17e and 17g are connected to each other via a coupling capacitor Ceg, and pixel electrodes 17f and 17h are connected to each other via a coupling capacitor Cfh. The pixel electrode 17e is connected to the data signal line 15x via a transistor 12e that is connected to a scanning signal line 16y, and the pixel electrode 17f is connected to the data signal line 15x via a transistor 12f that is connected to the scanning signal line 16y. Storage capacitance Che is formed between the pixel electrode 17e and the storage capacitor wire 18q, storage capacitance Chg is formed between the pixel electrode 17g and the storage capacitor wire 18q, storage capacitance Chf is formed between the pixel electrode 17f and a storage capacitor wire 18r, and storage capacitance Chh is formed between the pixel electrode 17h and the storage capacitor wire 18r. Note that the storage capacitor wires 18q and 18r are storage capacitor wires for supplying a CS signal. Liquid crystal capacitance Clg is formed between the pixel electrode 17g and the common electrode com, liquid crystal capacitance Cle is formed between the pixel electrode 17e and the common electrode com, liquid crystal capacitance Clf is formed between the pixel electrode 17f and the common electrode com, and liquid crystal capacitance Clh is formed between the pixel electrode 17h and the common electrode com.

Moreover, in a pixel 102 disposed adjacent to the pixel 100 in a row direction, pixel electrodes 17A and 17C are connected to each other via a coupling capacitor CAC, and pixel electrodes 17B and 17D are connected to each other via a coupling capacitor CBD. The pixel electrode 17A is connected to a data signal line 15X via a transistor 12A that is connected to the scanning signal line 16x, and the pixel electrode 17B is connected to the data signal line 15X via a transistor 12B that is connected to the scanning signal line 16x. Storage capacitance ChA is formed between the pixel electrode 17A and the storage capacitor wire 18p, storage capacitance ChC is formed between the pixel electrode 17C and a storage capacitor wire 18p, storage capacitance ChB is formed between the pixel electrode 17B and a storage capacitor wire 18q, and storage capacitance ChD is formed between the pixel electrode 17D and the storage capacitor wire 18q. Liquid crystal capacitance ClC is formed between the pixel electrode 17C and the common electrode com, liquid crystal capacitance ClA is formed between the pixel electrode 17A and the common electrode com, liquid crystal capacitance ClB is formed between the pixel electrode 17B and the common electrode com, and liquid crystal capacitance ClD is formed between the pixel electrode 17D and the common electrode com.

Figure 26:
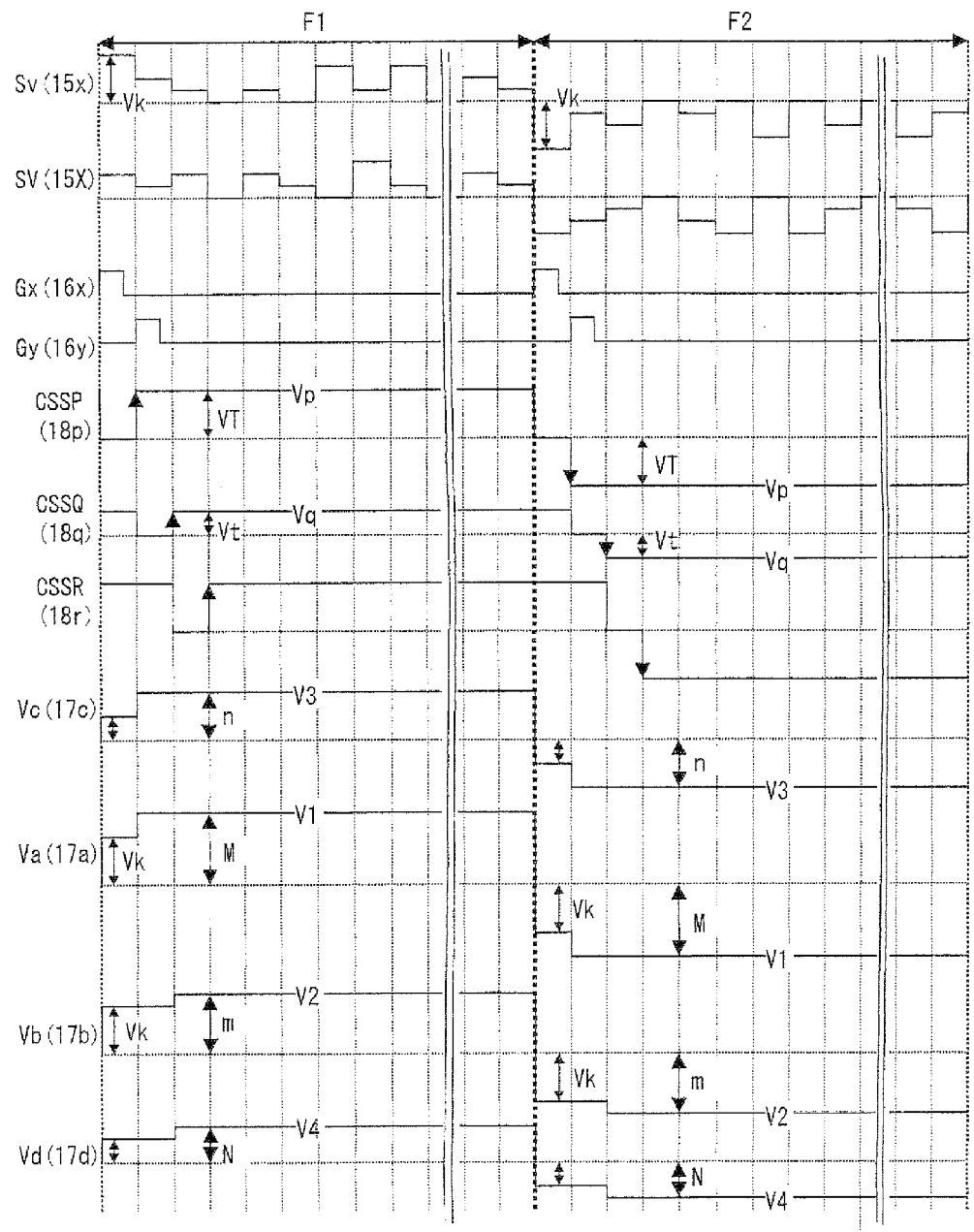
FIG. 26 is a timing chart showing a driving method of a liquid crystal display device including the liquid crystal panel of FIG. 25.

FIG. 26 is a timing chart showing a driving method of a liquid crystal display device (normally black mode) including the liquid crystal panel of FIG. 25. Sv and sV are signal electric potentials supplied to the data signal lines 15x and 15X, respectively; Gx and Gy are gate on-pulse signals to be supplied to the scanning signal lines 16x and 16y, respectively; CSSP, CSSQ, and CSSR are CS signals (storage capacitor wire signals) supplied to the storage capacitor wires 18p, 18q, and 18r, respectively; and Va to Vd are electric potentials of respective four pixel electrodes 17a to 17d disposed in the pixel 100.

As shown in FIGS. 25 and 26, in the present liquid crystal display device, the storage capacitor wire 18p of the two storage capacitor wires 18p and 18q forms a storage capacitance with the pixel electrode 17a (first pixel electrode) that is connected to the data signal line 15x via the transistor 12a (first transistor), and forms a storage capacitance with the pixel electrode 17c (third pixel electrode) that is capacitively-coupled with the pixel electrode 17a. Meanwhile, the storage capacitor wire 18q forms a storage capacitance with the pixel electrode 17b (second pixel electrode) that is connected to the data signal line 15x via the transistor 12b (second transistor), and forms a storage capacitance with the pixel electrode 17d (fourth pixel electrode) that is capacitively-coupled with the pixel electrode 17b. Different CS signals are supplied to these two storage capacitor wires 18p and 18q, respectively. Note that the scanning signal lines are sequentially selected so that (i) a polarity of a signal electric potential supplied to each data signal line is inverted per one vertical scanning period (1 frame), and (ii) during a single horizontal scanning period, signal electric potentials of an identical polarity are supplied to the two adjacent data signal lines, respectively.

Specifically, the CS signal CSSP supplied to the storage capacitor wire 18p and the CS signal CSSQ supplied to the storage capacitor wire 18q are kept at the substantially same level during a period in which the transistor 12a and 12b are being turned ON (an active period of Gx). After the transistors 12a and 12b are turned OFF, the CS signal CSSP and the CS signal CSSQ are level-shifted in an identical direction, but are different in a level-shift amount. In a frame in which a signal electric potential supplied to the pixel electrodes 17a and 17b is of a positive polarity, the two CS signals (CSSP and CSSQ) are level-shifted to a positive side, and in a frame in which the signal electric potential supplied to the pixel electrodes 17a and 17b is of a negative polarity, the two CS signals (CSSP and CSSQ) are level-shifted to a negative side.

Since v1=v2=V and vp=vq=0 (Vcom), the following equations 1 to 4 are obtained in accordance with a law of conservation of charge of the pixel electrodes 17a to 17d.

$$Cj \times V + Ch \times V + Ck \times (V - v3) = q1 \qquad \text{equation 1}$$

$$Cj \times V + Ch \times V + Ck \times (V - v4) = q2 \qquad \text{equation 2}$$

$$Cj \times v3 - Ck \times (V - v3) = q3 = 0 \qquad \text{equation 3}$$

$$Cj \times v4 - Ck \times (V - v4) = q4 = 0 \qquad \text{equation 4}$$

where (i) V is the signal electric potential supplied to the pixel electrodes 17a and 17b, (ii) Cla=Clb=Clc=Cld=Cj, Cac=Cbd=Ck, Cha=Chb=Ch in FIG. 25, (iii) v1 to v4 are electric potentials of the pixel electrodes 17a to 17d achieved when the transistors 12a and 12b are turned OFF, (iv) vp and vq are levels of the CS signals CSSP and CSSQ achieved when the transistors 12a and 12b are turned OFF, and (v) q1 to q4 are total charge amounts of the pixel electrodes 17a to 17d achieved when the transistors 12a and 12b are turned OFF. Moreover, since the levels of the CS signals CSSP and CSSQ are shifted to Vp and Vq, respectively after the transistor 12a and 12b are turned OFF, the following equations 5 to 9 are obtained in accordance with the law of conservation of charge of the pixel electrodes 17a to 17d.

$$Cj \times V1 + Ch \times (V1 - Vp) + Ck \times (V1 - V3) = q1 \qquad \text{equation 5}$$

$$Cj \times V2 + Ch \times (V2 - Vq) + Ck \times (V2 - V4) = q2 \qquad \text{equation 6}$$

$$Cj \times V3 - Ck \times (V1 - V3) = q3 = 0 \qquad \text{equation 7}$$

$$Cj \times V4 - Ck \times (V2 - V4) = q4 = 0 \qquad \text{equation 8}$$

where V1 to V4 are electric potentials of the pixel electrodes 17a to 17d achieved after the transistor 12a and 12b are turned OFF.

The following equation can be obtained from the equation 3 and 4:

$$v3 = v4 = V \times [Ck/(Ck + Cj + Ch)]$$

The following equations can be obtained from the equations 1, 3, 5, and 7:

$$V1 = V + Vp \times \gamma$$

$$V3 = V \times [Ck/(Ck + Cj + Ch)] + Vp \times \gamma$$

where $\gamma = [Ch \times (2 \times Ck + Cj + Ch)]/(Cj^2 + 2 \times Cj \times Ch + 2 \times Cj \times Ck + 2 \times Ch \times Ck + Ch^2)$.

Further, the following equations can be obtained from the equations 2, 4, 6, and 8:

$$V2 = V + Vq \times \gamma$$

$$V4 = V \times [Ck/(Ck + Cj + Ch)] + Vq \times \gamma$$

In a frame 1 (F1) shown in FIG. 26, the CS signal CSSP is level-shifted to a positive side by an amount of VT, and the CS signal. CSSQ is level-shifted to a positive side by an amount of Vt which is smaller than VT. Moreover, V=+Vk≧0 and Vp=+VT>Vq=+Vt>0. As such, the following equations can be obtained:

$$V1 = +Vk + VT \times \gamma$$

$$V2 = +Vk + Vt \times \gamma$$

$$V3=+Vk\times[Ck/(Ck+Cj+Ch)]+VT\times\gamma$$

$$V4=+Vk\times[Ck/(Ck+Cj+Ch)]+Vt\times\gamma$$

That is, V1≧V2≧V3≧V4 can be satisfied as in FIG. 26 regardless of a value of Vk. As a result, when a halftone is displayed, a sub-pixel including the pixel electrode 17a (positive polarity) becomes a super-high-brightness sub-pixel, a sub-pixel including the pixel electrode 17b (positive polarity) becomes a high-brightness sub-pixel, a sub-pixel including the pixel electrode 17c (positive polarity) becomes a low-brightness sub-pixel, and a sub-pixel including the pixel electrode 17d (positive polarity) becomes a super-low-brightness sub-pixel. That is, the halftone is displayed in the pixels 100 to 103 as shown in FIG. 3 (a).

In a frame 2 (F2) of FIG. 26, the CS signal CSSP is level-shifted to a negative side by an amount of VT, and the CS signal CSSQ is level-shifted to a negative side by an amount of Vt which is smaller than VT. Moreover, V=−Vk≦0 and Vp=−VT<Vq=−Vt<0. As such, the following equations can be obtained:

$$V1=-Vk-VT\times\gamma$$

$$V2=-Vk-Vt\times\gamma$$

$$V3=-Vk\times[Ck/(Ck+Cj+Ch)]-VT\times\gamma$$

$$V4=-Vk\times[Ck/(Ck+Cj+Ch)]-Vt\times\gamma$$

That is, V1≦V2≦V3≦V4 can be satisfied as in FIG. 26 regardless of a value of Vk as long as VT>Vt. As a result, when a halftone is displayed, a sub-pixel including the pixel electrode 17c (negative polarity) becomes a super-high-brightness sub-pixel, a sub-pixel including the pixel electrode 17f (negative polarity) becomes a high-brightness sub-pixel, a sub-pixel including the pixel electrode 17g (negative polarity) becomes low-brightness sub-pixel, and a sub-pixel including the pixel electrode 17h (negative polarity) becomes a super-low-brightness sub-pixel. That is, the halftone is displayed in the pixels 100 to 103 as shown in FIG. 3 (b).

Figure 27:
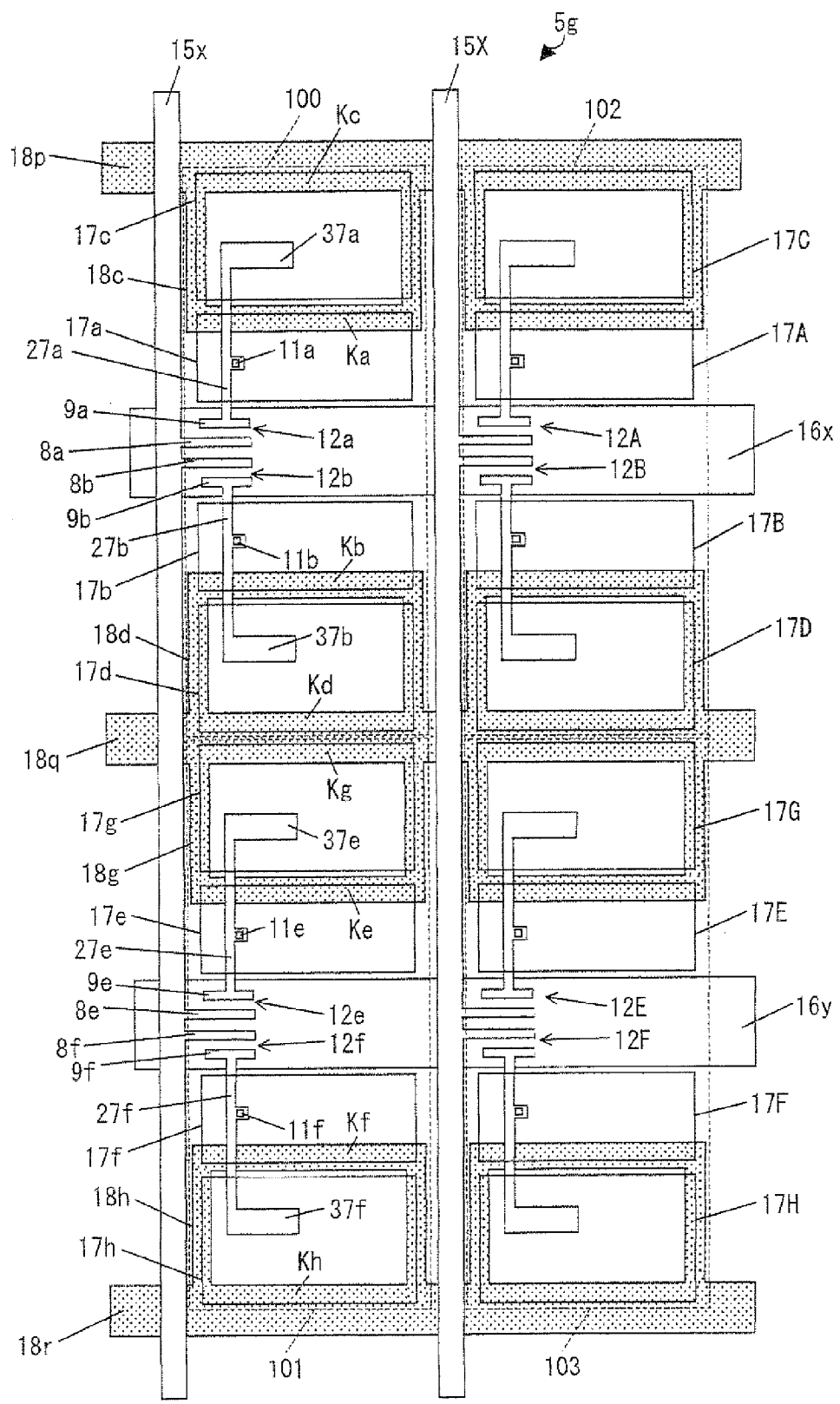
FIG. 27 is a plan view illustrating a specific example of the liquid crystal panel of Embodiment 4.

FIG. 27 illustrates one specific example of the present liquid crystal panel. In a liquid crystal panel 5g illustrated in FIG. 27, each pixel is divided into two sections (regions) by a scanning signal line traversing the pixel. In one of the two sections, (i) a first pixel electrode connected to a transistor and (ii) a second pixel electrode connected to the first pixel electrode via a capacitor are disposed so that the first pixel electrode is disposed adjacent to the scanning signal line. In the other one of the two sections, (i) a first pixel electrode connected to a transistor and (ii) a second pixel electrode connected to the first pixel electrode via a capacitor are disposed so that the first pixel electrode is disposed adjacent to the scanning signal line. One storage capacitor wire (e.g., the storage capacitor wire 18p) for supplying a CS signal is associated with two adjacent pixel rows. This storage capacitor wire overlaps a part of an edge (periphery) of a pixel electrode. Further, this storage capacitor wire has a storage capacitor wire extension which, from a plan view, extends so as to overlap a remaining part of the edge or run around the remaining part of the edge, and is merged with the storage capacitor wire again.

Specifically, the data signal line 15x is provided parallel to the pixels 100 and 101, and the data signal line 15X is provided parallel to the pixels 102 and 103. The scanning signal line 16x traverses a mid part of the pixel 100 and a mid part of the pixel 102, and the scanning signal line 16y traverses a mid part of the pixel 101 and a mid part of the pixel 103. The storage capacitor wire 18p is disposed so as to overlap a pixel row including the pixels 100 and 102 and a pixel row disposed, in FIG. 27, above the pixel row including the pixels 100 and 102; the storage capacitor wire 18q is disposed so as to overlap the pixel row including the pixels 100 and 102 and a pixel row including the pixels 101 and 103; and the storage capacitor wire 18r is disposed so as to overlap the pixel row including the pixels 101 and 103 and a pixel row disposed, in FIG. 27, below the pixel row including the pixels 101 and 103. As to the pixel 100 for example, in one section disposed, in FIG. 27, above the scanning signal line 16x which traverses the mid part of the pixel 100, the rectangular-shaped pixel electrode 17a connected to the transistor 12a is disposed adjacent to the scanning signal line 16x and the rectangular-shaped pixel electrode 17c connected to the pixel electrode 17a via a capacitor is disposed adjacent to one of two edges of the pixel 100, which two edges run along the row direction. In the other section disposed, in FIG. 27, below the scanning signal line 16x, the rectangular-shaped pixel electrode 17b connected to the transistor 12b is disposed adjacent to the scanning signal line 16x and the rectangular-shaped pixel electrode 17d connected to the pixel electrode 17b via a capacitor is disposed adjacent to the other one of the two edges of the pixel 100, which two edges run along the row direction. A source electrode 8a and a drain electrode 9a of the transistor 12a and a source electrode 8b and a drain electrode 9b of the transistor 12b are provided on the scanning signal line 16x. The source electrode 8a is connected to the data signal line 15x. The drain electrode 9a is connected to a drain draw-out wire 27a. The drain draw-out wire 27a is connected to a coupling capacitor electrode 37a formed in an identical layer to the drain draw-out wire 27a, and is connected to the pixel electrode 17a via a contact hole 11a. The coupling capacitor electrode 37a overlaps the pixel electrode 17c via an interlayer insulating film. As a result, the coupling capacitor Cac (see FIG. 25) between the pixel electrodes 17a and 17c is formed. Moreover, the source electrode 8b is connected to the data signal line 15x. The drain electrode 9b is connected to a drain draw-out wire 27b. The drain draw-out wire 27b is connected to a coupling capacitor electrode 37b formed in an identical layer to the drain draw-out wire 27b, and is connected to the pixel electrode 17b via a contact hole 11b. The coupling capacitor electrode 37b overlaps the pixel electrode 17d via the interlayer insulating film. As a result, the coupling capacitor Cbd (see FIG. 25) between the pixel electrodes 17b and 17d is formed.

The storage capacitor wire 18p overlaps a part (farther part from the scanning signal line 16x out of two parts which run along the row direction) of an edge (periphery) of the pixel electrode 17c, so that a large part of the storage capacitance Chc (see FIG. 25) is formed in an overlapping part Kc where they (the storage capacitor wire 18p and the pixel electrode 17e) overlap each other. The storage capacitor wire 18p has a storage capacitor wire extension 18c which, from a plan view, branches off from the storage capacitor wire 18p, extends so as to overlap a remaining part of the edge of the pixel electrode 17c or run around the remaining part of the edge, and is merged with the storage capacitor wire 18p again. As a result, the pixel electrode 17c that is electrically floating is electrically shielded by the storage capacitor wire 18p and the storage capacitor wire extension 18c. Moreover, the storage capacitor wire extension 18c overlaps the pixel electrode 17a, so that the storage capacitance Cha (see FIG. 25) is formed in an overlapping part Ka where they (storage capacitor wire extension 18c and the pixel electrode 17a) overlap each other. Similarly, the storage capacitor wire 18q overlaps a part (farther part from the scanning signal line 16x out of two parts which run along the row direction) of an edge (periphery) of the pixel electrode 17d, so that a large part of the storage capacitance Chd (see FIG. 25) is formed in an overlapping part Kd where they (the storage capacitor wire 18q and the pixel electrode 17d) overlap each other. The storage capacitor wire 18q has a storage capacitor wire extension 18d which, from a plan view, branches off from the storage capacitor wire 18q, extends so as to overlap a remaining part of the edge of the pixel electrode 17d or run around the remaining part of the edge, and is merged with the storage capacitor wire 18q again. As a result, the pixel electrode 17d that is electrically floating is electrically shielded by the storage capacitor wire 18q and the storage capacitor wire extension 18d. Moreover, the storage capacitor wire extension 18d overlaps the pixel electrode 17b, so that the storage capacitance Chb (see FIG. 25) is formed in an overlapping part Kb where they (storage capacitor wire extension 18d and the pixel electrode 17b) overlap each other. Note that a part of the storage capacitance Che is formed in an overlapping part where the storage capacitance wire extension 18c and the pixel electrode 17c overlap each other, and a part of the storage capacitance Chd is formed in an overlapping part where the storage capacitor wire extension 18d and the pixel electrode 17d overlap each other.

As to the pixel 101, in one section disposed, in FIG. 27, above the scanning signal line 16y which traverses the mid part of the pixel 101, the rectangular-shaped pixel electrode 17e connected to the transistor 12e is disposed adjacent to the scanning signal line 16y and the rectangular-shaped pixel electrode 17g connected to the pixel electrode 17e via a capacitor is disposed adjacent to one of two edges of the pixel 101, which two edges run along the row direction. In the other section disposed, in FIG. 27, below the scanning signal line 16y, the rectangular-shaped pixel electrode 17f connected to the transistor 12f is disposed adjacent to the scanning signal line 16y and the rectangular-shaped pixel electrode 17h connected to the pixel electrode 17f via a capacitor is disposed adjacent to the other one of the two edges of the pixel 101, which two edges run along the row direction. A source electrode 8e and a drain electrode 9e of the transistor 12e and a source electrode 8f and a drain electrode 9f of the transistor 12f are provided on the scanning signal line 16y. The source electrode Se is connected to the data signal line 15x. The drain electrode 9e is connected to a drain draw-out wire 27e. The drain draw-out wire 27e is connected to a coupling capacitor electrode 37e formed in an identical layer to the drain draw-out wire 27e, and is connected to the pixel electrode 17e via a contact hole 11e. The coupling capacitor electrode 37e overlaps the pixel electrode 17g via the interlayer insulating film. As a result, the coupling capacitor Ceg (see FIG. 25) between the pixel electrodes 17e and 17g is formed. Moreover, the source electrode 8f is connected to the data signal line 15x. The drain electrode 9f is connected to a drain draw-out wire 27f. The drain draw-out wire 27f is connected to a coupling capacitor electrode 37f formed in an identical layer to the drain draw-out wire 27f, and is connected to the pixel electrode 17f via a contact hole 11f. The coupling capacitor electrode 37f overlaps the pixel electrode 17h via the interlayer insulating film. As a result, the coupling capacitor Cfh (see FIG. 25) between the pixel electrodes 17f and 17h is formed.

The storage capacitor wire 18q overlaps a part of an edge (periphery) of the pixel electrode 17g, so that a large part of the storage capacitance Chg (see FIG. 25) is formed in an overlapping part Kg where they (the storage capacitor wire 18q and the pixel electrode 17g) overlap each other. The storage capacitor wire 18q has a storage capacitor wire extension 18g which, from a plan view, branches off from the storage capacitor wire 18q, extends so as to overlap a remaining part of the edge of the pixel electrode 17g or run around the remaining part of the edge, and is merged with the storage capacitor wire 18q again. As a result, the pixel electrode 17g that is electrically floating is electrically shielded by the storage capacitor wire 18q and the storage capacitor wire extension 18g. Moreover, the storage capacitor wire extension 18g overlaps the pixel electrode 17e, so that the storage capacitance Che (see FIG. 25) is formed in an overlapping part Ke where they (storage capacitor wire extension 18g and the pixel electrode 17e) overlap each other. Similarly, the storage capacitor wire 18r overlaps a part of an edge (periphery) of the pixel electrode 17h, so that a large part of the storage capacitance Chh (see FIG. 25) is formed in an overlapping part Kh where they (the storage capacitor wire 18r and the pixel electrode 17h) overlap each other. The storage capacitor wire 18r has a storage capacitor wire extension 18h which, from a plan view, branches off from the storage capacitor wire 18r, extends so as to overlap a remaining part of the edge of the pixel electrode 17h or run around the remaining part of the edge, and is merged with the storage capacitor wire 18r again. As a result, the pixel electrode 17h that is electrically floating is electrically shielded by the storage capacitor wire 18r and the storage capacitor wire extension 18h. Moreover, the storage capacitor wire extension 18h overlaps the pixel electrode 17f, so that the storage capacitance Chf (see FIG. 25) is formed in an overlapping part Kf where they (storage capacitor wire extension 18h and the pixel electrode 17f) overlap each other. Note that a part of the storage capacitance Chg is formed in an overlapping part where the storage capacitance wire extension 18g and the pixel electrode 17g overlap each other, and a part of the storage capacitance Chh is formed in an overlapping part where the storage capacitor wire extension 18h and the pixel electrode 17h overlap each other.

According to the present liquid crystal display device, four sub-pixels provided in a single pixel can be controlled so as to have different brightness from one another during a halftone display. In a case where the present liquid crystal display device is applied to a liquid crystal display device of an MVA mode for example, 16 (4 directions×4 types) domains (alignment regions) are formed in a single pixel. This allows an improvement in viewing angle characteristics. Moreover, according to the present liquid crystal display device, a bright sub-pixel (M or m in FIG. 3) in one pixel is not disposed adjacent to a bright sub-pixel in the other pixel. This allows more natural display as compared to a liquid crystal display device in which a bright sub-pixel in one pixel is disposed adjacent to a bright sub-pixel in the other pixel. Moreover, according to the present liquid crystal display device, the storage capacitor wires and the storage capacitor wire extensions can function as electric shield patterns for shielding the electrically floating pixel electrodes (17c, 17d, 17g, and 17h). This makes it possible to suppress electric charge from going into these pixel electrodes (17c, 17d, 17g, and 17h) and to prevent image sticking of sub-pixels including the respective pixel electrodes as much as possible. Moreover, one storage capacitor wire for supplying a CS signal is associated with two pixel rows (i.e., this storage capacitor wire is shared by two pixels that are adjacent in the column direction). This allows a reduction in the number of storage capacitor wires for supplying a CS signal, thereby reducing the number of CS signals. As such, a configuration of a CS control circuit can be simplified, and a pixel aperture ratio can be increased. Moreover, each of the storage capacitor wire can have a redundancy effect due to a storage capacitor wire extension. For example, even if disconnection of a storage capacitor wire occurs somewhere between a part from which a storage capacitor wire extension branches off and a part with which the storage capacitor wire extension is merged, the storage capacitor wire extension serves as a bypass through which a CS signal can be supplied to a part which follows the disconnected point of the storage capacitor wire.

Figure 28:
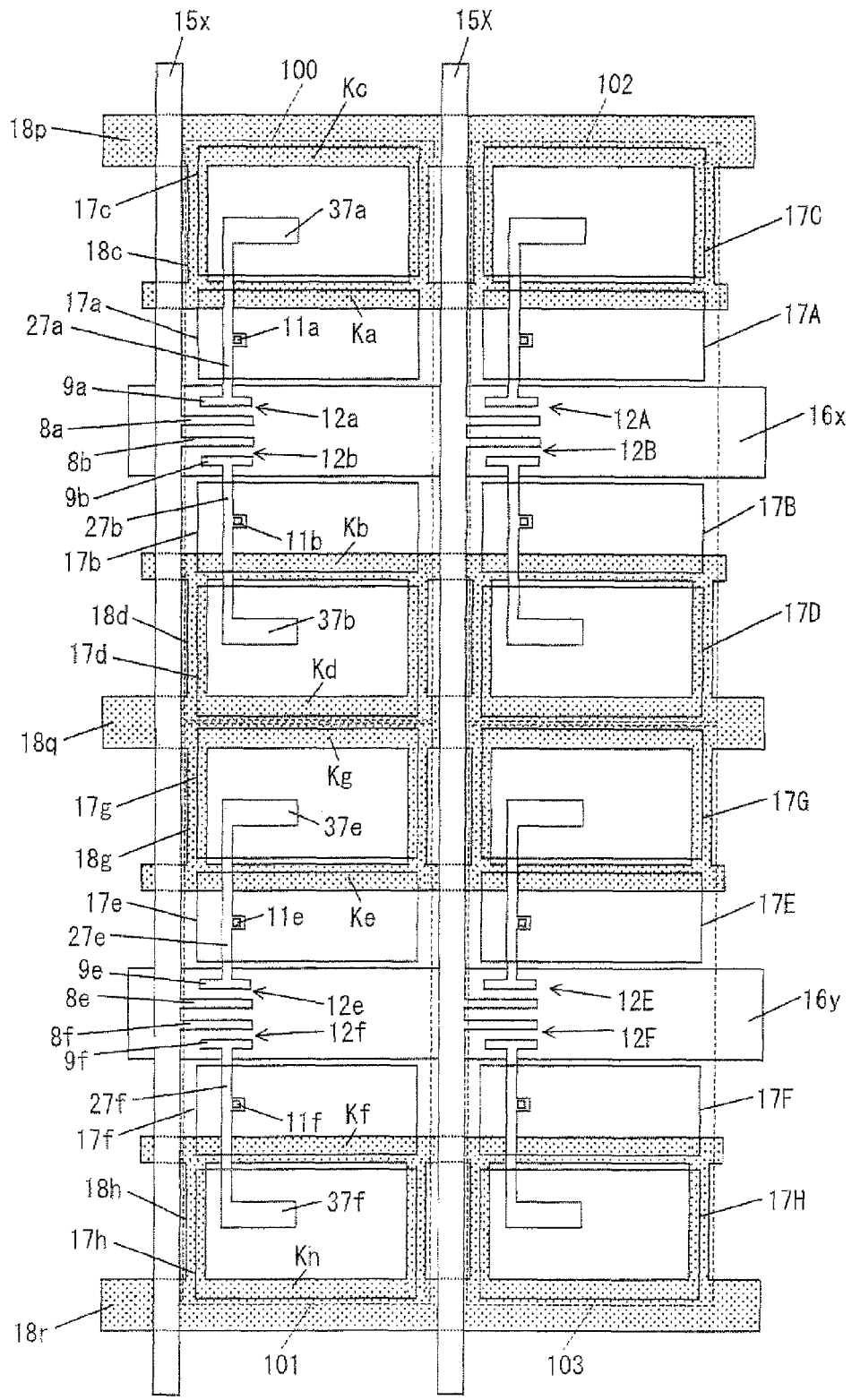
FIG. 28 is a plan view illustrating a specific example of the liquid crystal panel of Embodiment 4.

The liquid crystal panel 5g of FIG. 27 may be configured as illustrated in FIG. 28. Specifically, storage capacitor wire extensions that are adjacent in the column direction are connected to each other. In the pixel 100 for example, the storage capacitor wire 18p has (i) the storage capacitor wire extension 18c which branches off from the storage capacitor wire 18p, extends so as to overlap a remaining part of the edge of the pixel electrode 17c or run around the remaining part of the edge, and is merged with the storage capacitor wire 18p again, and (ii) a storage capacitor wire extension 18C which branches off from the storage capacitor wire 18p, extends so as to overlap a remaining part of an edge of the pixel electrode 17C or run around the remaining part of the edge, and is merged with the storage capacitor wire 18p again. The storage capacitor wire extensions 18c and 18C are connected to each other below the data signal line 15X. The configuration of FIG. 28 allows an improvement in redundancy effect of a storage capacitor wire in the liquid crystal panel 5g. For example, even in a case where disconnection of a storage capacitor wire occurs in a part where it intersects with a data signal line, two storage capacitor wire extensions that are connected to each other and are adjacent in the column direction serve as a bypass through which a CS signal can be supplied to a part which follows the disconnected part.

Figure 29:
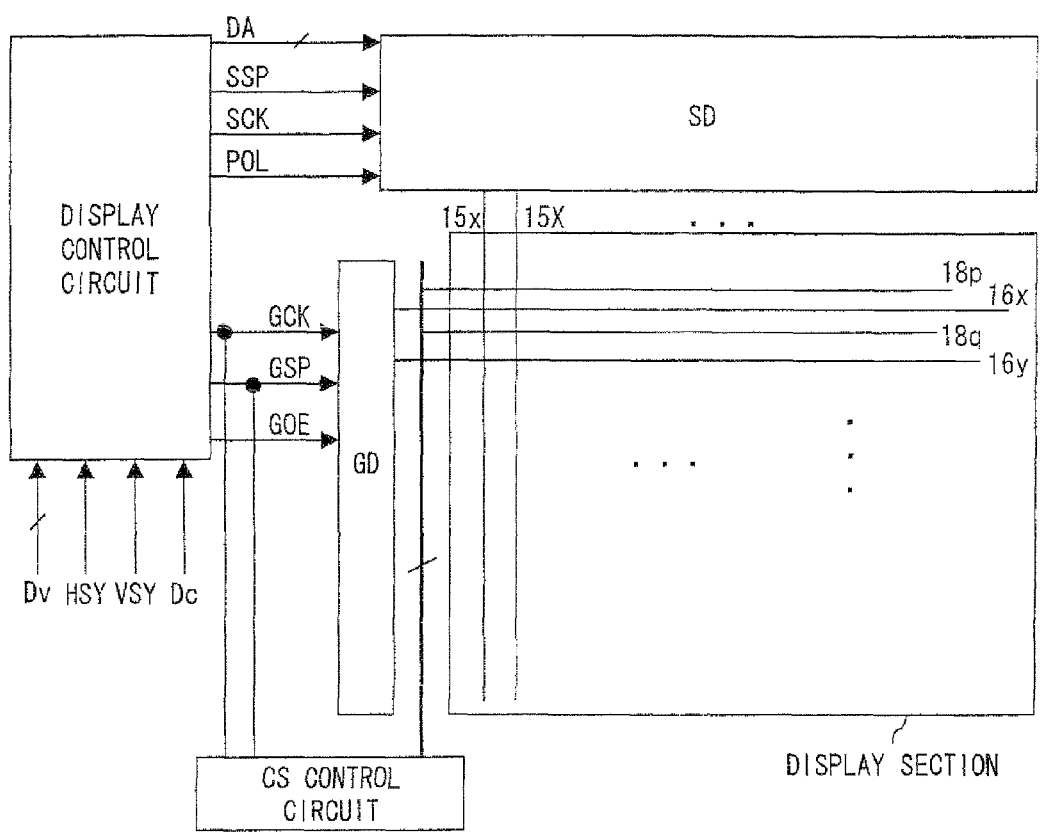
FIG. 29 is a block diagram illustrating an entire configuration of the present liquid crystal display device.

FIG. 29 is a block diagram illustrating a configuration of the present liquid crystal display device. As illustrated in FIG. 29, the present liquid crystal display device includes a display section (liquid crystal panel), a source driver (SD), a gate driver (GD), a display control circuit, and a CS control circuit. The source driver drives data signal lines, and the gate driver drives scanning signal lines. The display control circuit controls the source driver and the gate driver. The CS control circuit supplies various signals (a CS signal and a constant potential signal) to each storage capacitor wire.

The display control circuit receives, from an external signal source (e.g., tuner), a digital video signal Dv representing an image to be displayed, a horizontal sync signal HSY and a vertical sync signal VSY which correspond to the digital video signal Dv, and a control signal Dc for controlling a display operation. In response to the signals Dv, HSY, VSY, and Dc thus received, the display control circuit generates, as signals for displaying on the display section the image represented by the digital video signal Dv, a data start pulse signal SSP, a data clock signal SCK, a digital image signal DA (signal corresponding to the video signal Dv) representing the image to be displayed, a gate start pulse signal GSP, a gate clock signal GCK, and a gate driver output control signal (scanning signal output control signal) GOE. The display control circuit then outputs these signals.

More specifically, the display control circuit (i) outputs the video signal Dv as the digital image signal DA, after carrying out timing adjustment and the like of the video signal Dv by use of an inner memory as necessary, (ii) generates the data clock signal SCK as a signal made up of a pulse corresponding to pixels in the image that the digital image signal DA represents, (iii) generates the data start pulse signal SSP as a signal that, based on the horizontal sync signal HSY, becomes a high-level (H level) for just a predetermined time per horizontal scanning period, (iv) generates the gate start pulse signal GSP as a signal that, based on the vertical sync signal VSY, becomes a H level for just a predetermined time per frame period (one vertical scanning period), (v) generates the gate clock signal GCK based on the horizontal sync signal HSY, and (vi) generates the gate driver output control signal GOE based on the horizontal sync signal HSY and control signal Dc.

Among the signals that are generated in the display control circuit as aforementioned, the digital image signal DA, a polarity inversion signal POL that controls a polarity of the signal electric potential (data signal electric potential), the data start pulse signal SSP, and the data clock signal SCK are inputted into the source driver; whereas the gate start pulse signal GSP, gate clock signal GCK, and gate driver output control signal GOE are inputted into the gate driver. The gate start pulse signal GSP and the gate clock signal GCK are also inputted into the CS control circuit.

The source driver successively generates, per one horizontal scanning period, an analog electric potential (signal electric potential) that is equivalent to a pixel value in the scanning signal lines of the image represented by the digital image signal DA, based on the digital image signal DA, data clock signal SCK, data start pulse signal SSP, and polarity inversion signal POL. The source driver then outputs these data signals to the data signal lines (e.g., 15x and 15X). The gate driver generates a gate on-pulse signal based on the gate start pulse signal GSP, gate clock signal GCK, and gate driver output control signal GOE, and outputs this generated signal to the scanning signal line. This causes the scanning signal lines to be selectively driven. The CS control circuit generates a CS signal based on the gate start pulse signal GSP and the gate clock signal GCK and generates a constant potential signal. The CS control circuit then outputs these generated signals to each storage capacitor wire.

By driving the data signal lines and scanning signal lines of the display section (liquid crystal panel) by the source driver and gate driver as described above, a signal electric potential is written into a pixel electrode from the data signal lines via a transistor (TFT) connected to the selected scanning signal line. Moreover, the signal electric potential written into the pixel electrode is adjusted (modulated) by the CS signal. As a result, a voltage is applied to a liquid crystal layer of the sub-pixels, which controls the amount of light transmitted from the backlight. This causes display of the image represented by the digital video signal Dv on the display section.

Figure 30:
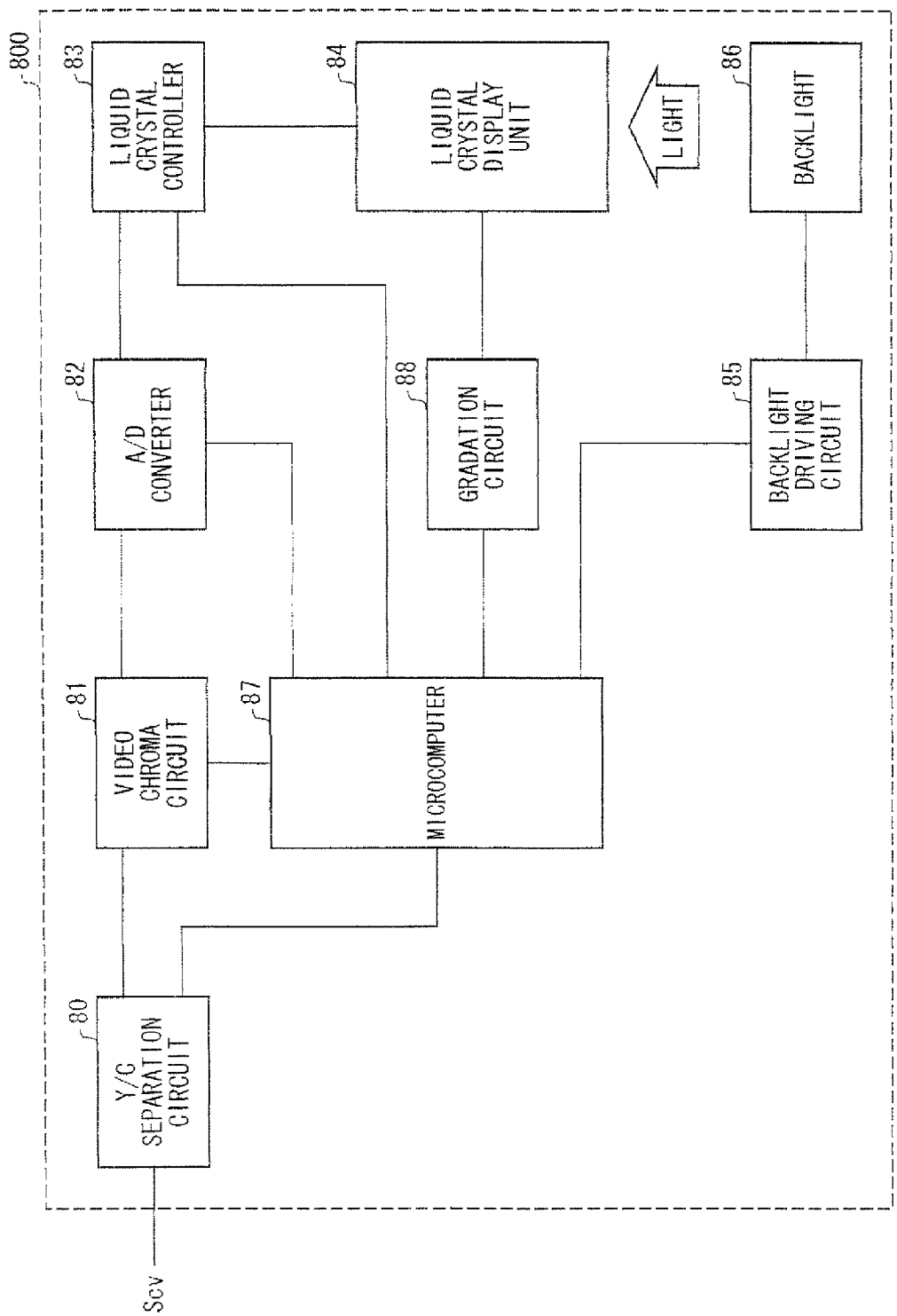
FIG. 30 is a block diagram illustrating functions of the present liquid crystal display device.

The following description explains one configuration example of the present liquid crystal display device in a case where the liquid crystal display device is applied to a television receiver. FIG. 30 is a block diagram illustrating a configuration of a liquid crystal display device 800 for use in a television receiver. The liquid crystal display device 800 includes: a liquid crystal display unit 84; a Y/C separation circuit 80, video chroma circuit 81; a A/D converter 82; a liquid crystal controller 83; a backlight driving circuit 85; a backlight 86; a microcomputer (microcomputer) 87; and a gradation circuit 88. The liquid crystal display unit 84 includes a liquid crystal panel, and a source driver and gate driver for driving the liquid crystal panel.

In the liquid crystal display device 800 of this configuration, first, a composite color video signal Scv as a television signal is inputted into the Y/C separation circuit 80 from outside, and the composite color video signal Scv is divided into a brightness signal and a color signal. The brightness signal and color signal are converted by the video chroma circuit 81 into analog RGB signals that correspond to the light's three principle colors, and further the analog ROB signals are converted by the A/D converter 82 into digital ROB signals. The digital RGB signals are inputted into the liquid crystal controller 83. Moreover, in the Y/C separation circuit 80, horizontal and vertical sync signals are also retrieved from the composite color video signal Scv inputted from the outside. These sync signals also are inputted into the liquid crystal controller 83 via the microcomputer 87.

In the liquid crystal display unit 84, the digital RGB signals are inputted from the liquid crystal controller 83 at a predetermined timing, together with a timing signal based on the sync signal. Moreover, in the gradation circuit 88, gradation electric potentials are generated for each of the three principle colors of color display R, G, B. These gradation electric potentials are also supplied to the liquid crystal display unit 84. In the liquid crystal display unit 84, a driving signal (data signal=signal electric potential, scanning signal etc.) is generated by the source driver, gate driver and the like provided inside, based on the RGB signals, timing signals, and gradation electric potentials, and a color image is displayed on the inner liquid crystal panel based on the driving signal. In order to display an image by the liquid crystal display unit 84, it is necessary to irradiate light from a rear side of liquid crystal panel inside of the liquid crystal display unit. With the liquid crystal display device 800, light is irradiated on a back side of the liquid crystal panel by having the backlight driving circuit 85 drive the backlight 86 under control of the microcomputer 87. Control of the entire system including the foregoing processes is carried out by the microcomputer 87. Video signals inputted from the outside (composite color video signal) may be not just video signals based on television broadcast, but may also be video signals captured by a camera and video signals supplied via Internet connection. With use of the liquid crystal display device 800, it is possible to perform image display based on various video signals.

Figure 31:
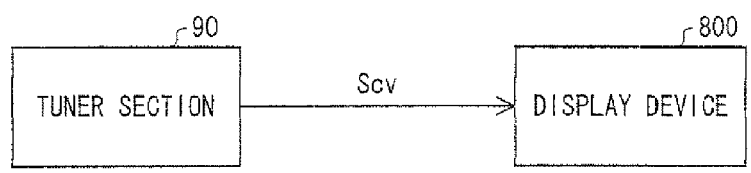
FIG. 31 is a block diagram illustrating a function of the present television receiver.

In a case where an image based on television broadcast is displayed by the liquid crystal display device 800, a tuner section 90 is connected to the liquid crystal display device 800 as illustrated in FIG. 31, thus configuring the present television receiver. The tuner section 90 extracts signals of channels to be received among waves (high frequency signals) that are received by an antenna (not illustrated), and converts them to an intermediate frequency signal. By detecting this intermediate frequency signal, composite color video signals Scv as a television signal are taken out. The composite color video signal Scv is, as already described, inputted into the liquid crystal display device 800, and an image based on this composite color video signal Scv is displayed on the liquid crystal display device 800.

Figure 32:
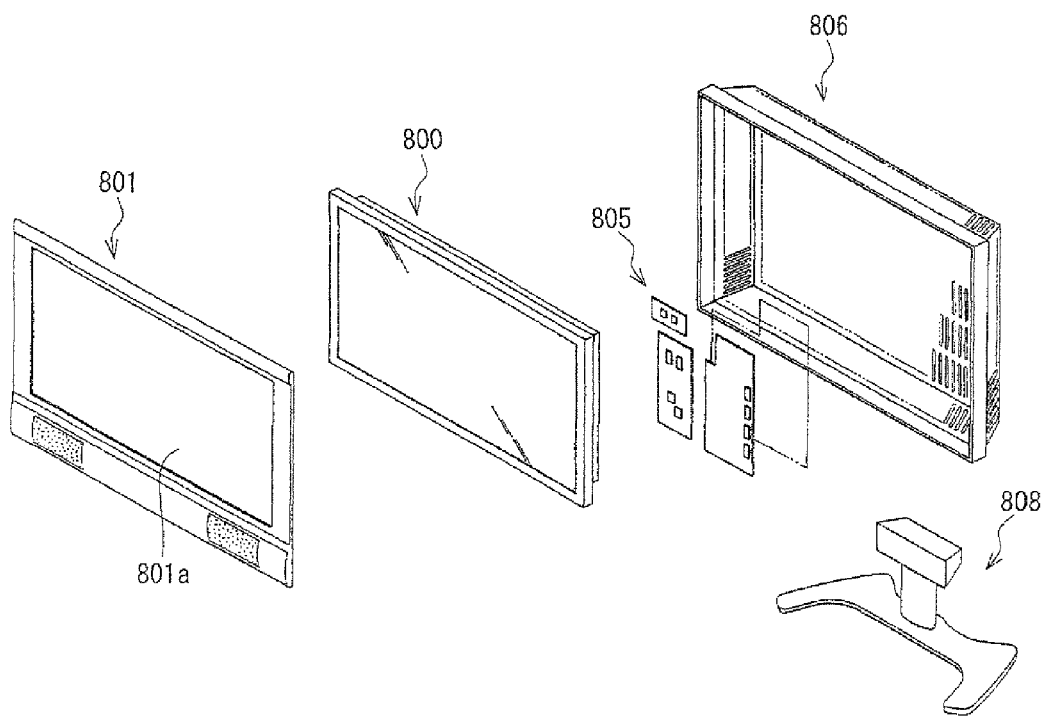
FIG. 32 is an exploded perspective view of a configuration of the present television receiver.
Figure 33:
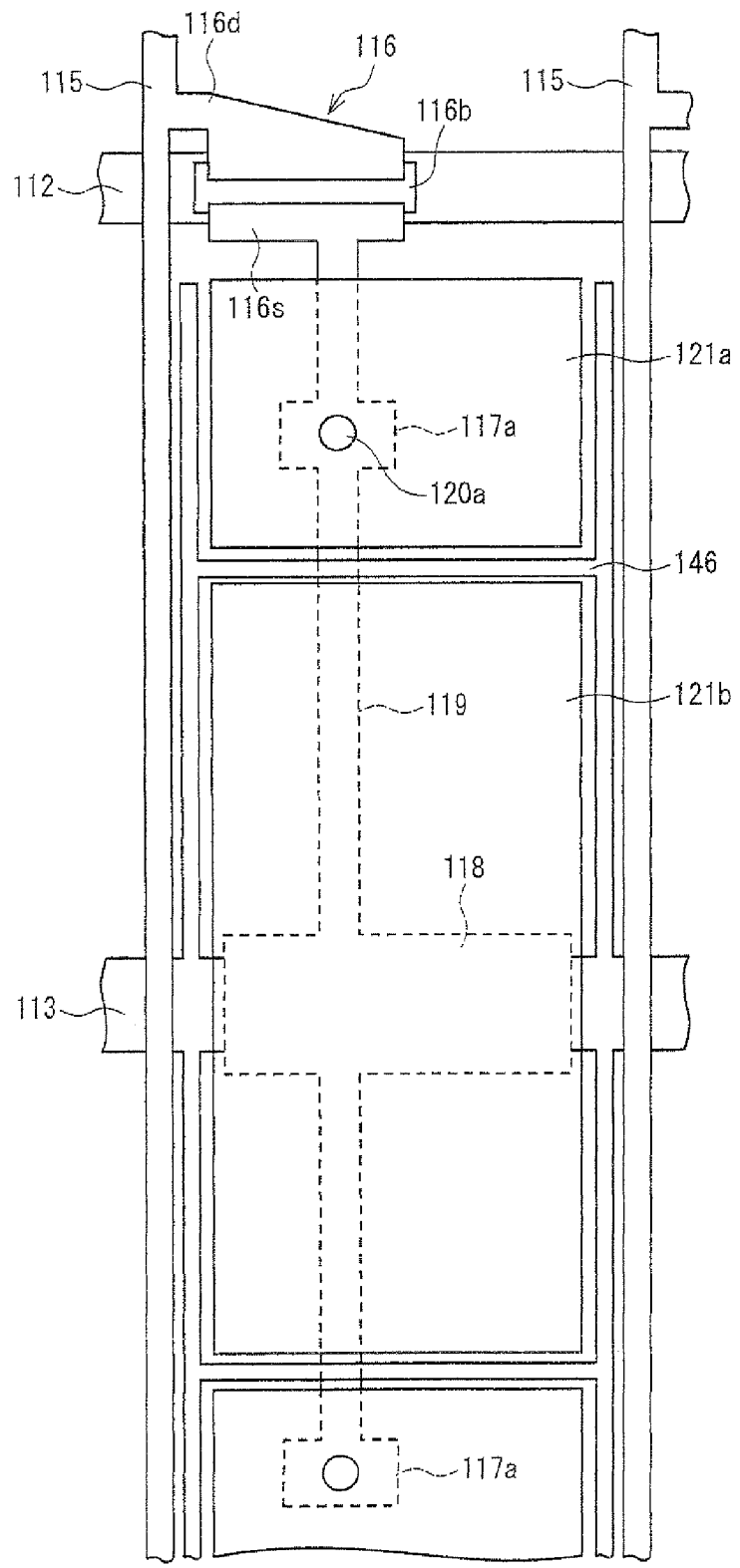
FIG. 33 is a plan view illustrating a configuration of a conventional liquid crystal panel.

FIG. 32 is an exploded perspective view of an example illustrating one configuration of the present television receiver. As illustrated in FIG. 32, the present television receiver includes, as its constituents, the liquid crystal display device 800, a first housing 801 and a second housing 806. The first housing 801 and second housing 806 sandwiches the liquid crystal display device 800 so that the liquid crystal display device 800 is surrounded by the two housings. The first housing 801 has an opening 801*a* that transmits an image displayed on the liquid crystal display device 800. Moreover, the second housing 806 covers a rear side of the liquid crystal display device 800, and includes an operation circuit 805 for operating the display device 800. Further, the second housing 806 has a supporting member 808 disposed to its lower side.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

A liquid crystal display device of the present invention is suitably used for a liquid crystal television, for example.

The invention claimed is:
1. A liquid crystal display device comprising:
scanning signal lines;
data signal lines; and
storage capacitor wires,
wherein:
a first sub-pixel including a first pixel electrode, a second sub-pixel including a second pixel electrode, a third sub-pixel including a third pixel electrode, and a fourth sub-pixel including a fourth pixel electrode are provided in a pixel;
the first pixel electrode is connected to one of the data signal lines via a first transistor, the second pixel electrode is connected to the one of the data signal lines via a second transistor, and the first transistor and the second transistor are connected to one of the scanning signal lines;
the first pixel electrode is connected to the third pixel electrode via a capacitor, and the second pixel electrode is connected to the fourth pixel electrode via a capacitor;
one of two storage capacitor wires forms a capacitance with the first pixel electrode, and the other one of the two storage capacitor wires forms a capacitance with the second pixel electrode; and
said one of the two storage capacitor wires receives one storage capacitor wire signal, and the other one of the two storage capacitor wires receives another storage capacitor wire signal.
2. The liquid crystal display device according to claim 1, wherein:
said one storage capacitor wire signal received by said one of the two storage capacitor wires and said another storage capacitor wire signal received by the other one of the two storage capacitor wires are level-shifted after the first transistor and the second transistor are turned OFF, said one storage capacitor wire signal being level-shifted by an amount different from said another storage capacitor wire signal.
3. The liquid crystal display device according to claim 2, wherein:
said one storage capacitor wire signal and said another storage capacitor wire signal are level-shifted in an identical direction.
4. The liquid crystal display device according to claim 3, wherein:
said one storage capacitor wire signal and said another storage capacitor wire signal are level-shifted to a positive side in a case where a signal electric potential supplied to the first pixel electrode and the second pixel electrode is of a positive polarity, and
said one storage capacitor wire signal and said another storage capacitor wire signal are level-shifted to a negative side in a case where the signal electric potential supplied to the first pixel electrode and the second pixel electrode is of a negative polarity.
5. The liquid crystal display device according to claim 1, wherein:
the pixel is divided into two sections by one of the scanning signal lines which traverses the pixel,
the first pixel electrode and the third pixel electrode are disposed in one of the two sections, and the second pixel electrode and the fourth pixel electrode are disposed in the other one of the two sections.
6. The liquid crystal display device according to claim 5, wherein:
each of the first pixel electrode and the second pixel electrode is disposed adjacent to said one of the scanning signal lines from a plan view.

7. The liquid crystal display device according to claim 1, wherein:
said one of the two storage capacitor wires which receives said one storage capacitor wire signal is provided so as to correspond to a gap between the pixel and another pixel disposed on an upstream side of the pixel in a scanning direction, so that said one of the two storage capacitor wires forms a capacitance with one of the pixel electrodes disposed in the pixel and forms a capacitance with one of pixel electrodes disposed in said another pixel, and
the other one of the two storage capacitor wires which receives said another storage capacitor wire signal is provided so as to correspond to a gap between the pixel and another pixel disposed on a downstream side of the pixel in the scanning direction, so that the other one of the two storage capacitor wires forms a capacitance with one of the pixel electrodes disposed in the pixel and forms a capacitance with one of pixel electrodes disposed in said another pixel.

8. The liquid crystal display device according to claim 1, wherein:
two storage capacitor wires each of which receives a storage capacitor wire signal are provided per pixel.

9. The liquid crystal display device according to claim 1, further comprising:
a first storage capacitor electrode that is electrically connected to the first pixel electrode; and
a second storage capacitor electrode that is electrically connected to the second pixel electrode,
said one of the two storage capacitor wires which receives said one storage capacitor wire signal overlapping the first storage capacitor electrode, and the other one of the two storage capacitor wires which receives said another storage capacitor wire signal overlapping the second storage capacitor electrode.

10. The liquid crystal display device according to claim 1, wherein:
in addition to the two storage capacitor wires which respectively receive said one storage capacitor wire signal and said another storage capacitor wire signal, the storage capacitor wires include two storage capacitor wires which receive respective constant potential signals,
one of the two storage capacitor wires which receive the respective constant potential signals forms a capacitance with the third pixel electrode, and the other one of the two storage capacitor wires which receive the respective constant potential signals forms a capacitance with the fourth pixel electrode.

11. The liquid crystal display device according to claim 10, further comprising:
a third storage capacitor electrode that is electrically connected to the third pixel electrode; and
a fourth storage capacitor electrode that is electrically connected to the fourth pixel electrode,
said one of the two storage capacitor wires which receive the respective constant potential signals overlapping the third storage capacitor electrode, and the other one of the two storage capacitor wires which receive the respective constant potential signals overlapping the fourth storage capacitor electrode.

12. The liquid crystal display device according to claim 10, wherein:
said one of the two storage capacitor wires which receive the respective constant potential signals overlaps a part of an edge of the third pixel electrode and has a storage capacitor wire extension which extends from said one of the two storage capacitor wires so as to overlap a remaining part of the edge or run around the remaining part of the edge and is merged with said one of the two storage capacitor wires again, and
the other one of the two storage capacitor wires which receive the respective constant potential signals overlaps a part of an edge of the fourth pixel electrode and has a storage capacitor wire extension which extends from the other one of the two storage capacitor wires so as to overlap a remaining part of the edge or run around the remaining part of the edge and is merged with the other one of the two storage capacitor wires again.

13. The liquid crystal display device according to claim 7, wherein
said one storage capacitor wire signal and said another storage capacitor wire signal respectively received by the two storage capacitor wires are level-shifted in an identical direction after the first transistor and the second transistor are turned OFF, and $$Vt < VT \leq Vt \times [(Ck+Cj)/Ck]$$

where (i) VT is a level shift amount of one of said one storage capacitor wire signal and said another storage capacitor wire signal, (ii) Vt is a level shift amount of the other one of said one storage capacitor wire signal and said another storage capacitor wire signal, (iii) Ck is a value of each of a coupling capacitance formed between the first pixel electrode and the third pixel electrode and a coupling capacitance formed between the second pixel electrode and the fourth pixel electrode, (iv) Cj is a value of each of liquid crystal capacitances of the first to fourth sub-pixels, and (v) Ch is a value of each of the capacitance formed between said one of the two storage capacitor wires and the first pixel electrode and the capacitance formed between the other one of the two storage capacitor wires and the second pixel electrode.

14. The liquid crystal display device according to claim 10, wherein
said one storage capacitor wire signal and said another storage capacitor wire signal respectively received by the two storage capacitor wires are level-shifted in an identical direction after the first transistor and the second transistor are turned OFF, and $$Vt < VT \leq Vt \times [(Ck+Cj+Ch)/Ck]$$

where (i) VT is a level shift amount of one of said one storage capacitor wire signal and said another storage capacitor wire signal, (ii) Vt is a level shift amount of the other one of said one storage capacitor wire signal and said another storage capacitor wire signal, (iii) Ck is a value of each of a coupling capacitance formed between the first pixel electrode and the third pixel electrode and a coupling capacitance formed between the second pixel electrode and the fourth pixel electrode, (iv) Cj is a value of each of liquid crystal capacitances of the first to fourth sub-pixels, and (v) Ch is a value of each of (a) the capacitance formed between said one of the two storage capacitor wires which receives said one storage capacitor wire signal and the first pixel electrode, (b) the capacitance formed between the other one of the two storage capacitor wires which receives said another storage capacitor wire signal and the second pixel electrode, (c) the capacitance formed between said one of the two storage capacitor wires which receive the respective constant potential signals and the third pixel electrode, and (d) the capacitance formed between the other one of the two storage capacitor wires which receive the respective constant potential signals and the fourth pixel electrode.

15. The liquid crystal display device according to claim 1, further comprising:
a first coupling capacitor electrode that is electrically connected to the first pixel electrode; and
a second coupling capacitor electrode that is electrically connected to the second pixel electrode,
the first coupling capacitor electrode overlapping the third pixel electrode via an interlayer insulating film that is provided below the first to fourth pixel electrodes, and
the second coupling capacitor electrode overlapping the fourth pixel electrode via the interlayer insulating film.

16. The liquid crystal display device according to claim 15, wherein:
the interlayer insulating film is made thin in at least one part of a portion of the interlayer insulating film which portion overlaps the third pixel electrode and the first coupling capacitor electrode and in at least one part of a portion of the interlayer insulating film which portion overlaps the fourth pixel electrode and the second coupling capacitor electrode.

17. The liquid crystal display device according to claim 16, wherein:
the interlayer insulating film includes an inorganic insulating film and an organic insulating film that is thicker than the inorganic insulating film, and
the organic insulating film is removed in at least one part of the portion of the interlayer insulating film which portion overlaps the third pixel electrode and the first coupling capacitor electrode and in at least one part of the portion of the interlayer insulating film which portion overlaps the fourth pixel electrode and the second coupling capacitor electrode.

18. The liquid crystal display device according to claim 15, wherein:
the first pixel electrode is connected, via a contact hole, to a draw-out wire drawn out from a conductive terminal of the first transistor, and the draw-out wire is connected in an identical layer to the first coupling capacitor electrode,
the second pixel electrode is connected, via a contact hole, to a draw-out wire drawn out from a conductive terminal of the second transistor, and the draw-out wire is connected in an identical layer to the second coupling capacitor electrode.

19. The liquid crystal display device according to claim 15, wherein:
the first pixel electrode is connected, via a contact hole, to a draw-out wire drawn out from a conductive terminal of the first transistor, and is connected to a relay wire via a contact hole, and the relay wire is connected in an identical layer to the first coupling capacitor electrode,
the second pixel electrode is connected, via a contact hole, to a draw-out wire drawn out from a conductive terminal of the second transistor, and is connected to a relay wire via a contact hole, and the relay wire is connected in an identical layer to the second coupling capacitor electrode.

20. The liquid crystal display device according to claim 1, wherein:
a gap between the first pixel electrode and the third pixel electrode and a gap between the second pixel electrode and the fourth pixel electrode serve as alignment control structures.

21. A liquid crystal display device comprising:
scanning signal lines;
data signal lines; and
storage capacitor wires,
wherein:
a first sub-pixel including a first pixel electrode, a second sub-pixel including a second pixel electrode, a third sub-pixel including a third pixel electrode, and a fourth sub-pixel including a fourth pixel electrode are provided in a pixel;
the first pixel electrode is connected to one of the data signal lines via a first transistor, the second pixel electrode is connected to the one of the data signal lines via a second transistor, and the first transistor and the second transistor are connected to one of the scanning signal lines;
the first pixel electrode is connected to the third pixel electrode via a capacitor, and the second pixel electrode is connected to the fourth pixel electrode via a capacitor;
one of two storage capacitor wires forms a capacitance with each of the first pixel electrode and the third pixel electrode, and the other one of the two storage capacitor wires forms a capacitance with each of the second pixel electrode and the fourth pixel electrode; and
the two storage capacitor wires receives one storage capacitor wire signal, and the other one of the two storage capacitor wires receives another storage capacitor wire signal.

22. The liquid crystal display device according to claim 21, wherein:
said one storage capacitor wire signal received by said one of the two storage capacitor wires and said another storage capacitor wire signal received by the other one of the two storage capacitor wires are level-shifted after the first transistor and the second transistor are turned OFF, said one storage capacitor wire signal being level-shifted by an amount different from said another storage capacitor wire signal.

23. The liquid crystal display device according to claim 22, wherein:
said one storage capacitor wire signal and said another storage capacitor wire signal are level-shifted in an identical direction.

24. The liquid crystal display device according to claim 23, wherein:
said one storage capacitor wire signal and said another storage capacitor wire signal are level-shifted to a positive side in a case where a signal electric potential supplied to the first pixel electrode and the second pixel electrode is of a positive polarity, and
said one storage capacitor wire signal and said another storage capacitor wire signal are level-shifted to a negative side in a case where the signal electric potential supplied to the first pixel electrode and the second pixel electrode is of a negative polarity.

25. The liquid crystal display device according to claim 21, wherein:
said one of the two storage capacitor wires which receives said one storage capacitor wire signal is provided so as to correspond to a gap between the pixel and another pixel disposed on an upstream side of the pixel in a scanning direction, so that said one of the two storage capacitor wires forms a capacitance with one of the pixel electrodes disposed in the pixel and forms a capacitance with one of pixel electrodes disposed in said another pixel, and
the other one of the two storage capacitor wires which receives said another storage capacitor wire signal is provided so as to correspond to a gap between the pixel and another pixel disposed on a downstream side of the pixel in the scanning direction, so that the other one of the two storage capacitor wires forms a capacitance with one of the pixel electrodes disposed in the pixel and forms a capacitance with one of pixel electrodes disposed in said another pixel.

26. The liquid crystal display device according to claim 21, wherein:
two storage capacitor wires each of which receives a storage capacitor wire signal are provided per pixel.

27. The liquid crystal display device according to claim 4, wherein:
in one of two successive frames, one of said storage capacitor wire signal and said another storage capacitor wire signal is level-shifted to a positive side by an amount of VT, and the other one of said one storage capacitor wire signal and said another storage capacitor wire signal is level-shifted to a positive side by an amount of Vt, and
in the other one of the two successive frames, said one of said one storage capacitor wire signal and said another storage capacitor wire signal is level-shifted to a negative side by an amount of VT, and the other one of said one storage capacitor wire signal and said another storage capacitor wire signal is level-shifted to a negative side by an amount of Vt.

28. The liquid crystal display device according to claim 4, wherein:
in a first frame, one of said one storage capacitor wire signal and said another storage capacitor wire signal is level-shifted to a positive side by an amount of VT, and the other one of said one storage capacitor wire signal and said another storage capacitor wire signal is level-shifted to a positive side by an amount of Vt,
in a second frame, said one of said one storage capacitor wire signal and said another storage capacitor wire signal is level-shifted to a negative side by an amount of Vt, and the other one of said one storage capacitor wire signal and said another storage capacitor wire signal is level-shifted to a negative side by an amount of VT,
in a third frame, said one of said one storage capacitor wire signal and said another storage capacitor wire signal is level-shifted to a positive side by an amount of Vt, and the other one of said one storage capacitor wire signal and said another storage capacitor wire signal is level-shifted to a positive side by an amount of VT, and
in a fourth frame, said one of said one storage capacitor wire signal and said another storage capacitor wire signal is level-shifted to a negative side by an amount of VT, and the other one of said one storage capacitor wire signal and said another storage capacitor wire signal is level-shifted to a negative side by an amount of Vt,
the first, second, third, and fourth frames being successive frames.

29. A television receiver comprising:
a liquid crystal display device as set forth in claim 1; and
a tuner section for receiving television broadcast.

* * * * *